(12) United States Patent
Espinosa

(10) Patent No.: US 12,385,276 B2
(45) Date of Patent: Aug. 12, 2025

(54) REINFORCED BUILDING WALL USING COMPRESSION ROD

(71) Applicant: CETRES HOLDINGS, LLC, Jackson, WY (US)

(72) Inventor: Thomas M. Espinosa, Snohomish, WA (US)

(73) Assignee: CETRES HOLDINGS, LLC, Jackson, WY (US)

( * ) Notice: Subject to any disclaimer, the term of this patent is extended or adjusted under 35 U.S.C. 154(b) by 98 days.

(21) Appl. No.: 17/069,806

(22) Filed: Oct. 13, 2020

(65) Prior Publication Data

US 2021/0108434 A1    Apr. 15, 2021

Related U.S. Application Data

(60) Provisional application No. 62/914,582, filed on Oct. 14, 2019.

(51) Int. Cl.
*E04H 9/02*   (2006.01)
*E04B 2/70*   (2006.01)
*E04H 9/14*   (2006.01)

(52) U.S. Cl.
CPC ............. *E04H 9/021* (2013.01); *E04B 2/706* (2013.01); *E04H 9/14* (2013.01)

(58) Field of Classification Search
CPC . E04H 9/021; E04H 9/14; E04B 2/706; E04B 2001/3583; E04B 2001/2688; E04B 1/4157; E04B 1/4164
See application file for complete search history.

(56) References Cited

U.S. PATENT DOCUMENTS

| 3,782,061 A | 1/1974 | Minutoli |
| 4,812,096 A | 3/1989 | Peterson |
| 4,875,314 A | 10/1989 | Boilen |

(Continued)

FOREIGN PATENT DOCUMENTS

| EP | 2 216 451 | 8/2010 |
| EP | 328205 A1 | 2/2018 |

(Continued)

OTHER PUBLICATIONS

PCT/US20/55437, International Search Report and the Written Opinion of the International Searching Authority, Jan. 5, 2021.

(Continued)

*Primary Examiner* — Theodore V Adamos
(74) *Attorney, Agent, or Firm* — FRESH IP PLC

(57) ABSTRACT

A reinforced building wall includes a first stud wall disposed above a foundation; the first stud wall including a bottom plate, a top plate and first and second vertical studs extending between the bottom plate and the top plate; a first threaded rod having a first end portion embedded in the foundation and a second end portion extending through the bottom plate; a compression rod having a first end portion operably attached to the second end portion of the first threaded rod and a second end portion operably bearing onto a bottom surface of the top plate, the compression rod is configured to handle compression forces from the top plate without buckling; an anchor embedded in the foundation, the anchor is operably attached to the first end portion of the first threaded rod.

50 Claims, 70 Drawing Sheets

(56) References Cited

U.S. PATENT DOCUMENTS

| | | | | |
|---|---|---|---|---|
| 5,531,054 | A * | 7/1996 | Ramirez | E04H 9/14 52/95 |
| 5,570,549 | A | 11/1996 | Lung et al. | |
| 7,971,411 | B2 | 7/2011 | Commins | |
| 7,985,041 | B2 * | 7/2011 | Lin | F16B 37/00 411/388 |
| 8,689,518 | B2 | 4/2014 | Gridley | |
| 8,943,777 | B2 | 2/2015 | Espinosa | |
| 9,097,000 | B2 | 8/2015 | Espinosa | |
| 9,097,001 | B2 * | 8/2015 | Espinosa | E04B 1/2604 |
| 9,874,009 | B2 | 1/2018 | Espinosa | |
| 11,603,656 | B2 | 3/2023 | Cetres | |
| 2003/0230032 | A1 * | 12/2003 | Shahnazarian | E04H 9/14 52/223.13 |
| 2005/0055897 | A1 * | 3/2005 | Commins | E04H 9/14 52/169.1 |
| 2006/0265274 | A1 | 11/2006 | Commins | |
| 2008/0060297 | A1 * | 3/2008 | Espinosa | E04B 2/70 411/533 |
| 2010/0115866 | A1 * | 5/2010 | Espinosa | E04B 1/08 52/712 |
| 2011/0041449 | A1 * | 2/2011 | Espinosa | E04C 5/16 52/698 |
| 2012/0304589 | A1 * | 12/2012 | Commins | E04B 1/2604 52/745.21 |
| 2013/0067837 | A1 | 3/2013 | Zimmerman | |
| 2013/0340366 | A1 * | 12/2013 | Gray | E04B 1/26 403/111 |
| 2014/0123574 | A1 | 5/2014 | Paone et al. | |
| 2014/0260067 | A1 | 9/2014 | Pryor | |
| 2016/0244960 | A1 | 8/2016 | Espinosa | |
| 2017/0089063 | A1 * | 3/2017 | Espinosa | E04B 1/4121 |
| 2018/0135676 | A1 * | 5/2018 | Taneichi | E04B 1/40 |
| 2018/0202146 | A1 * | 7/2018 | Espinosa | E04B 1/4157 |
| 2019/0345710 | A1 * | 11/2019 | Espinosa | E04B 1/2604 |

FOREIGN PATENT DOCUMENTS

| | | |
|---|---|---|
| JP | H09 189076 | 7/1997 |
| WO | WO 2008/033357 A2 | 3/2008 |

OTHER PUBLICATIONS

Notification of Transmittal of the International Search Report and the Written Opinion of the International Searching Authority, or the Declaration of PCT/US19/32918.

European Search Report and Opinion for European Patent Application No. 19803514.9 dated May 19, 2021.

European Search Report and Opinion for European Patent Application No. EP 20875757.7 dated Oct. 24, 2022.

* cited by examiner

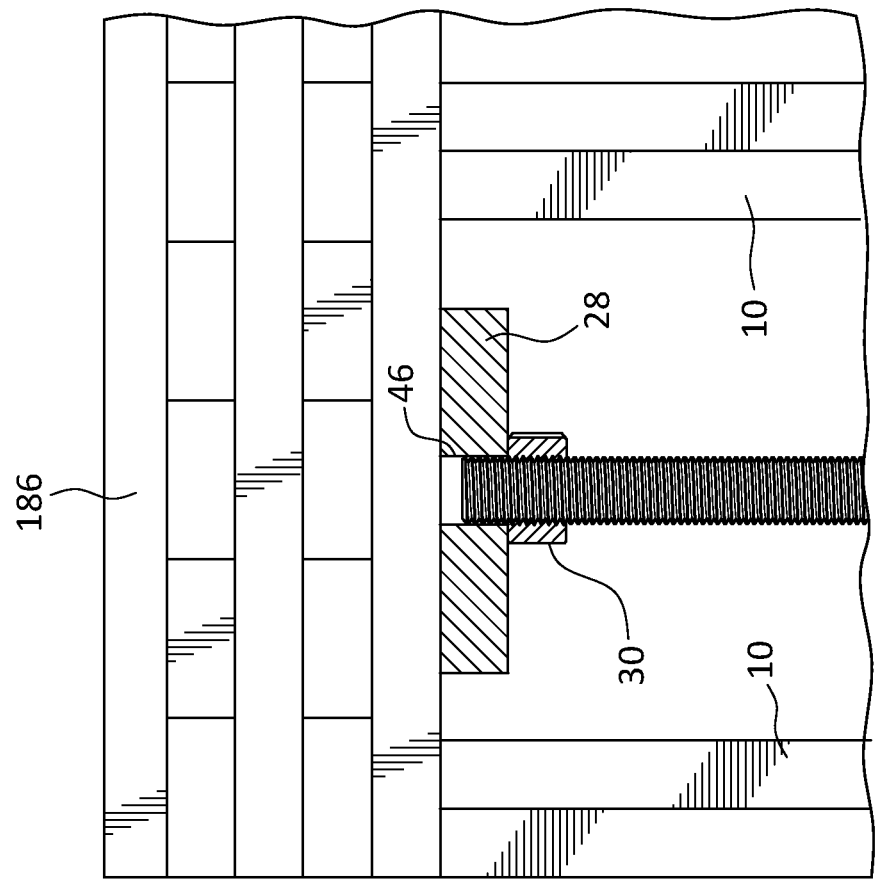
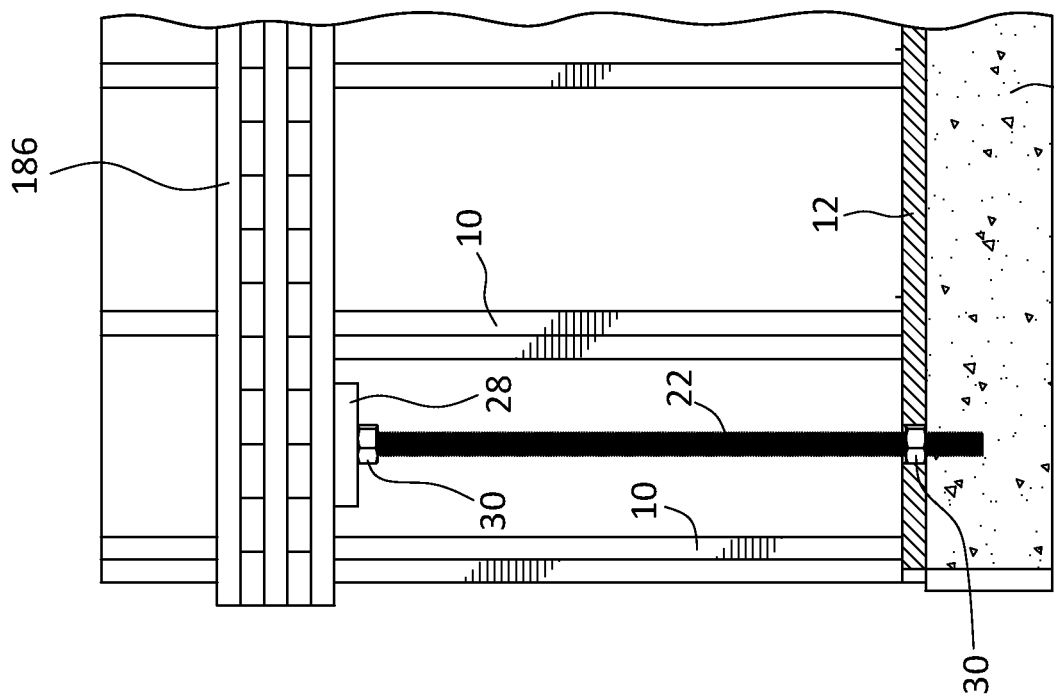
FIG. 66B
FIG. 66A

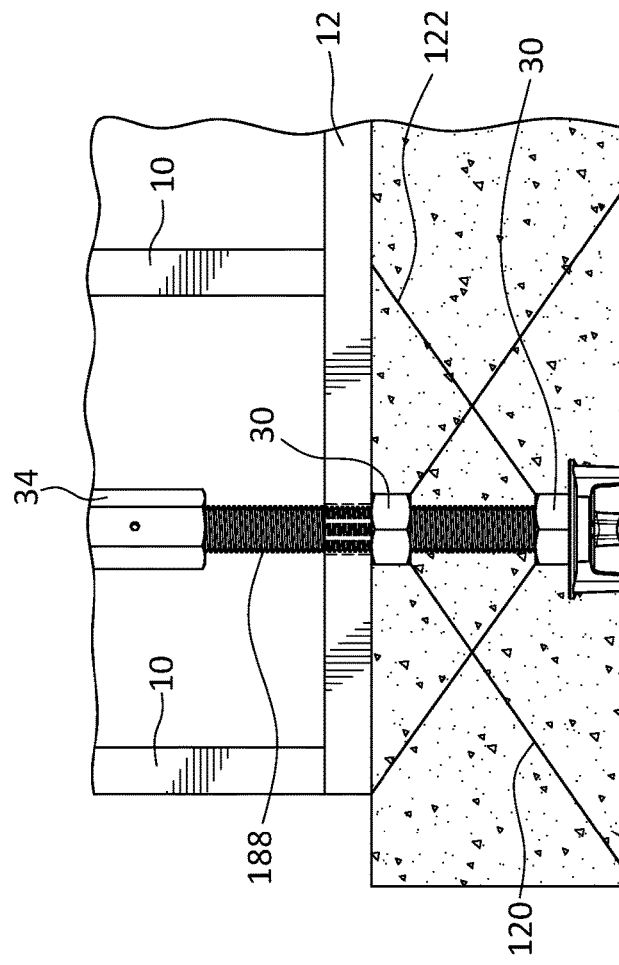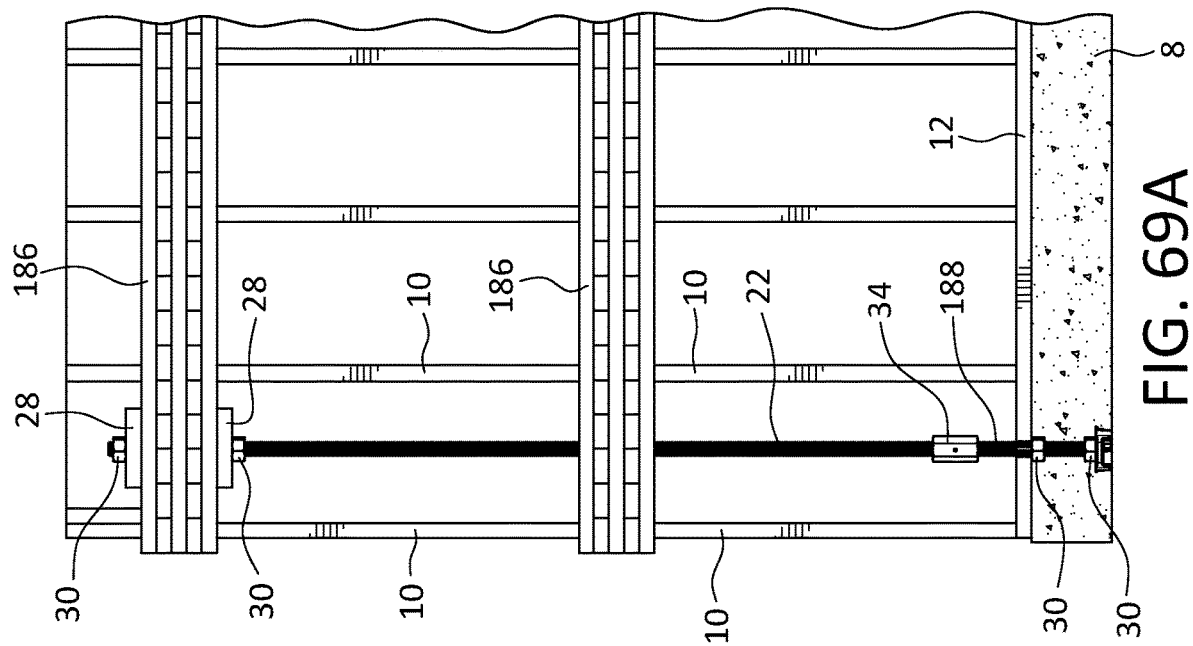

REINFORCED BUILDING WALL USING COMPRESSION ROD

RELATED APPLICATION

This a nonprovisional application of Provisional Application Ser. No. 62/914,582, filed Oct. 14, 2019, hereby incorporated by reference, and is related to application Ser. No. 16/415,595, filed on May 17, 2019, hereby incorporated by reference.

FIELD OF THE INVENTION

The present invention is generally directed to reinforced building walls designed to resist static and dynamic compression and tension forces.

BACKGROUND OF THE INVENTION

Reinforced building walls using threaded rods anchored to the foundation are disclosed in the prior art. For example, see U.S. Pat. Nos. 6,951,078, 7,762,030, 8,136,318, 8,943,777, 9,097,000, 9,097,001, 9,416,530 and 9,874,009, hereby incorporated herein by reference. These walls are designed to hold the walls against tension loads or forces caused by earthquakes and/or high winds.

SUMMARY OF THE INVENTION

The present invention provides a reinforced building wall, comprising a first stud wall disposed above a foundation; the first stud wall including a bottom plate, a top plate and first and second vertical studs extending between the bottom plate and the top plate; a first threaded rod having a first end portion embedded in the foundation and a second end portion extending through the bottom plate; a compression rod having a first end portion operably attached to the second end portion of the first threaded rod and a second end portion operably bearing onto a bottom surface of the top plate, the compression rod is configured to handle compression forces from the top plate without buckling; an anchor embedded in the foundation, the anchor is operably attached to the first end portion of the first threaded rod.

The present invention also provides a reinforced building wall, comprising a first stud wall disposed above a foundation; the first stud wall including a bottom plate, a top plate and first and second vertical studs extending between the bottom plate and the top plate; a first threaded rod having a first end portion embedded in the foundation and a second end portion extending through the bottom plate; a second threaded rod having a first end portion and a second end portion, the second end portion extending into an opening in the top plate; a compression rod having a first end portion operably attached to the second end portion of the first threaded rod and a second end portion operably attached to the first end portion of the second threaded rod; a first bearing plate disposed below and in contact with a bottom surface of the top plate and operably attached to the second end portion of the second threaded rod; and an anchor embedded in the foundation, the anchor is operably attached to the first end portion of the first threaded rod.

The present invention further provides a reinforced building wall, comprising a first stud wall disposed above a foundation; the first stud wall including a bottom plate, a top plate, a vertical stud extending between the bottom plate and the top plate; a first threaded rod having a first end portion embedded in the foundation and a second end portion extending through the bottom plate; a compression rod having a first end portion operably attached to the second end portion of the first threaded rod and a second end portion operably attached to the top plate, the compression rod is configured to handle compression forces without buckling; a cross-member operably attached to the compression rod to transfer compression forces to the compression rod; the vertical stud including a bottom end supported by the cross-member to transfer compression forces to the cross-member; an anchor embedded in the foundation, the anchor is operably attached to the first end portion of the first threaded rod.

The present invention provides a reinforced building wall, comprising a first stud wall disposed above a foundation; the first stud wall including a bottom plate, a top plate, a vertical stud extending between the bottom plate and the top plate; a first threaded rod having a first end portion embedded in the foundation and a second end portion extending through the bottom plate; a compression rod having a first end portion operably attached to the second end portion of the first threaded rod and a second end portion operably attached to the top plate, the compression rod is configured to handle compression forces without buckling and tension forces; a cross-member operably attached to the compression rod to transfer tension forces to the compression rod; the vertical stud including a top end supporting the cross-member to transfer tension forces to the cross-member; an anchor embedded in the foundation, the anchor is operably attached to the first end portion of the first threaded rod.

The present invention further provides a reinforced building wall, comprising a first stud wall disposed above a foundation; the first stud wall including first and second vertical studs supported by the foundation; a horizontal wood part supported by the first and second vertical studs; a compression rod having a first end portion operably supported by the foundation and a second end portion operably bearing onto a bottom surface of horizontal wood part.

The present invention also provides a reinforced building wall, comprising a first stud wall disposed above a foundation; the first stud wall including a bottom plate, a top plate and first and second vertical studs extending between the bottom plate and the top plate; and a compression rod having a first end portion operably supported by the foundation and a second end portion operably bearing onto a bottom surface of the top plate.

The present invention further provides an anchor embedded in a concrete structure, the anchor for attachment to a compression loading rod in a wood frame wall, comprising a threaded rod with first end portion for attaching to the compression loading rod and a second end portion embedded in the concrete structure; a first nut threaded to the threaded rod, the first nut engaging the concrete structure at an upper portion of the concrete structure; and the nut is configured to generate a shear cone in the concrete structure when the compression loading rod is subjected to compression forces.

BRIEF DESCRIPTION OF THE DRAWINGS

FIGS. 17B-19 are enlarged perspective views of portions of the wall of FIG. 17A, some shown with modifications.

FIGS. 65A-69B show the application of the present invention in walls supporting cross-laminated timber floorings.

DETAILED DESCRIPTION OF THE INVENTION

The embodiments disclosed herein are configured to transfer compression or tension forces from horizontal or vertical framing members of a wall to the foundation or other concrete structure.

Figure 1:
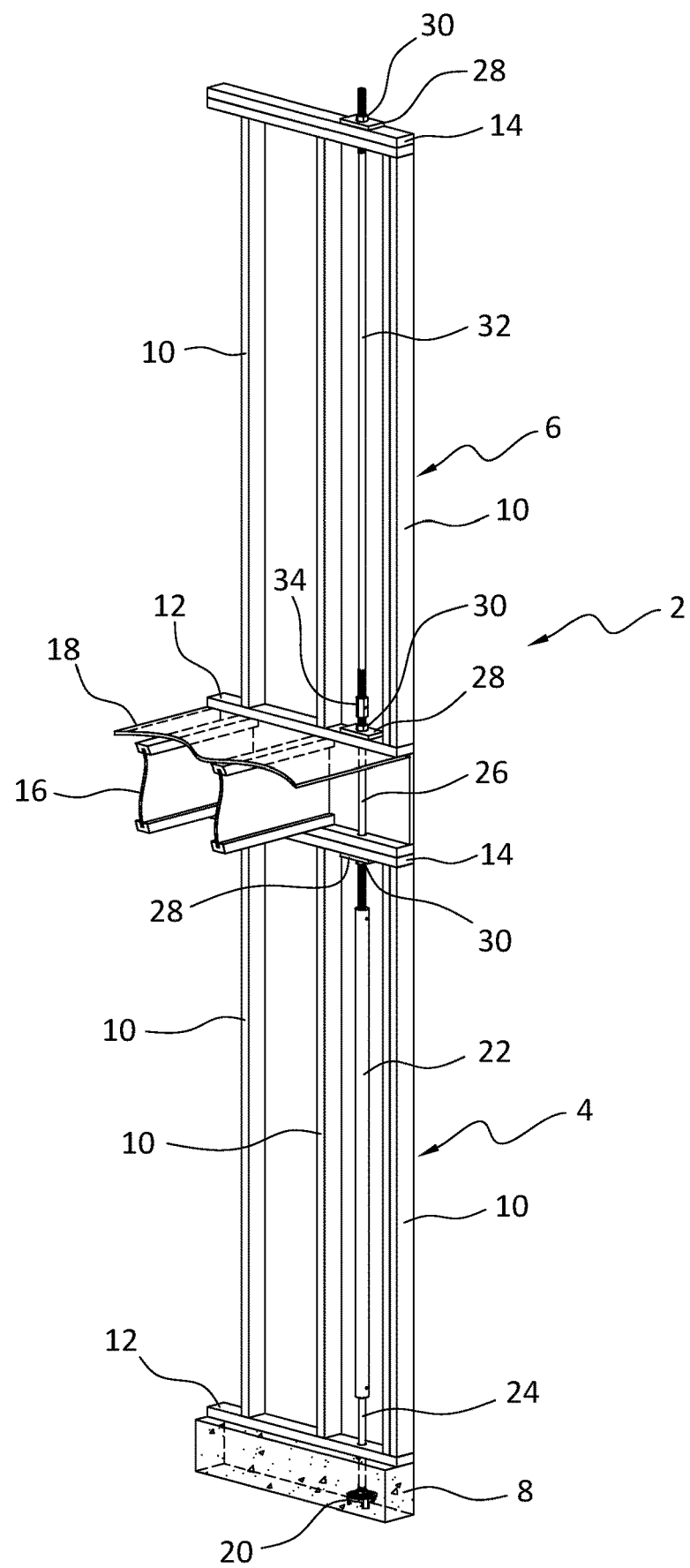
FIG. 1 is perspective fragmentary view of a stud-framed building wall, incorporating an embodiment of the present invention.

Referring to FIG. 1, a shear wall 2 incorporating the present invention is disclosed. The shear wall 2 forms a part of a building. The wall 2 is shown as a 2-story wall, comprising a lower wall 4, and an upper wall 6. It should be understood that the wall 2 may be one story or more than 2 stories, where one or more walls may be interposed between the lower wall 4 and the upper wall 6.

The wall 2 is supported on a concrete foundation 8. It should be understood that the foundation 8 can also be a steel I-beam, wood beam, or other concrete structures such as concrete slab, concrete floor, concrete wall, or concrete column that is directly or indirectly anchored to the ground. The wall 2 is made of vertical studs 10, which may be wood or metal. Wall sheathing (not shown) is operably attached to the studs 10, such as with nails or screws. The studs 10 are operably attached to respective horizontal bottom plates 12 and horizontal top plates 14. Floor joists 16 are supported on the respective top plates 14. Subfloor 18 is supported by the floor joists 16. Subfloor 18 is typically made of plywood sheets laid out over the floor joists 16. The end studs 10, while shown doubled up, may also be a single stud, depending on the expected load.

The wall 2 is configured for tension and compression forces. Tension forces tend to lift the wall upwardly while compression forces tend to compress the wall downwardly. When one corner of the wall is being subjected to tension or lifting forces, the opposite corner of the wall is simultaneously subjected to compression forces.

An anchor 20 is embedded in concrete in the foundation 8 in the foundation 8. A compression rod 22 is operably attached to an anchor rod 24. The anchor rod 24 is operably attached to the anchor 20. The compression rod 22 is operably attached to an intermediate threaded rod 26 that extends through openings in in the top plate 14 and the bottom plate 12 of the wall 6 above. The rod 26 is attached to the top plate 14 and the bottom plate 12 with respective bearing plates 28 and nuts 30. The bearing plate 28 may be made of solid or hollow metal.

Several sections of the compression rod 22 may be joined end to end to form longer lengths to reach the topmost wall in a multi-story building, as disclosed discussed herein. The compression rod 22 is not limited to the lower wall but may extend to the upper walls to handle compression loadings in the upper walls. The compression rod 22 will also function as a tension rod to handle tension forces in a typical hold down system. The compression rod 22 when joined end to end, using intermediary threaded rods, reduced diameter threaded ends or couplings, as disclosed herein, will function as if made of one piece. See, for example, FIGS. 20, 23, 25, 58, 47, 69A.

The compression rod 22 has sufficient cross-sectional area or strength or rigidity to handle compression forces without buckling. The compression rod 22 may also handle tension forces. The compression rod 22 may have the same or larger diameter than the threaded rod 26, depending on the expected loading for the wall.

Compression or downward forces are due to wall weight, shifting or racking of the wall 2 at the opposite end due to shear forces caused by earthquake or high winds. Tension or upward forces are due to lifting of the wall 2 due to shear forces from earthquake or high winds. For example, an earthquake typically generates tension and compression loading on the wall due to repeated racking of the wall from the ground motion. These compression and tension forces are dynamic loading that typically occur only during these events so that designing the wood framing members to also handle these dynamic loadings would not be cost effective. The compression rod 22 advantageously replaces additional wood studs or posts that would be needed to handle the additional loading on the wall that otherwise would not be present most of the time. The compression rod 22 may be made of mild steel, which is cheaper than the high strength steel used for threaded rods in commercially available hold down systems. The use of the compression rod 22 advantageously reduces material and labor costs. The compression rod 22 may be solid or tubular and may be of any cross-sectional shape, such as circular, hexagonal, rectangular, etc.

Figure 4:
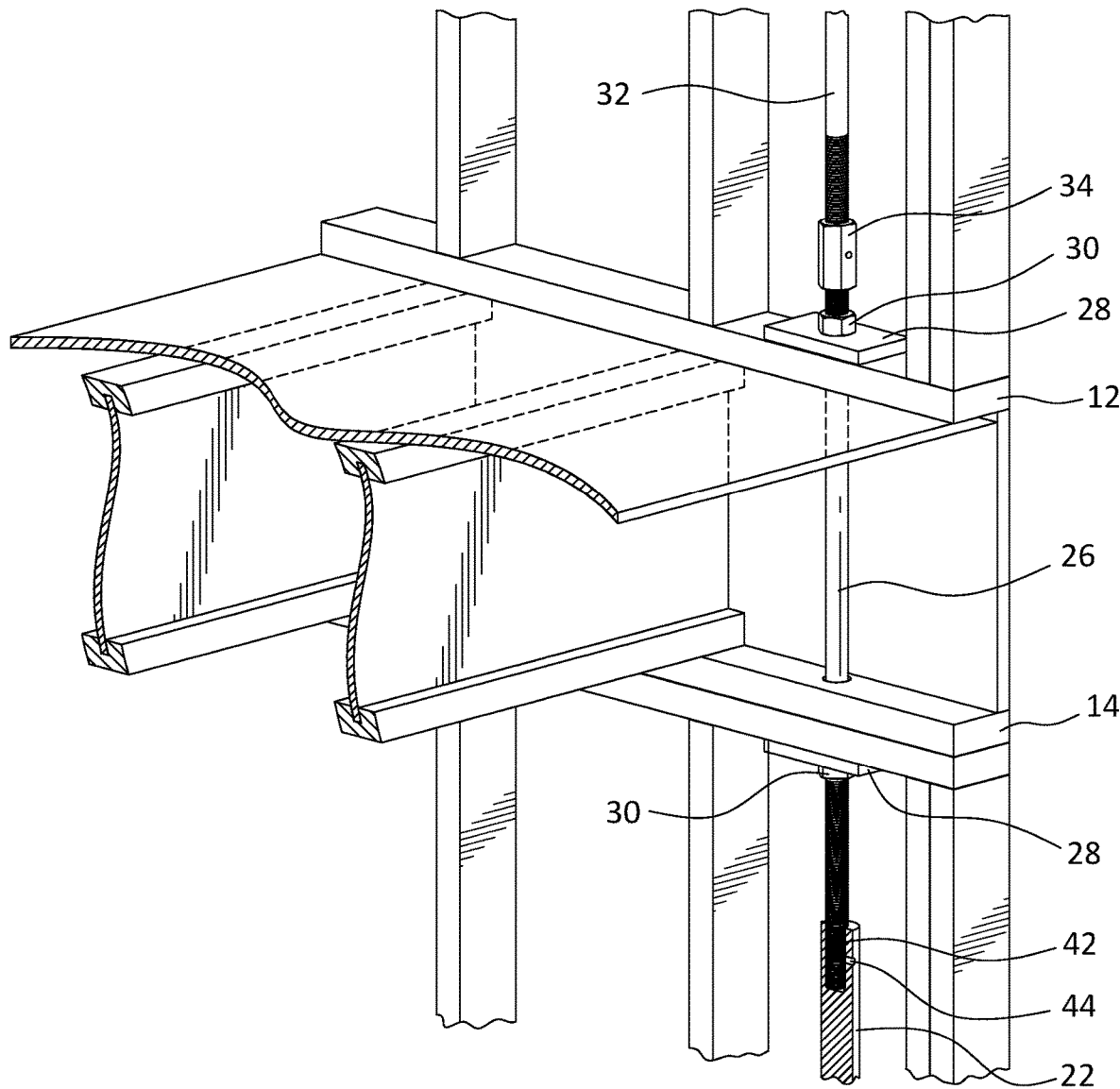

The lower bearing plate 28 attached to the bottom of the top plate 14 and the corresponding nut 30 advantageously transfer the compression forces from the horizontal framing member or top plate 14 to the compression rod 22 (see FIG. 4). The upper bearing plate 28 on the bottom plate 12 and the corresponding nut 30 advantageously transfer the tension forces from the horizontal framing member or top plate 12 to the compression rod 22.

A tie rod 32 is joined to the intermediate threaded rod 26 with a coupling 34. Another bearing plate 28 and a nut 30 are used to attach the tie rod 32 to the top plate 14 of the upper wall 6. The tie rod 32 may be smaller in diameter than the compression rod 22, depending on the expected load on the wall 6. The tie rod 32 may be threaded only at the end portions, with the intermediate portion being smooth or unthreaded.

Figure 2:
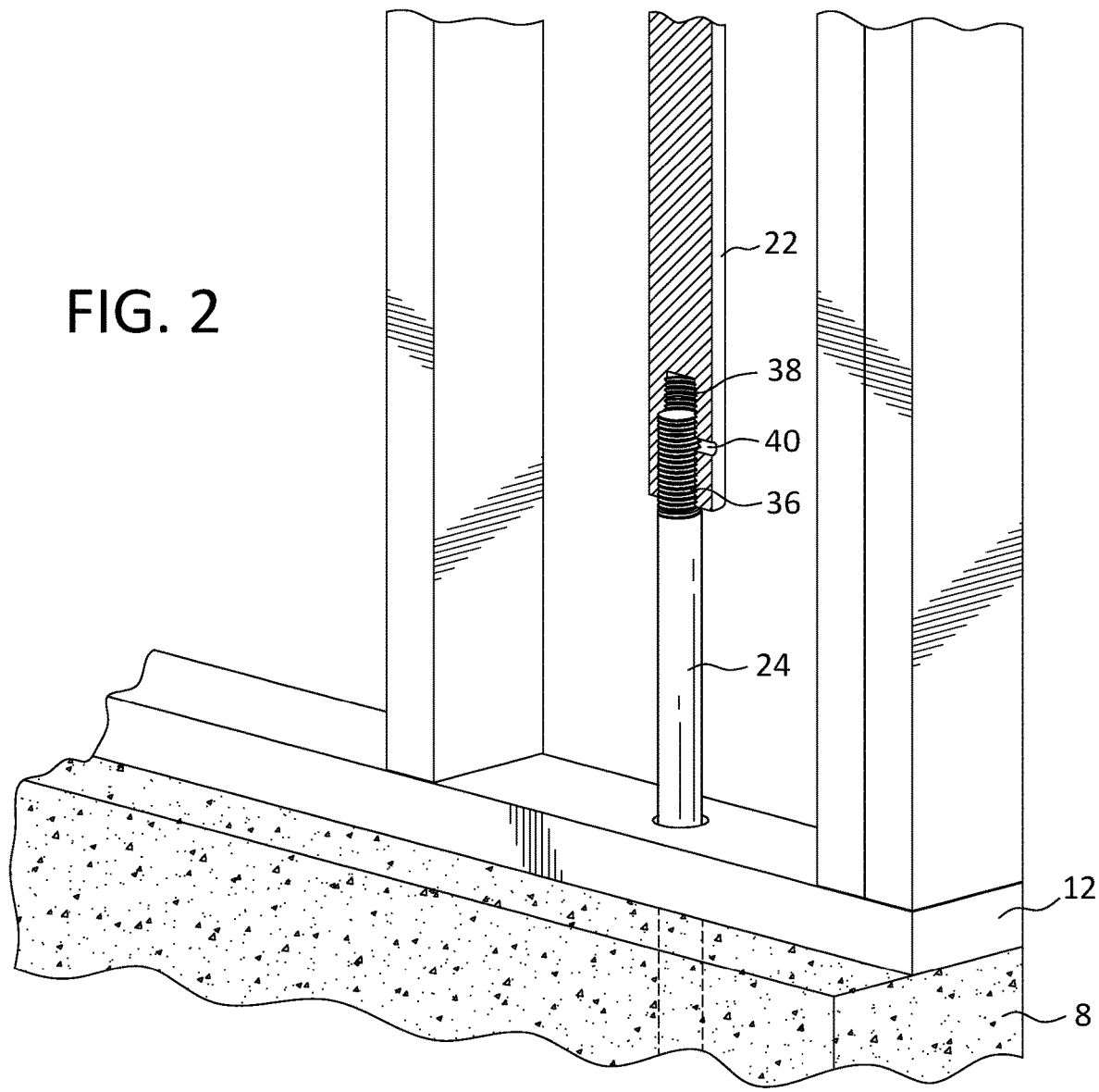
FIGS. 2-8 are enlarged perspective views of portions of the wall of FIG. 1.
Figure 3:
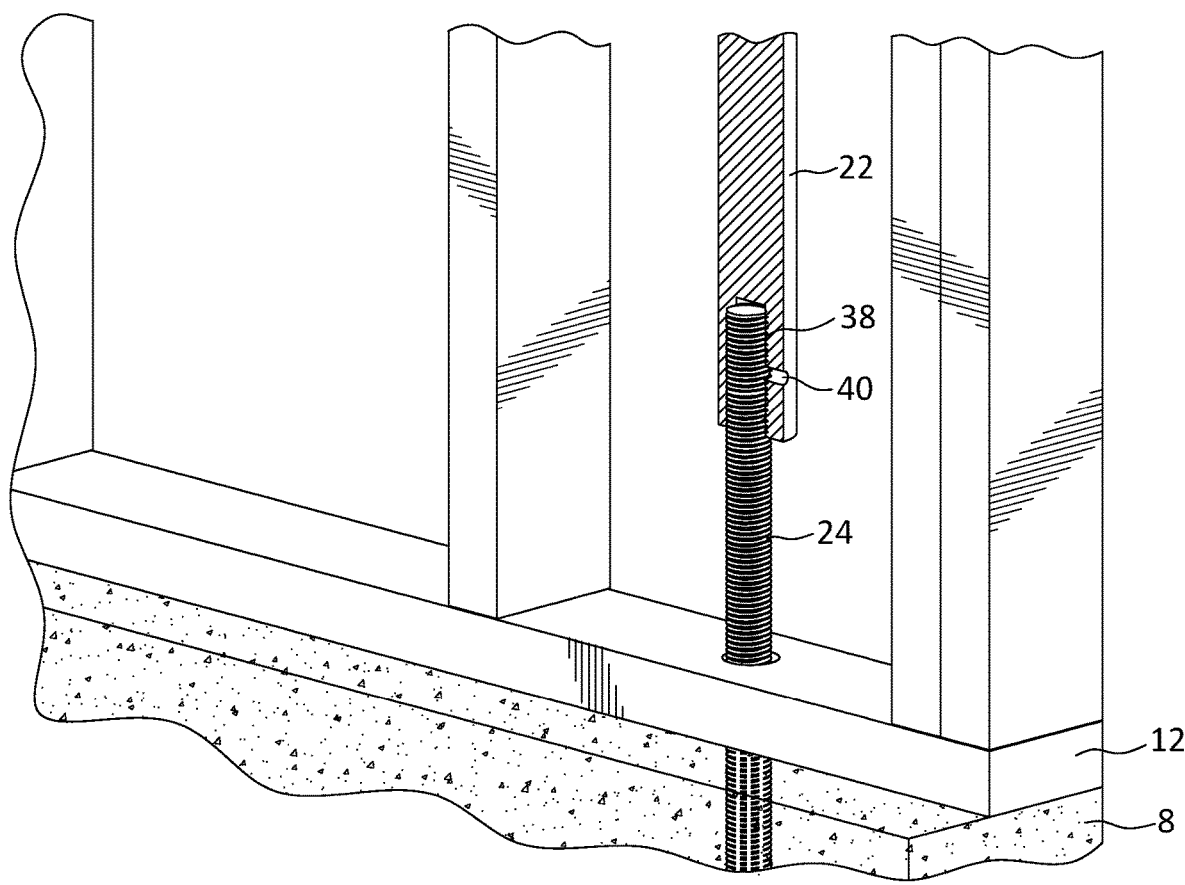

Referring to FIG. 2, the anchor rod 24 may be threaded at one end 36 and threaded to a threaded bore 38 at a bottom end of the compression rod 22. The opposite end of the anchor rod 24 may also be threaded for attachment to the anchor 20 (shown in FIG. 1). A sight hole 40 is provided for visually inspecting the extent of travel of the threaded end 36 into the threaded bore 38 to insure proper engagement of the anchor rod 24 with the compression rod 22. The anchor rod 24 may also be threaded throughout its length as shown in FIG. 3.

Figure 5:
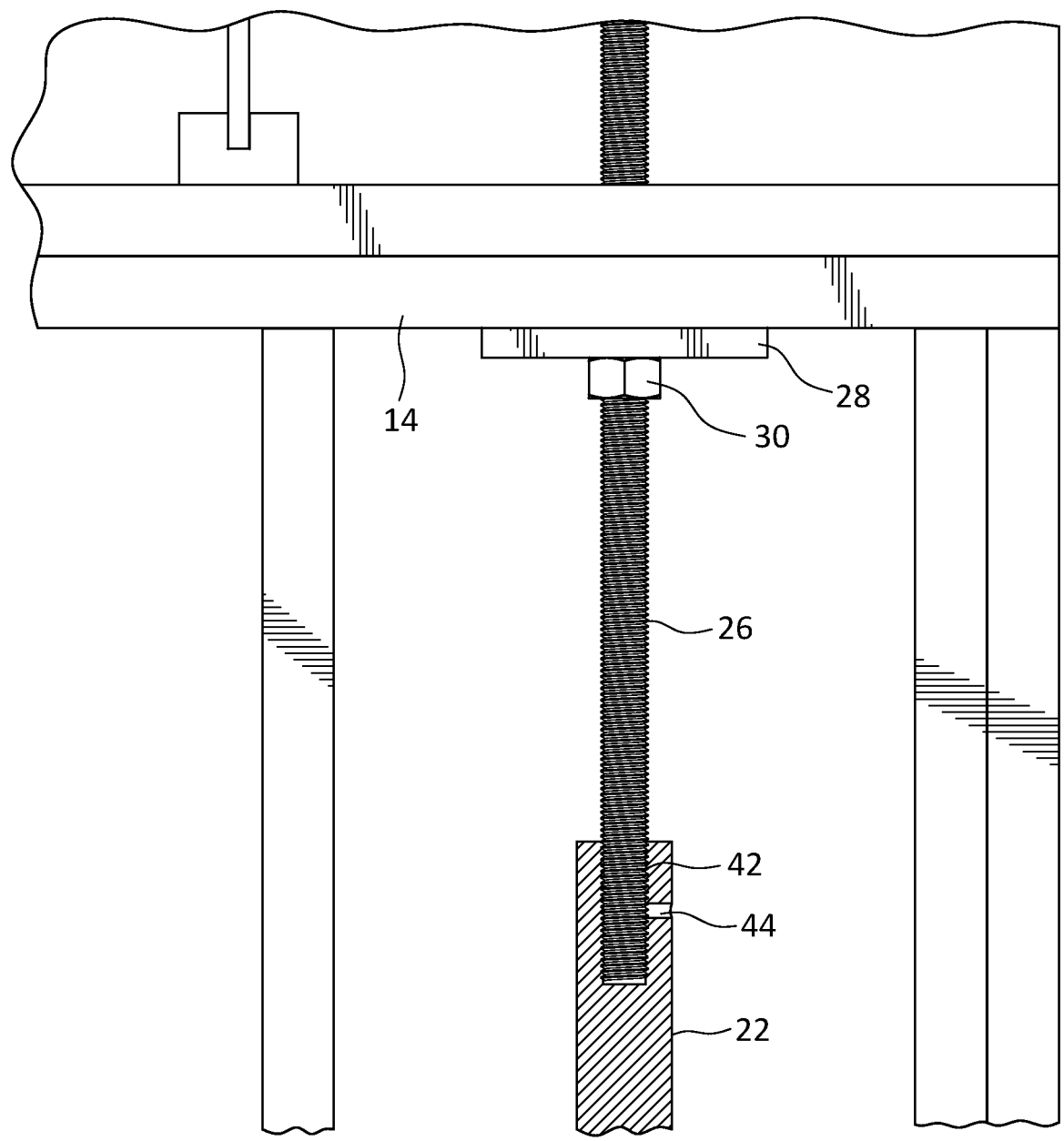

Referring to FIG. 4, the other end of the compression rod 22 includes another threaded bore 42 with a sight hole 44. The intermediate threaded rod 26 is threaded to the threaded bore 42. The intermediate portion of the intermediate threaded rod 26 may be unthreaded. Alternatively, the intermediate threaded rod 26 may be threaded throughout its length, as shown in FIG. 5. The lower bearing plate 28 bearing onto the bottom surface of the top plate 14 is effective to transfer compression forces from the horizontal framing member or top plate 14 to the compression rod 22, while the upper bearing plate 28 bearing on top of the horizontal framing member or bottom plate 12 is effective to transfer tension forces from the bottom plate 12 to the compression rod 22.

Figure 6:
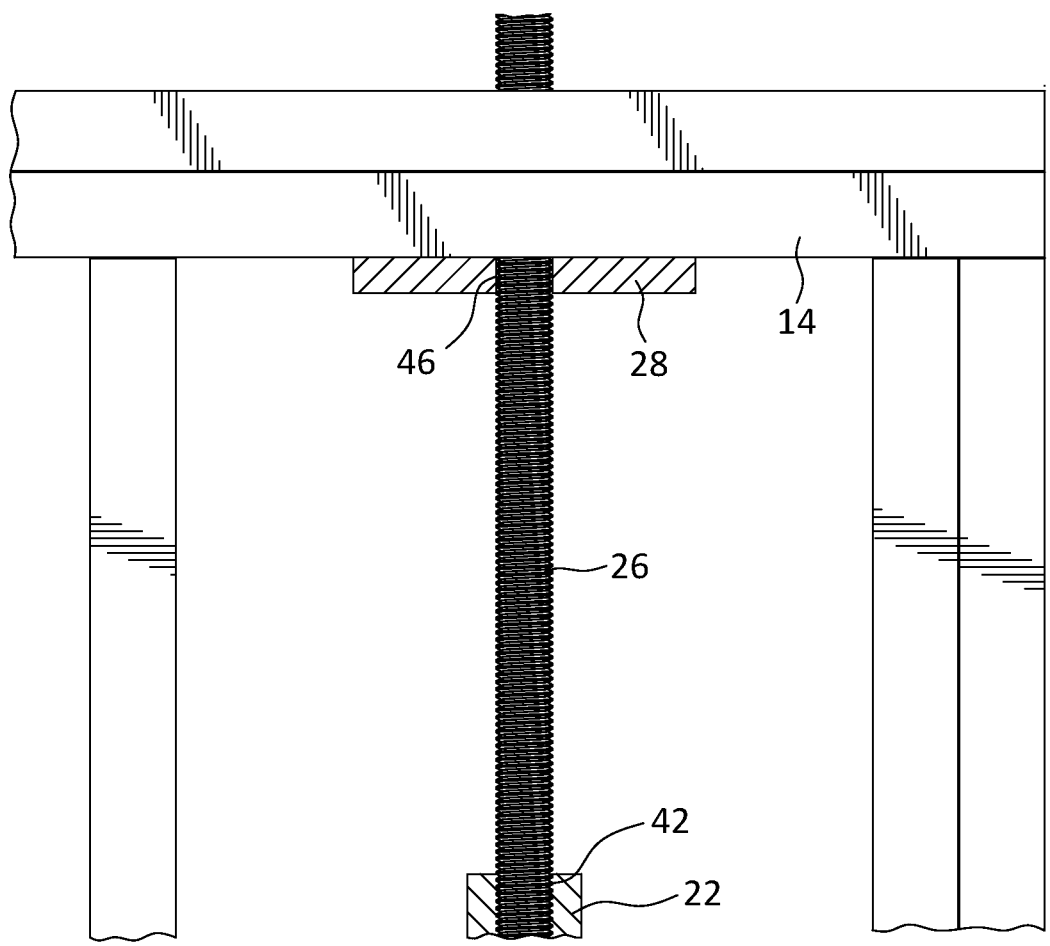

Referring to FIG. 6, the opening 46 of the bearing plate 28 may be threaded for direct connection with intermediate threaded rod 26. In this arrangement, the nut 30 may be omitted. T Referring to FIG. 7, the threaded bore 42 may be multi-diameter with a larger threaded bore 48 and a smaller threaded bore 50. The sight hole 44 may be associated with the larger threaded bore 48 and another sight hole 52 with the smaller threaded bore 50.

Figure 8:
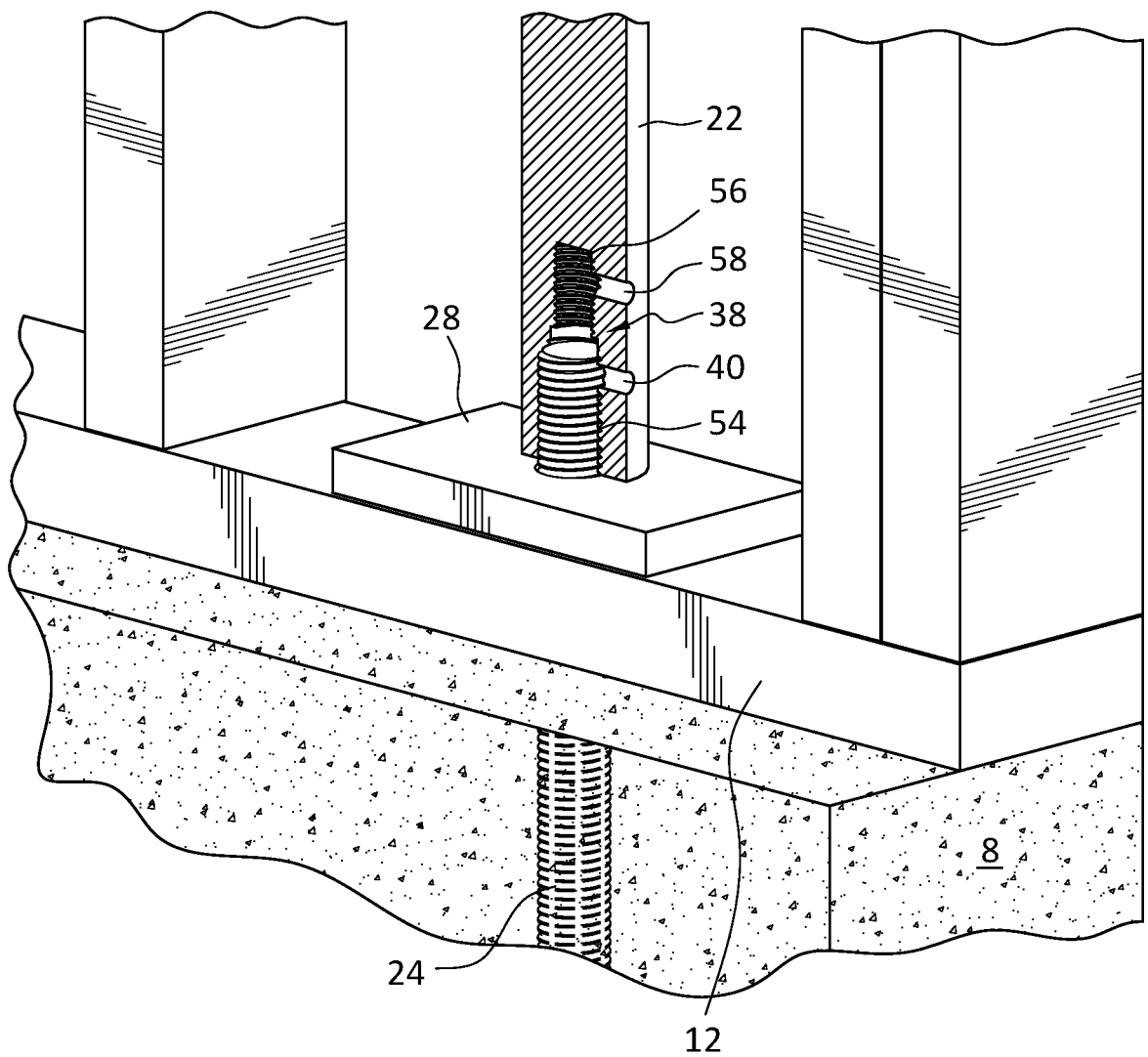

Referring to FIG. 8, the threaded bore 38 may be multi-diameter with a larger threaded bore 54 and a smaller threaded bore 56. The sight hole 40 may be associated with the larger threaded bore 54 and another sight hole 58 with the smaller threaded bore 56. The bottom of the compression rod 22 bears on a bearing plate 28 to advantageously spreads a portion of the compression forces on the bottom plate 12.

It should be understood that each of the modifications shown in FIGS. 2, 3 and 8 pertaining to the connection of the lower end portion of the compression rod 22 to the anchor rod 24 may be combined with each of the modifications shown in FIGS. 4-7 pertaining to the connection of the upper end portion of the compression rod 22 to the wall structure. Accordingly, the embodiment shown in FIG. 1 is understood to also include the various embodiments provided by combining each of the embodiments of FIGS. 2, 3 and 8 with the embodiments of FIGS. 4-7.

Figure 9:
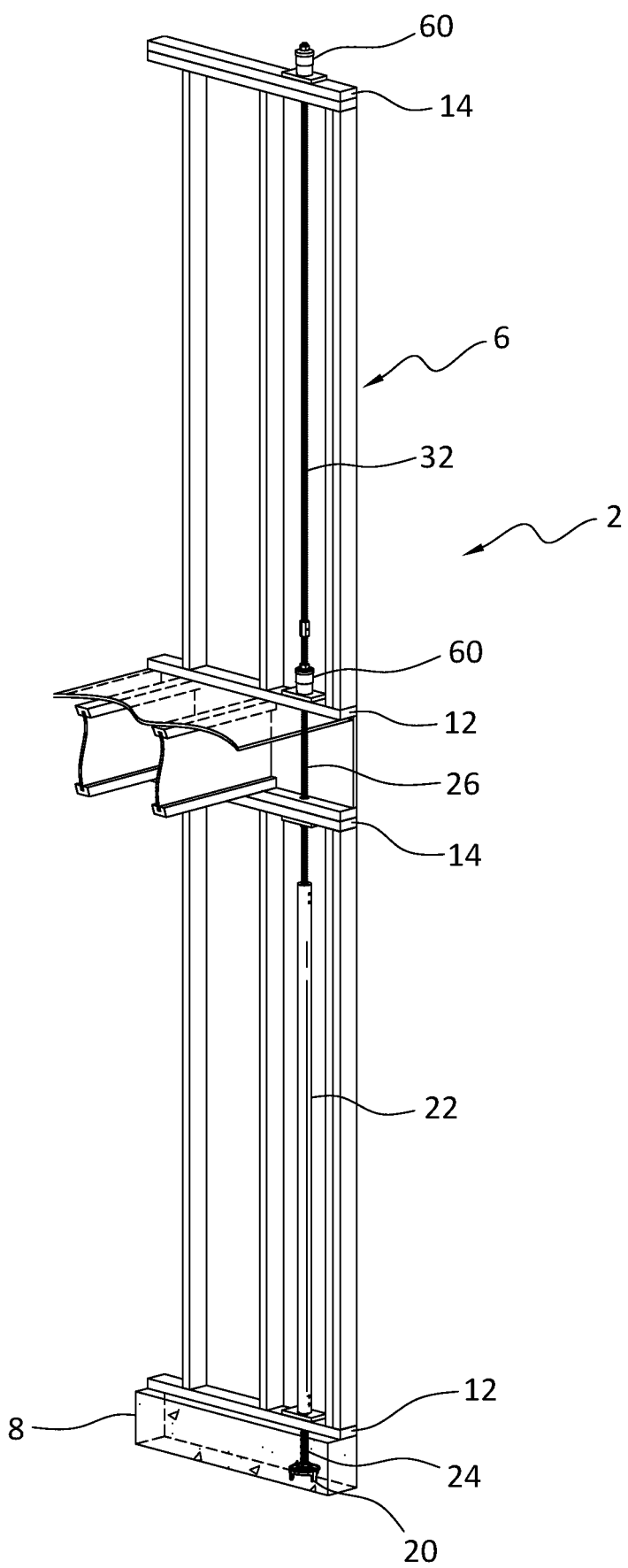
FIG. 9 is perspective fragmentary view of a stud-framed building wall, incorporating another embodiment of the present invention.
Figure 10:
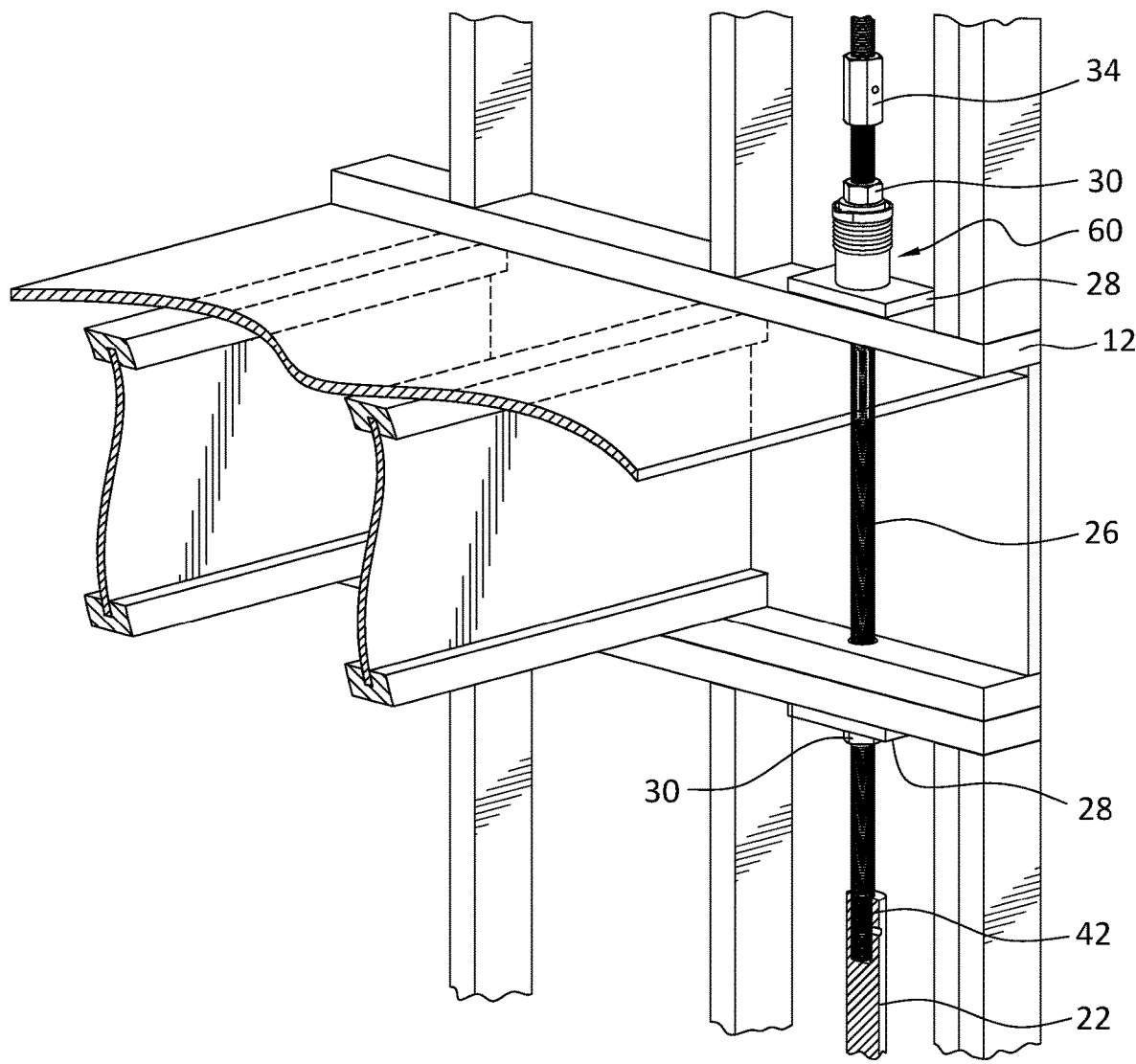
FIG. 10 is an enlarged perspective view of a portion of the wall of FIG. 9.

Referring to FIGS. 9 and 10, the embodiments provided by FIGS. 1-8 may be modified with the addition of an expandable connector 60 interposed between the bearing plate 28 and the nut 30 on the bottom plate 12 and the top plate 14 of the upper wall 6. The expandable connector 60 is well known in the art, as disclosed, for example, in U.S. Pat. Nos. 7,762,030, 6,161,350, 8,136,318, 8,186,924, 6,585,469, 2005/0055897, 2006/0156657, hereby incorporated herein by reference. The expandable connector 60 advantageously takes up any slack that develops in the intermediate threaded rod 26 and the tie rod 32 due to settlement or shrinkage of the wall 2. The tie rod 32 may be threaded along its entire length. The connection of the compression rod 22 to the anchor rod 24 may be as shown for example in FIG. 2, 3 or 8.

Figure 11:
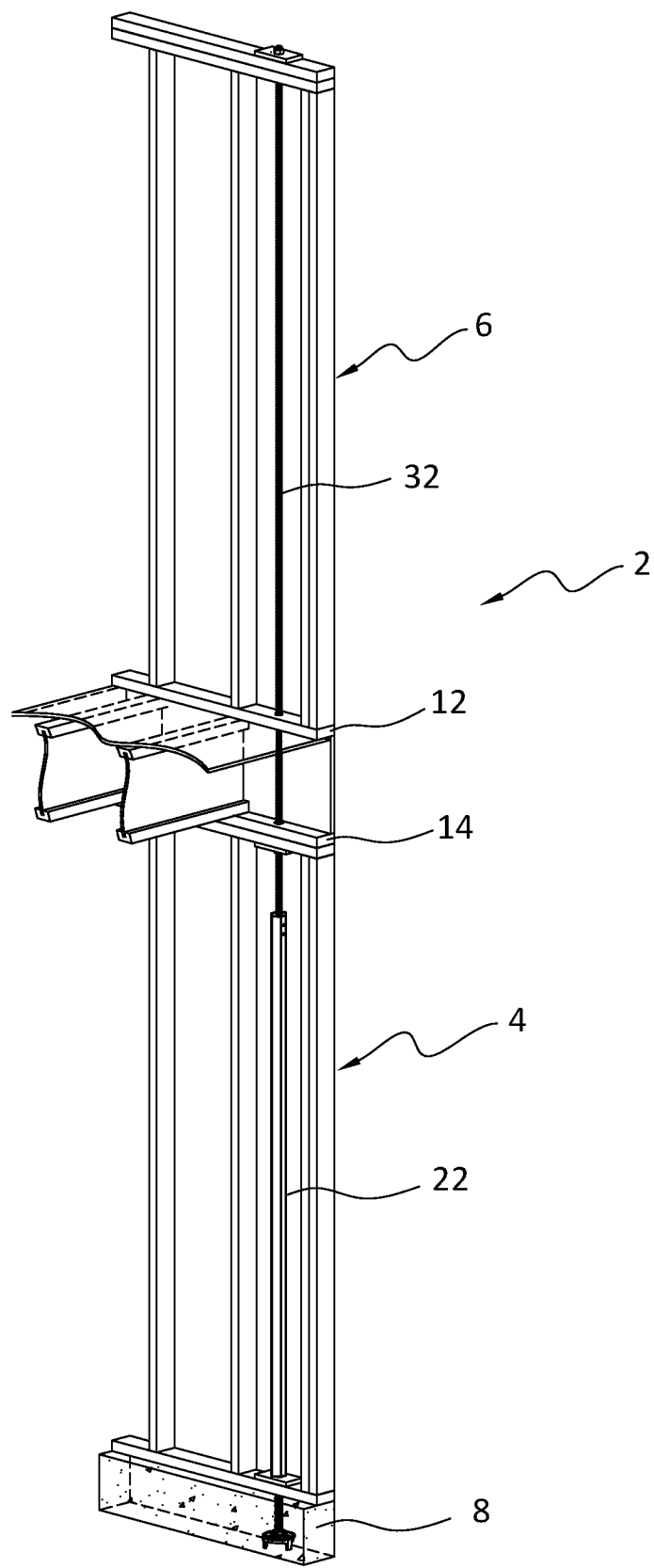
FIG. 11 is perspective fragmentary view of a stud-framed building wall, incorporating another embodiment of the present invention.
Figure 12:
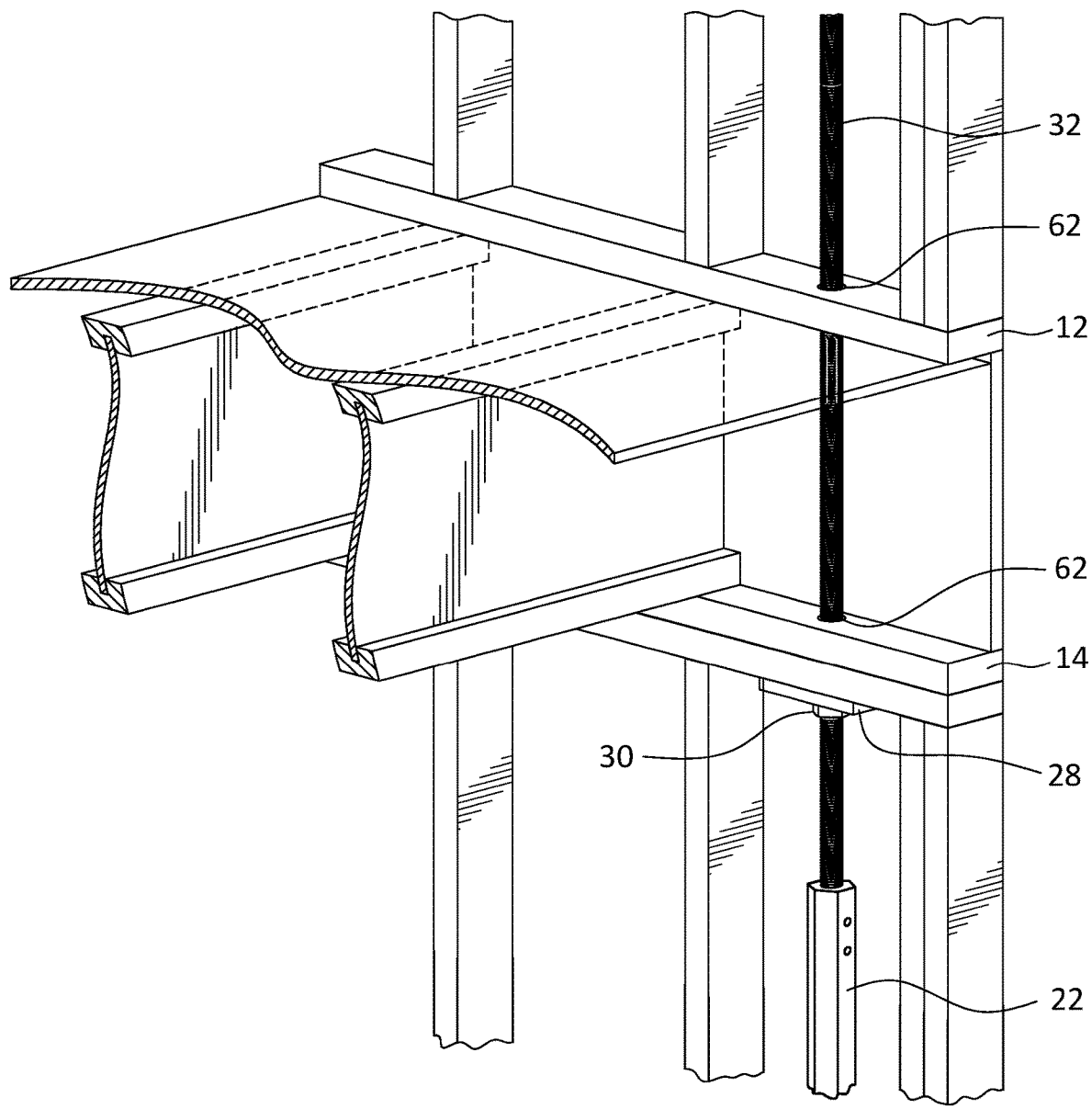
FIGS. 12-13 are enlarged perspective views of portions of the wall of FIG. 11.
Figure 13:
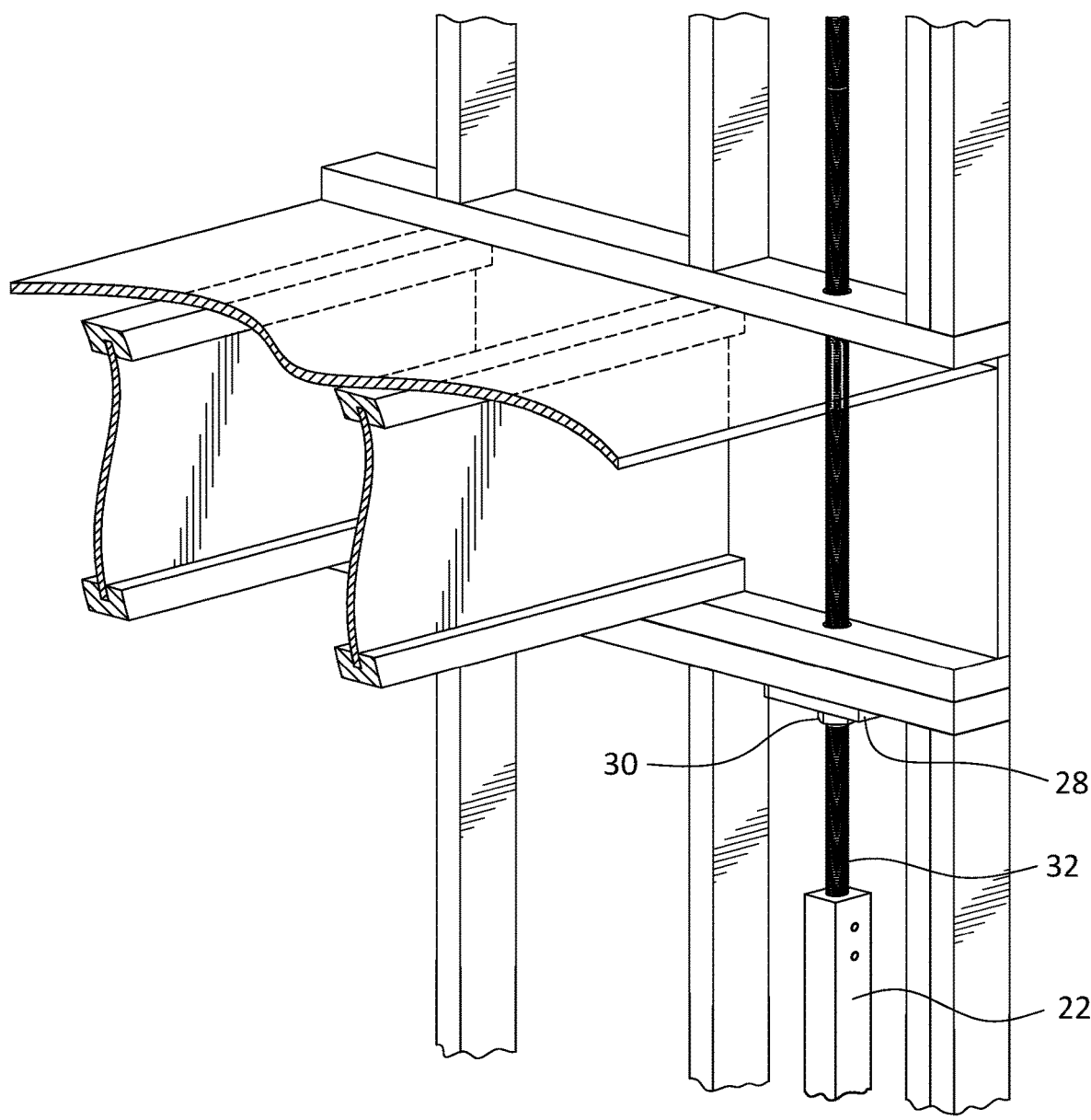

Referring to FIGS. 11-13, the embodiments provided by FIGS. 1-8 may be modified with the elimination of the bearing plate 28 and the nut 30 on the bottom plate 12 of the upper wall 6. Tension loading is carried by the bearing plate 28 on the top plate 14 in the upper wall 6. The intermediate threaded rod 26 may be omitted and the tie rod 32 connected directly to the compression rod 22. The tie rod 32 extends through oversized openings 62 in the top plate 14 and the bottom plate 12. Compression (downward direction) forces on the tie rod 32 are advantageously transferred to the compression rod 22 through the bearing plate 28 and the nut 30. The oversized openings 62 advantageously provides clearance to prevent or lessen the likelihood of the tie rod 32 getting caught and bowing as the wall moves relative to the tie rod 32 during uplift or downward motion of the wall caused by winds, storms, earthquake, etc. The compression rod 22, which is shown as hexagonal or square, is also applicable to the embodiments of FIGS. 1-10 and all other embodiments disclosed herein using the compression rod 22. The compression rod 22 may also be of any cross-sectional shape.

Figure 14:
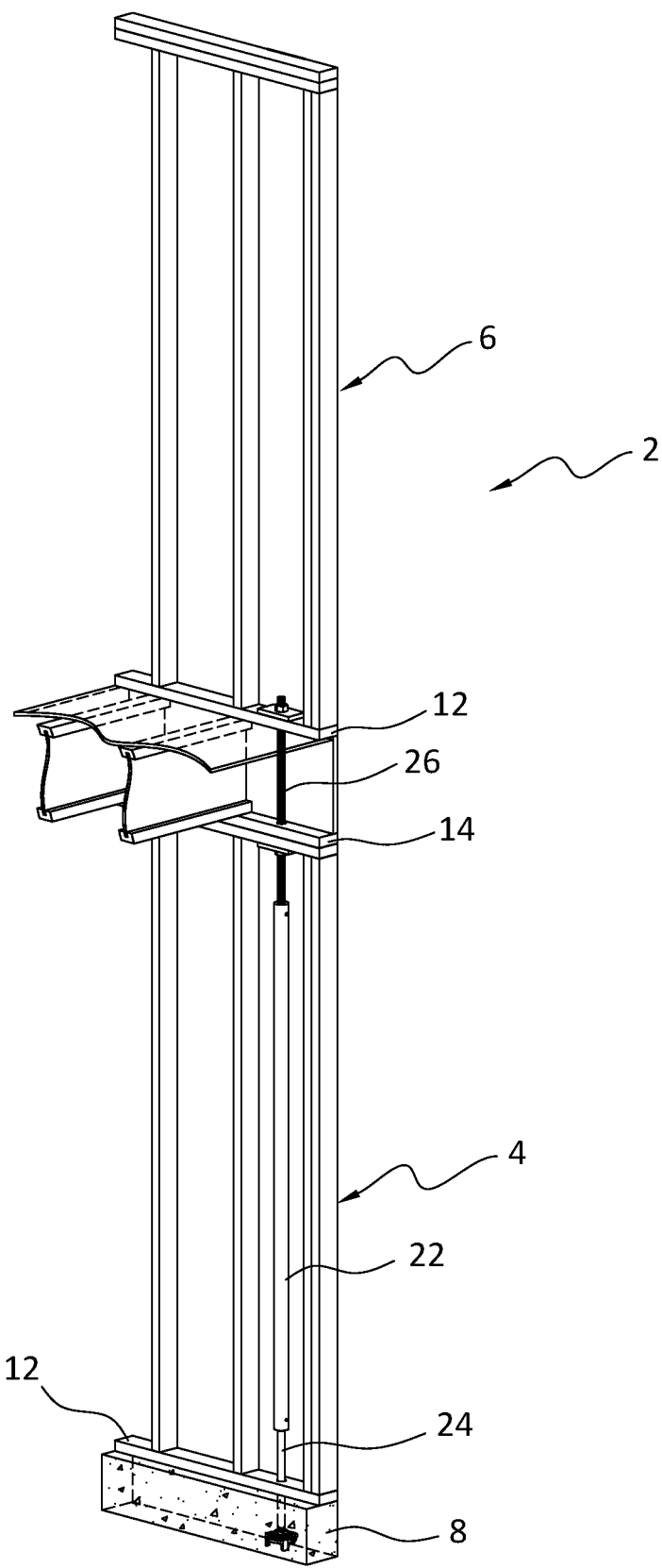
FIG. 14 is a perspective fragmentary view of a stud-framed building wall, incorporating another embodiment of the present invention.
Figure 15:
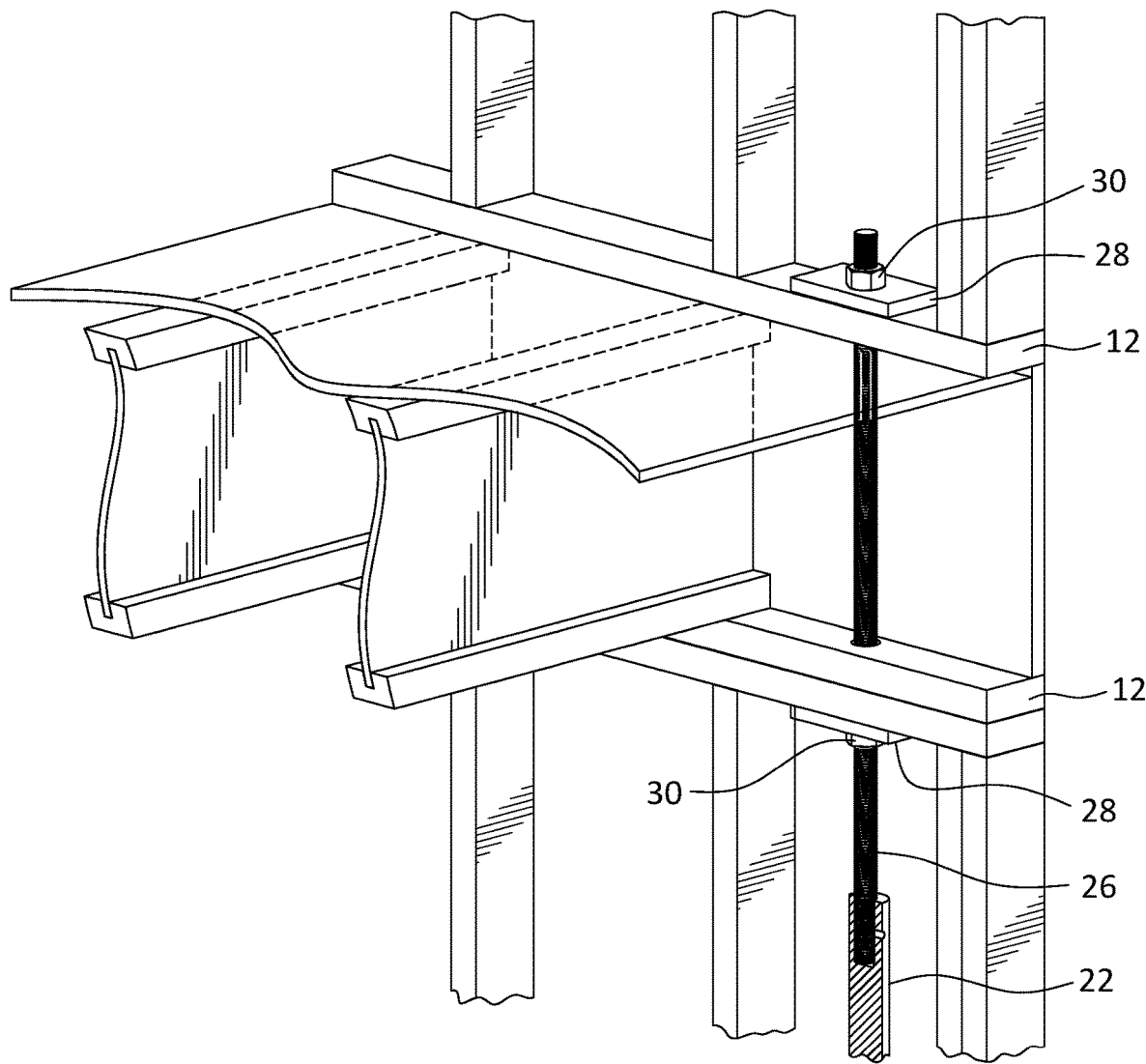
FIG. 15 is an enlarged perspective view of a portion of the wall of FIG. 14.

Referring to FIGS. 14 and 15, the embodiments of FIGS. 1-13 may be modified with the elimination of the tie rod 32 that connects to the top plate 14 of the upper wall 6. The compression rod 22 is connected to the top plate 14 of the lower wall 4 and the bottom plate 12 of the upper wall 6 with the bearing plates 28 and the nuts 30. The wall shown is designed for compression and tension forces. Tension forces from the upper wall 6 is advantageously transferred to the upper bearing plate 28 and compression forces on the lower bearing plate 28.

Figure 16:
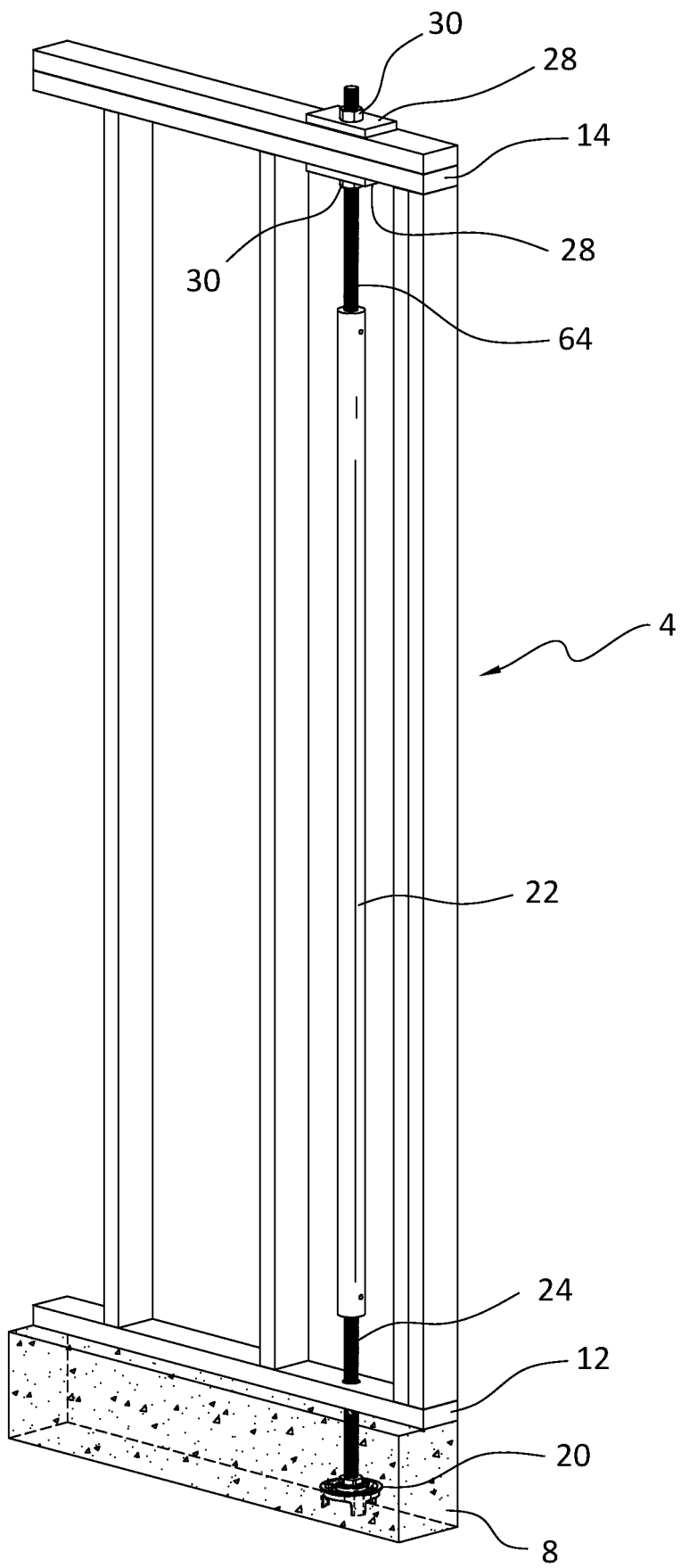
FIG. 16 is a perspective fragmentary view of a stud-framed building wall, incorporating another embodiment of the present invention.

Referring to FIG. 16, the embodiment of FIG. 14 is modified by attaching the upper bearing plate 28 to the top side of the top plate 14. The compression rod 22 is connected to the top plate 14 of the lower wall 4 with a threaded rod 64 and the bearing plates 28 and the nuts 30. The wall is configured to take compression forces through the lower bearing plate 28 and tension forces through the upper bearing plate 28.

Figure 17A:
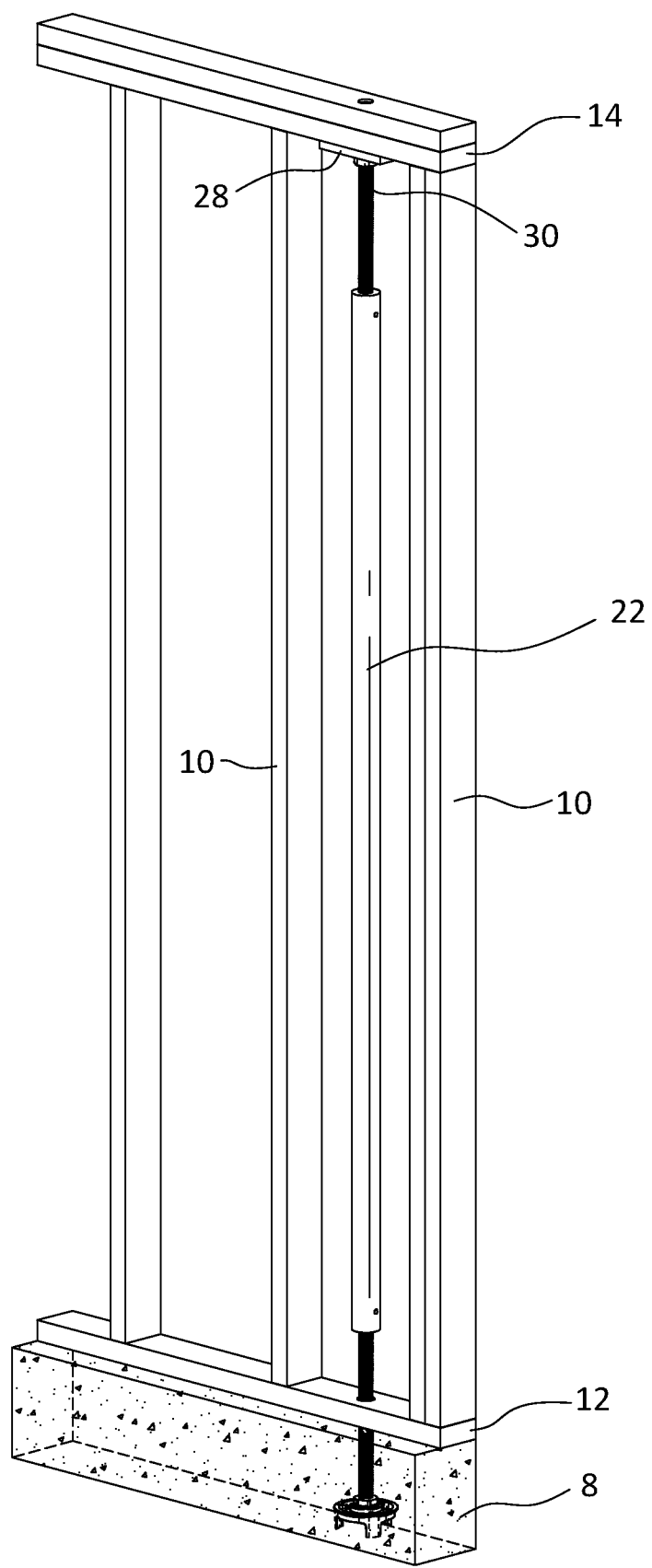
FIG. 17A a perspective fragmentary view of a stud-framed building wall, incorporating another embodiment of the present invention.
Figure 17B:
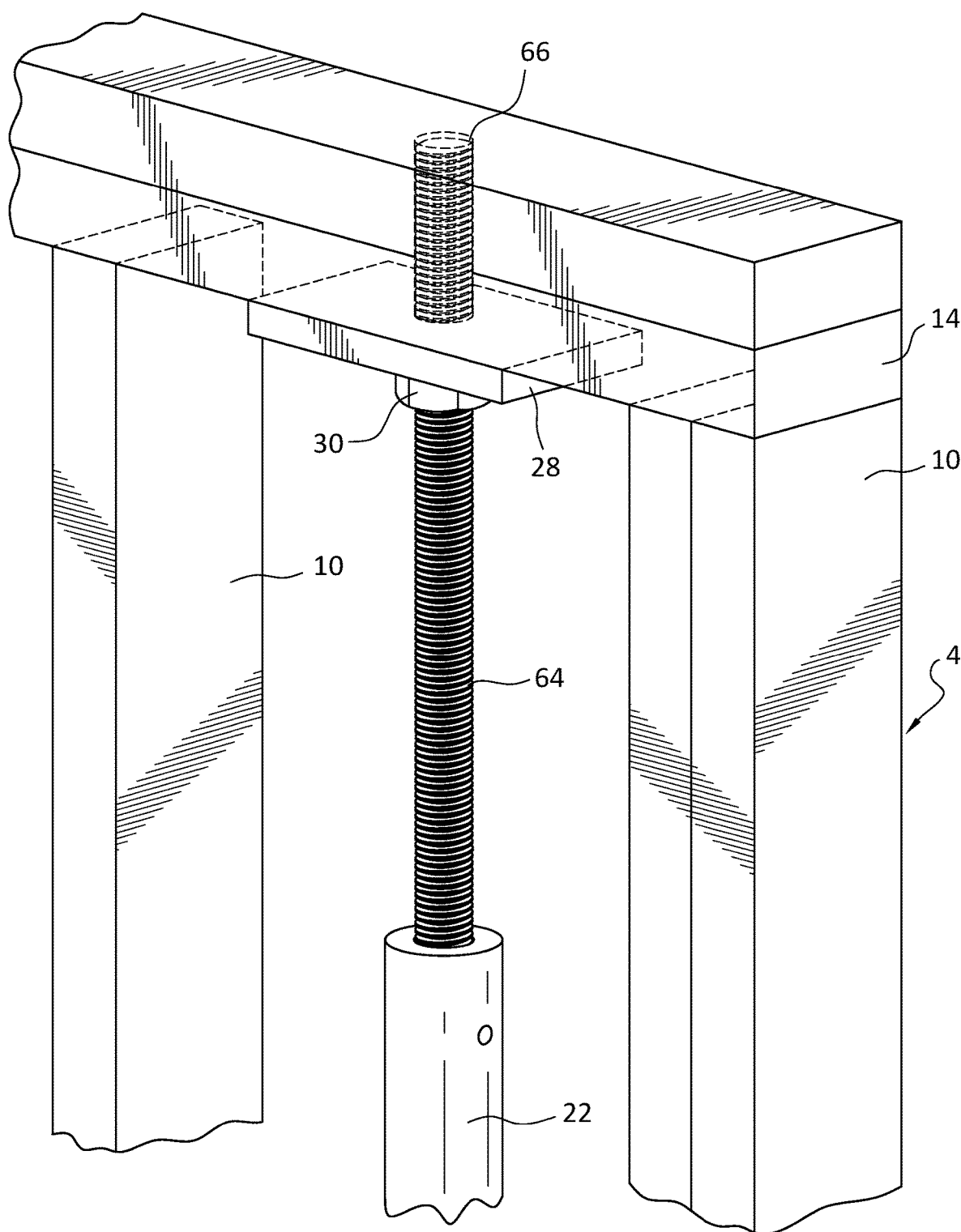
Figure 18:
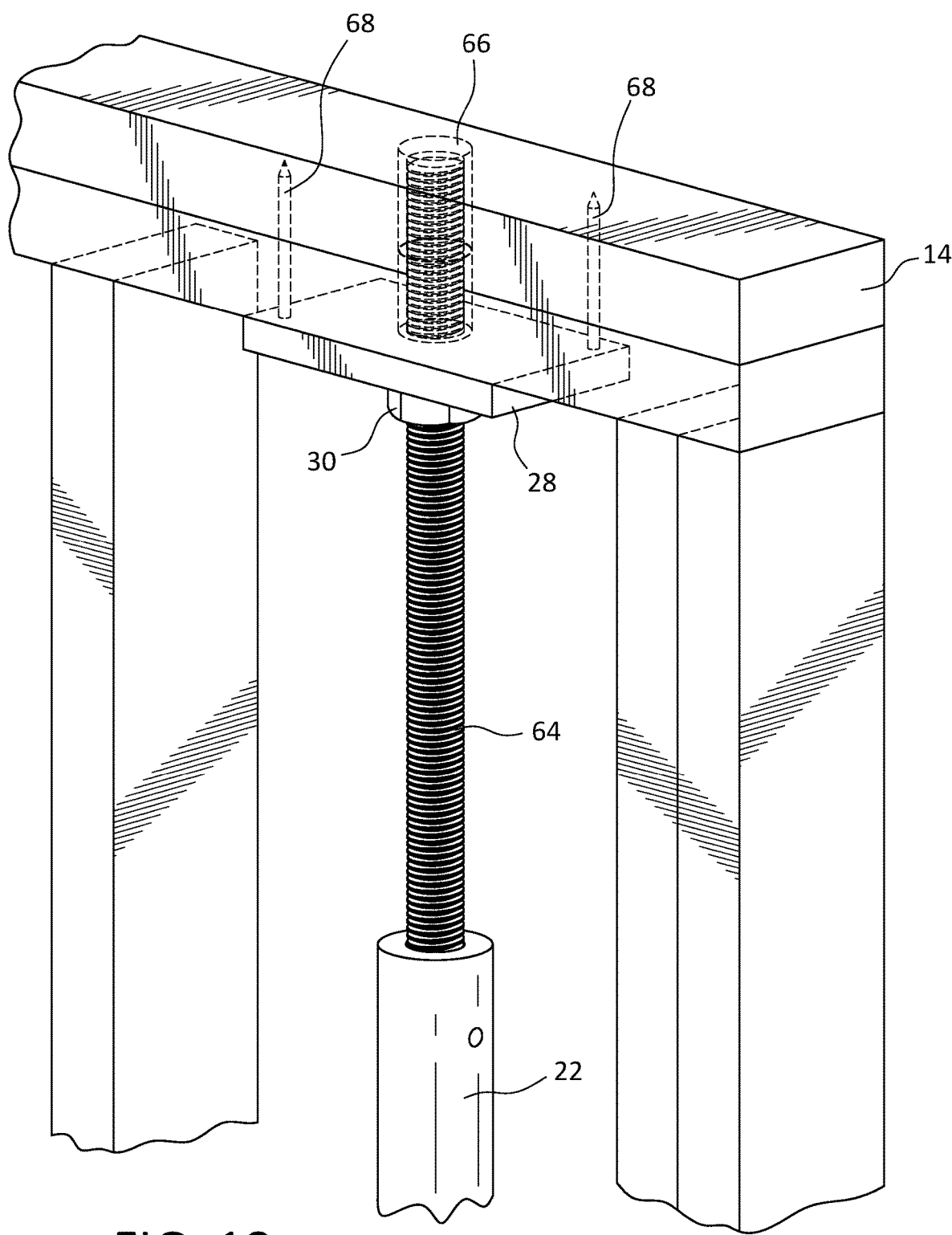

Referring to FIGS. 17A, 17B and 18, the embodiment of FIG. 16 is modified with the elimination of the upper bearing plate 28. The threaded rod 64 is only connected to the underside of the top plate 14 to handle compression forces from the top plate 14. The upper end of the threaded rod 64 is received within an opening 66 in the top plate 14. Compression (downward direction) load from the wall is transferred to the compression rod 22 via the bearing plate 28 and the nut 30. The bearing plate 28 may be attached to the top plate 14 with nails 68 or screws, as shown in FIG. 18.

The opening in the bearing plate 28 may be threaded, as shown in FIG. 6, in which case the nut 30 is eliminated. The end of the rod 64 may penetrate the opening partway, or flush at the other side of the plate or past the opening. The opening may also be an unthreaded blind hole with the top end of the rod 64 bearing on the floor of the blind hole to transfer compression forces (downward direction) to the rod 64 and the compression rod 22.

Figure 19:
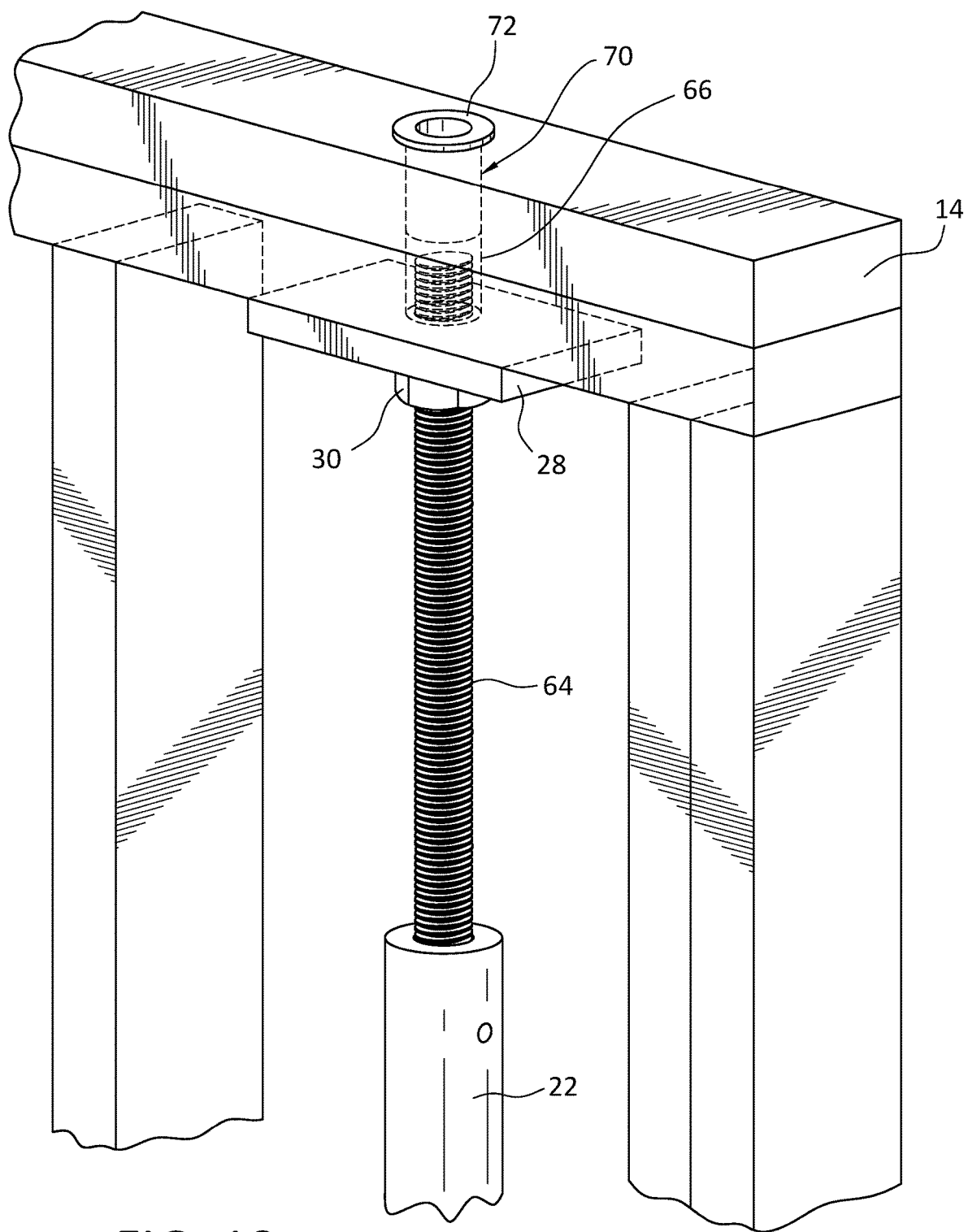

Referring to FIG. 19, the embodiment of FIG. 17A is modified with the addition of a flanged sleeve 70 disposed in the opening 66. The sleeve 70 advantageously provides a smooth opening through which the rod 64 can move through as the wall compresses without binding. The sleeve 70 includes a flange 72 that is supported by the top surface of the top plate 14 around the opening 66. The sleeve 70 may also be threaded to the rod 64 to resist tension loading (uplift forces) via the flange 72 bearing on the top plate 14.

Referring to FIGS. 20-27, the compression rod 22 shown in FIGS. 1-19 may be modified into two pieces—compression rod 74 and compression rod 76—joined end to end. This advantageously provides for easier handling during installation as each of the compression rods 74 and 76 would weigh less than a single compression rod 22 and would be shorter in length, providing for easier handling.

Figure 7:
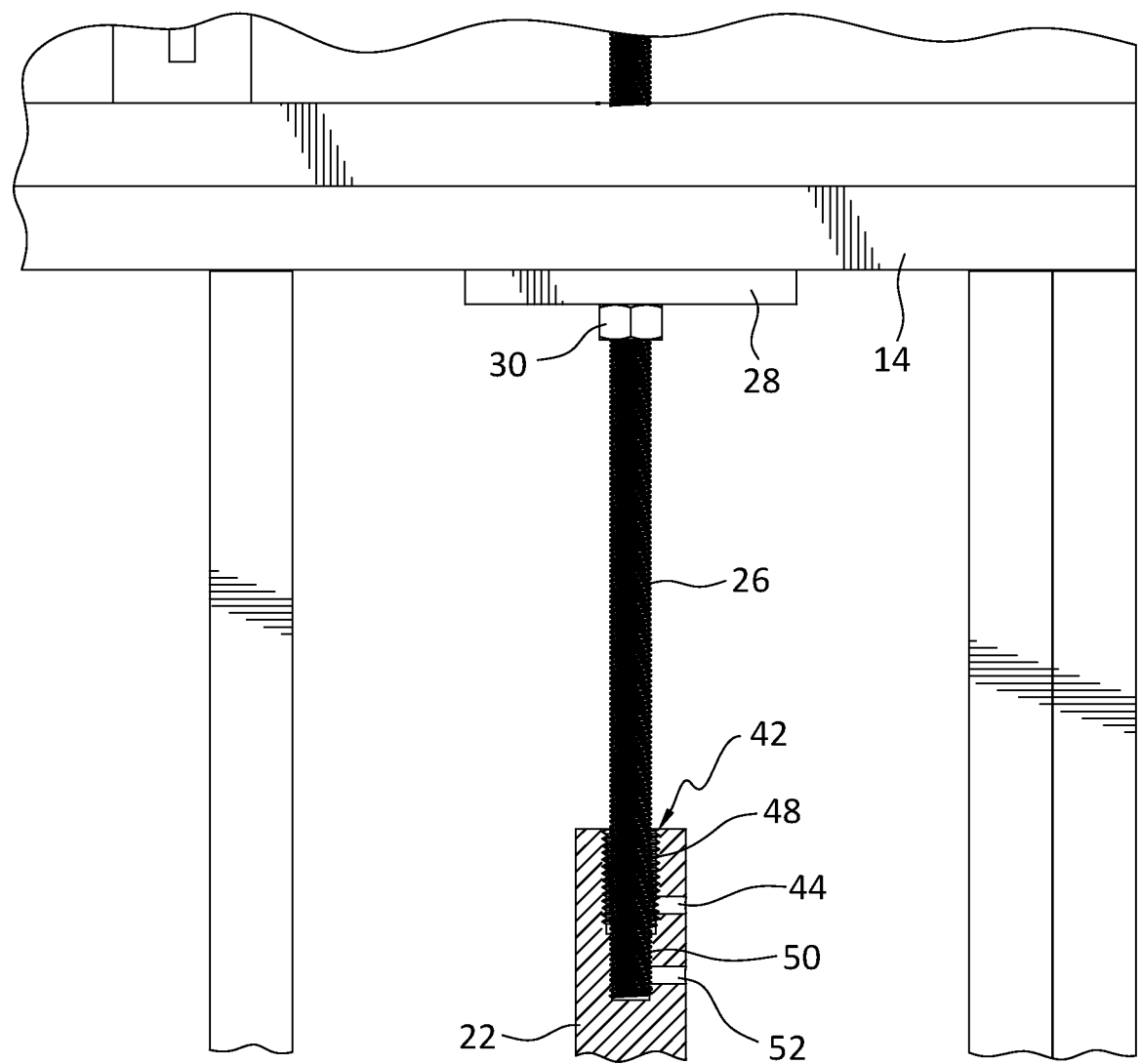
Figure 20:
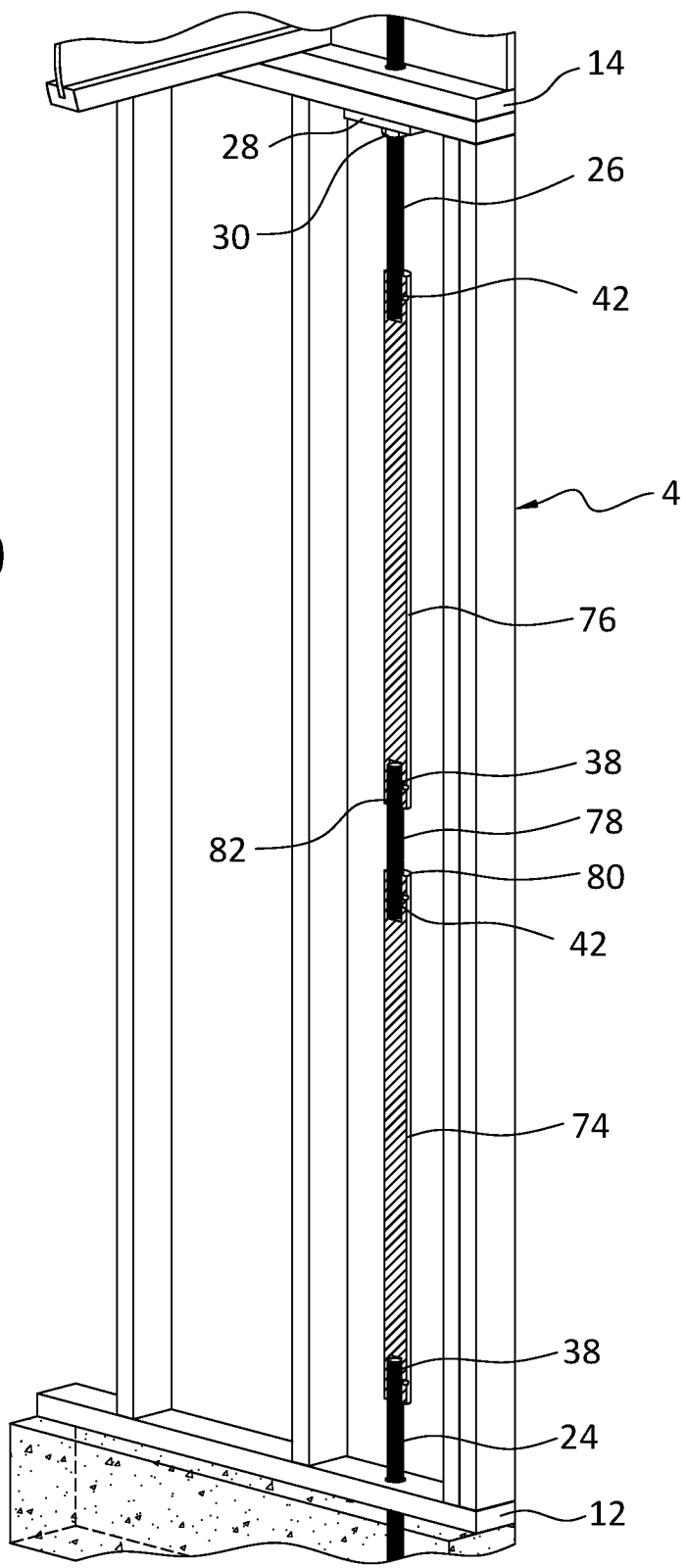
FIG. 20 a perspective fragmentary view of a stud-framed building wall, incorporating another embodiment of the present invention.

Referring to FIG. 20, the top edge 80 of the compression rod 74 is spaced from the bottom edge 82 of the compression rod 76. Each of the compression rods 74 and 76 is made the same as the single compression rod 22 shown in FIGS. 1-19. The threaded bores 38 and 42 may be single diameter or multi-diameter as shown in FIGS. 7 and 8.

Figure 21:
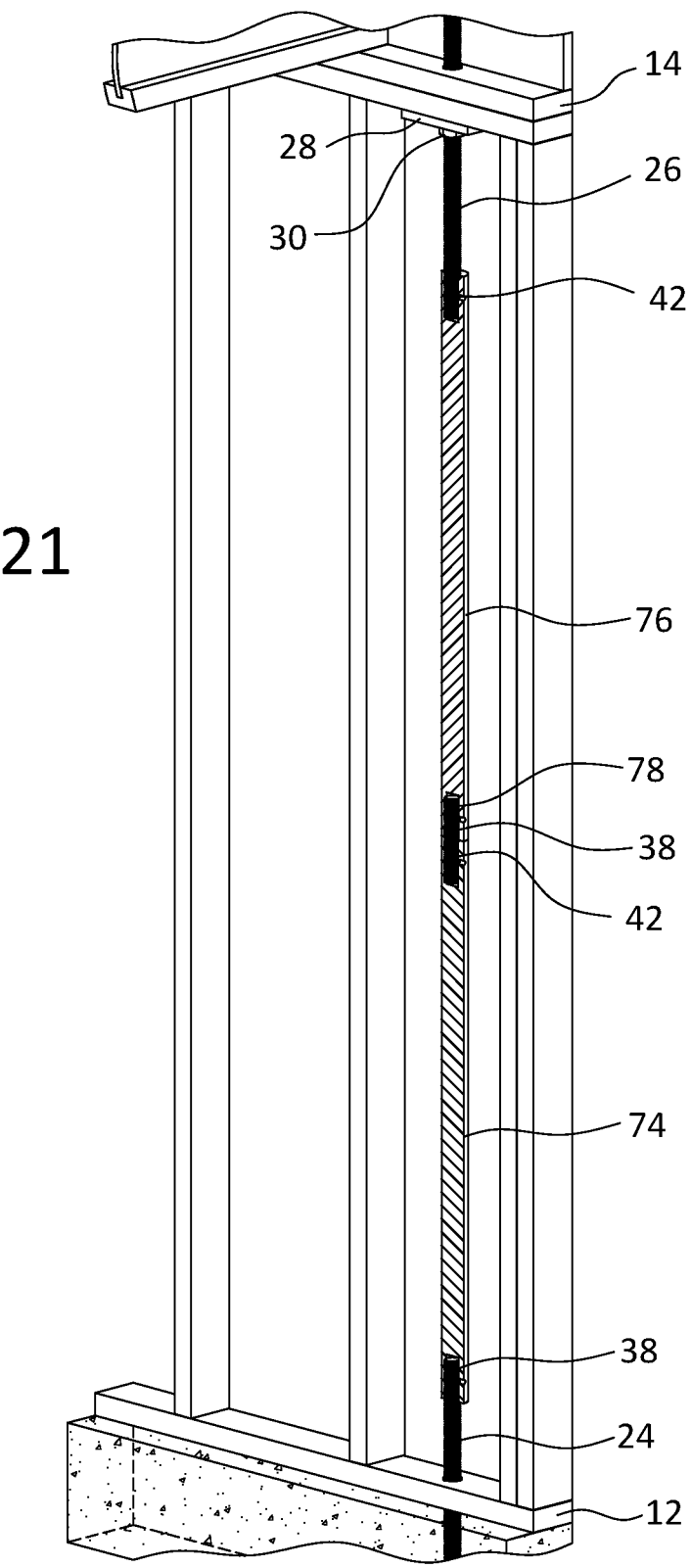
FIGS. 21-26 are perspective fragmentary views of a stud-framed building wall, incorporating modifications to the wall of FIG. 20.

Referring to FIG. 21, the joint between the compression rods 74 and 76 shown in FIG. 20 may be modified by using a shorter threaded rod 78 so that the top edge 80 of the compression rod 74 and bottom edge 82 of the compression rod 76 bear on each other when the threaded rod 78 is threaded to the threaded bores 38 and 72. In this arrangement, the compression forces from the upper compression rod 76 are transferred to the lower compression rod 74 via the threaded engagement of the threaded rod 78 with the compression rods 74 and 76 and the bearing engagement of the top and bottom edges 80 and 82.

Figure 22:
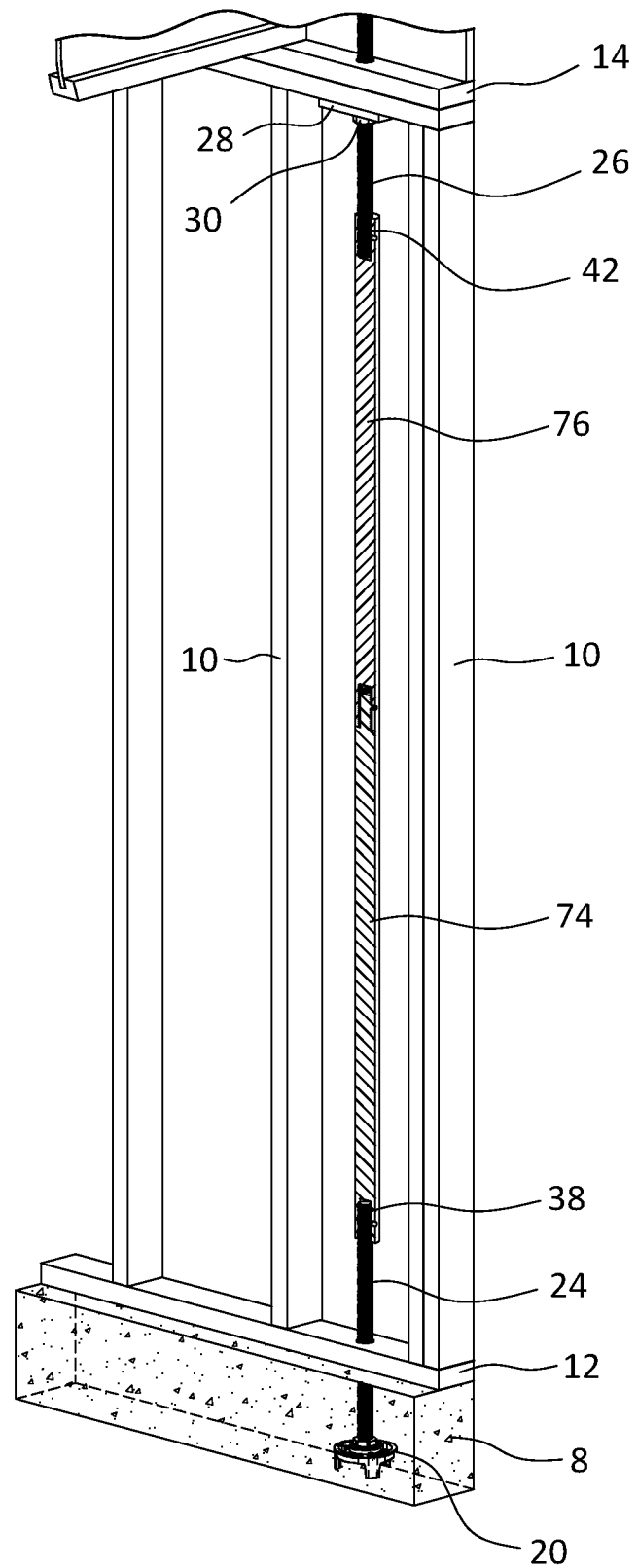
Figure 23:
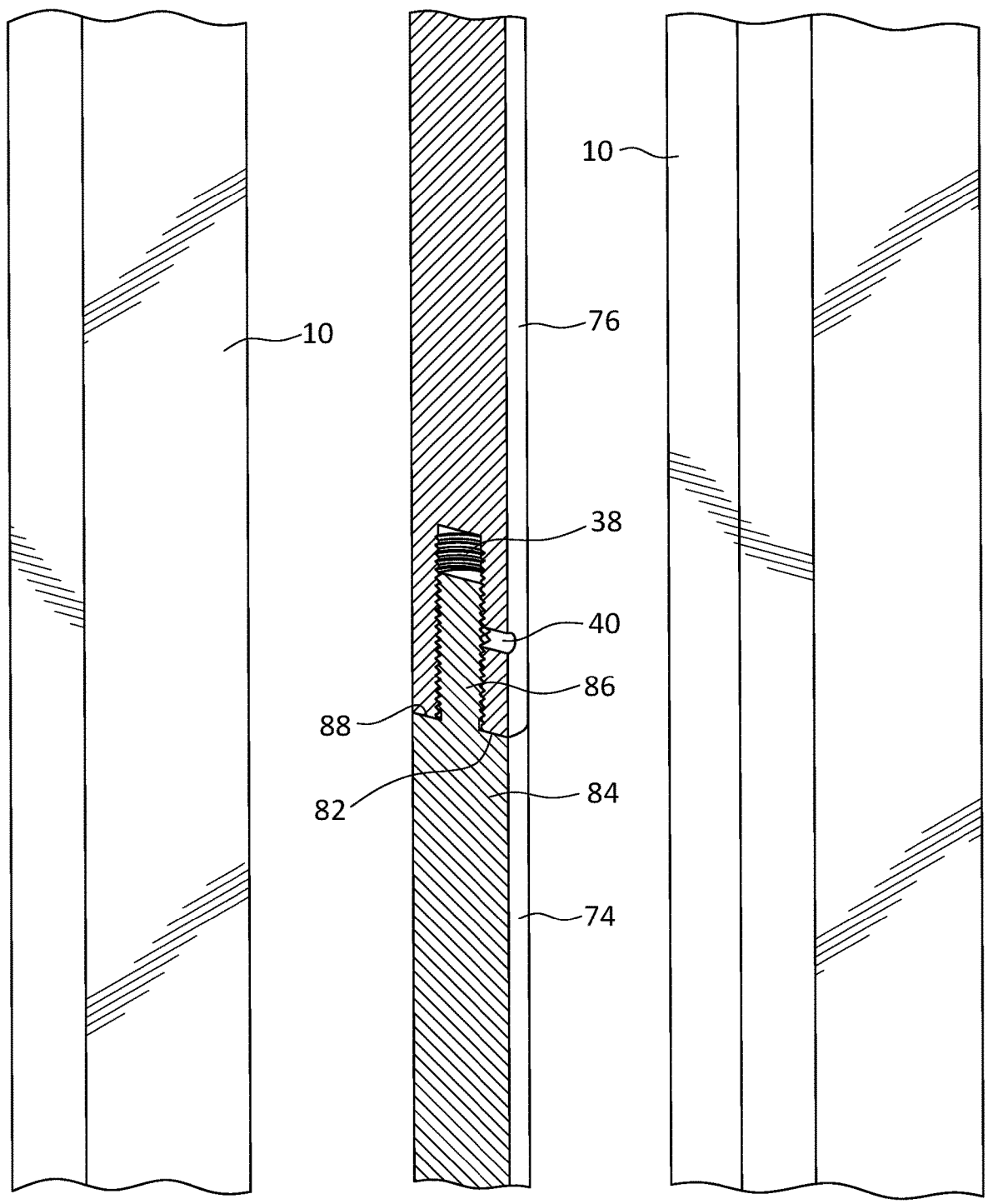

Referring to FIGS. 22 and 23, the joint between the compression rods 74 and 76 shown in FIG. 20 may be modified by providing the upper end portion 84 of the compression rod 74 with a reduced diameter, outside threaded portion 86 for being threaded to the threaded bore 38 of the upper compression rod 76. The end portion 84 has circumferential flange 88 that bears against the bottom edge 82 of the compression rod 76. The sight hole 40 advantageously insures sufficient engagement of the threaded portion 86 inside the threaded bore 38. The compression forces from the upper compression rod 76 are transferred to the lower compression rod 74 via the threaded engagement of the threaded portion 86 with the compression rod 76 and the bearing engagement of the surfaces 82 and 88.

Figure 24:
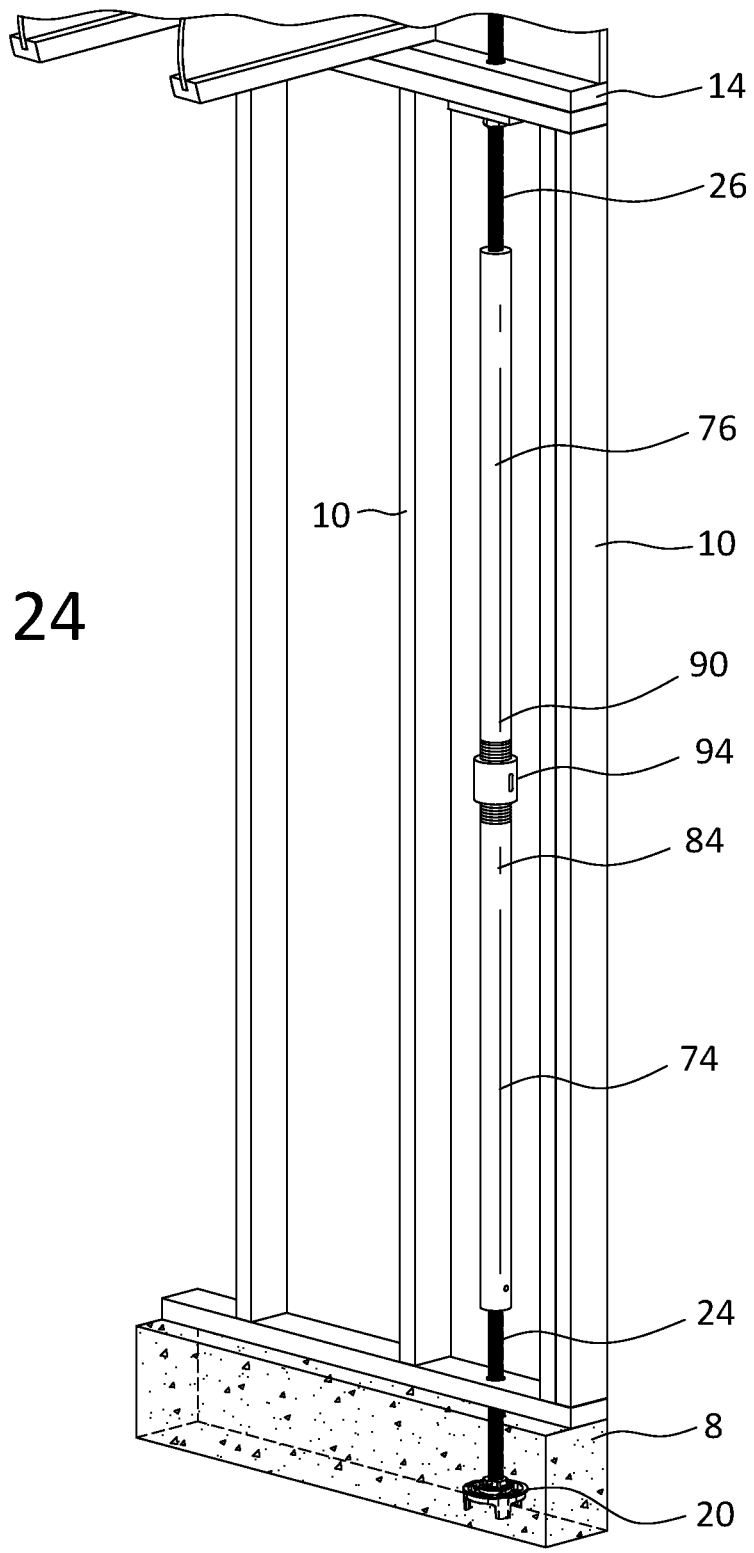
Figure 25:
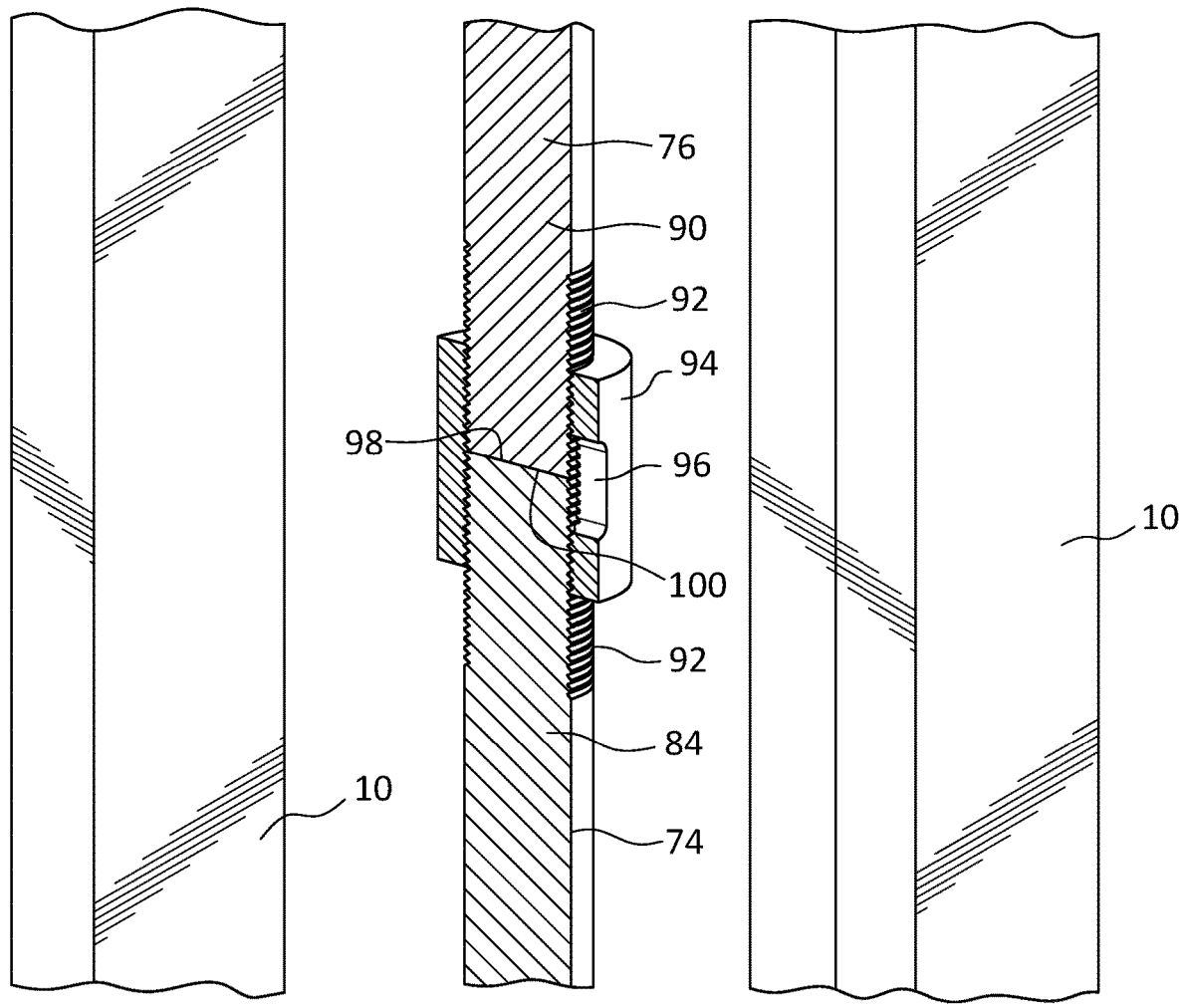

Referring to FIGS. 24 and 25, the joint between the compression rods 74 and 76 shown in FIG. 20 may be modified by providing the upper end portion 84 of the compression rod 74 and the lower end portion 90 of the compression rod 76 with outside threads 92 and connecting the two ends together with a coupling 94, which is preferably cylindrical with a longitudinal slot 96 that provides an inspection opening for the top surface 98 of the lower compression rod 74 and the bottom surface 100 of the upper compression rod 76. The slot 96 advantageously provides a way for visually checking the extent of travel of the threads 92 inside the coupling 94. The surfaces 98 and 100 are preferably engaging each other inside the coupling 94. The slot 96 is preferably centered on the length of the coupling 94.

Figure 26:
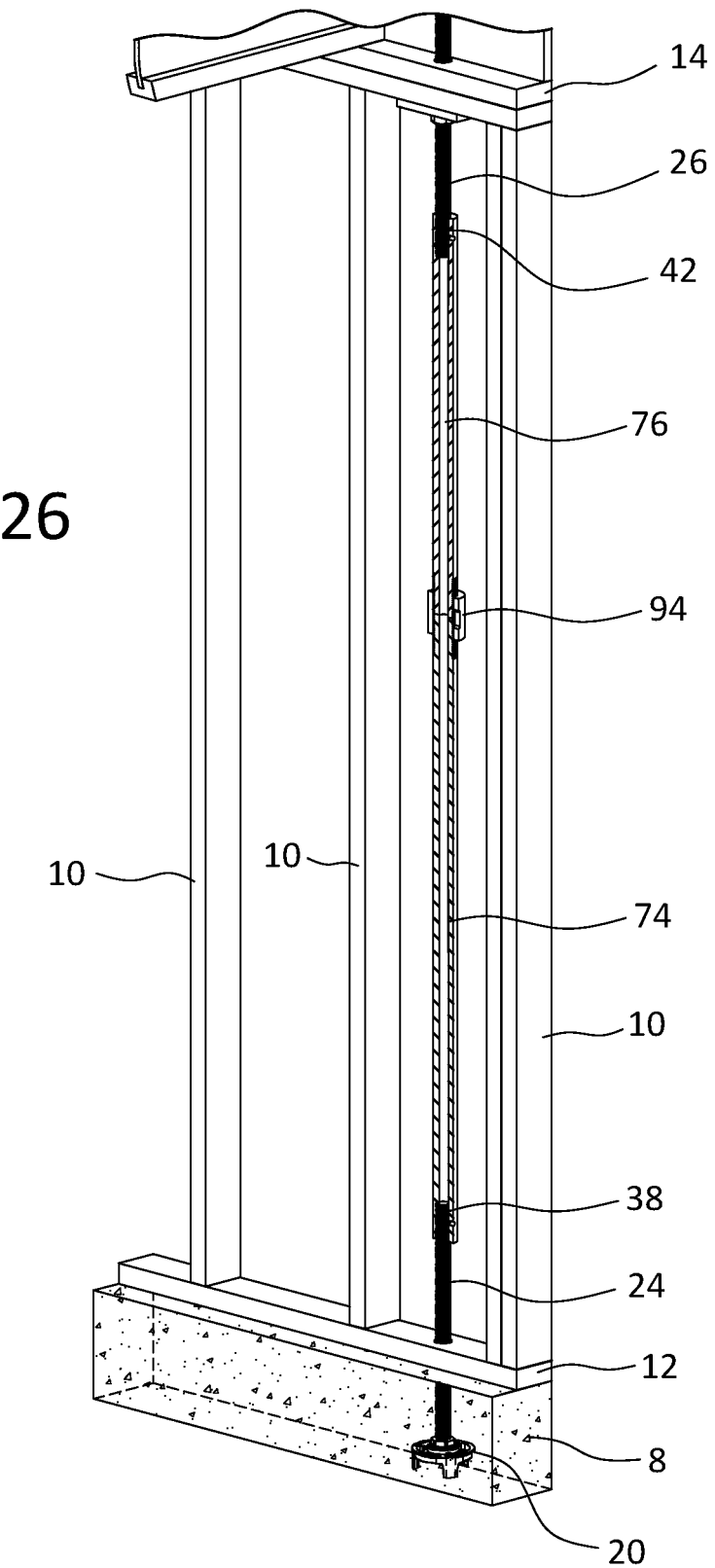
Figure 27:
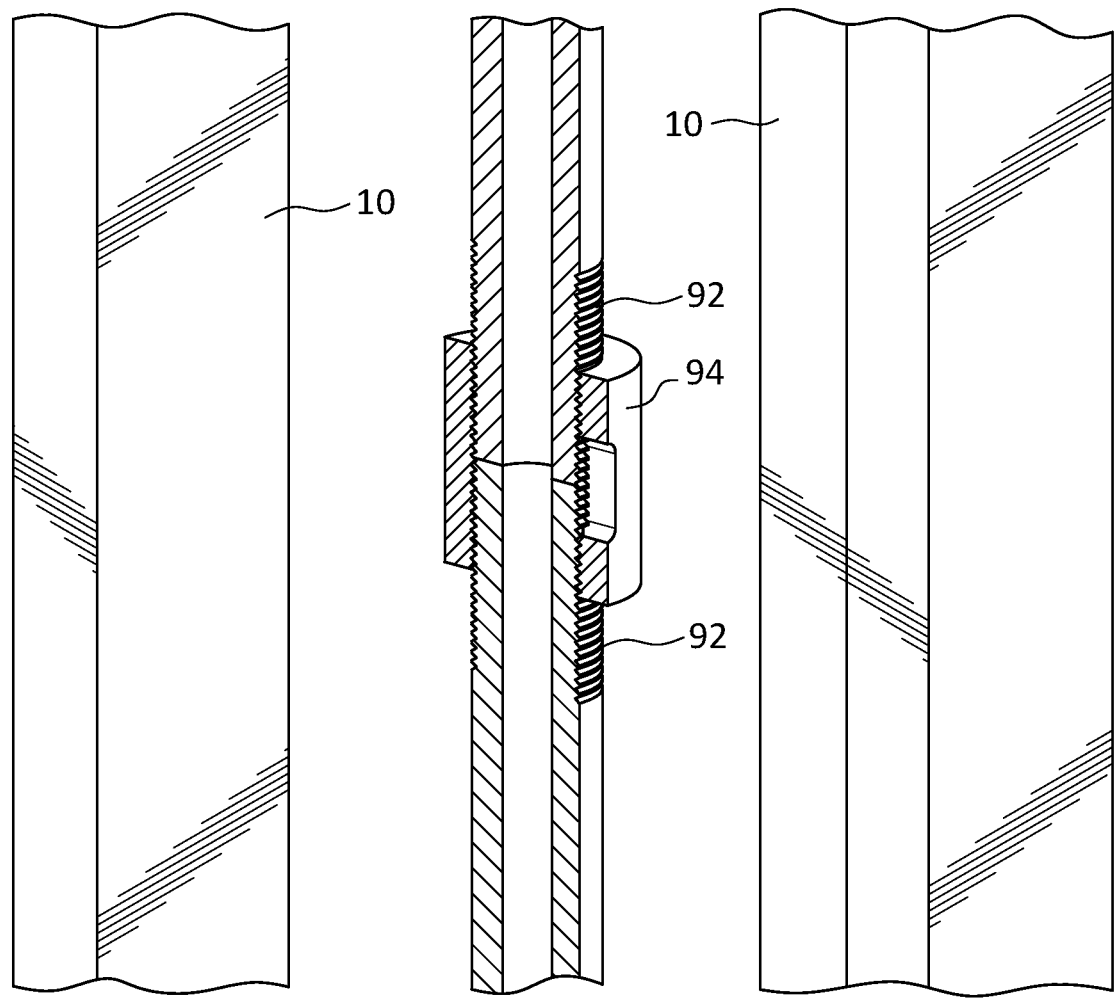
FIG. 27 is an enlarged perspective view of a portion of the wall of FIG. 25.

Referring to FIGS. 26 and 27, the compression rods 74 and 76 shown in FIGS. 24 and 25 may be tubular joined by the coupling 94. The abutting ends of the compression rods 74 and 76 may also be connected using the configuration shown in FIG. 21, where the abutting ends are provided with threaded bores 38 and 42 and joined to a threaded rod 78. The opposing ends of the compression rods 74 and 76 may be provided with inside threads and joined in the manner shown in FIGS. 20 and 21 with the threaded rod 78.

It should be understood that the compression rods 74 and 76 may be attached to the foundation and the wall structure in the same way as already disclosed above, as for example shown in FIGS. 1-19.

Figure 28:
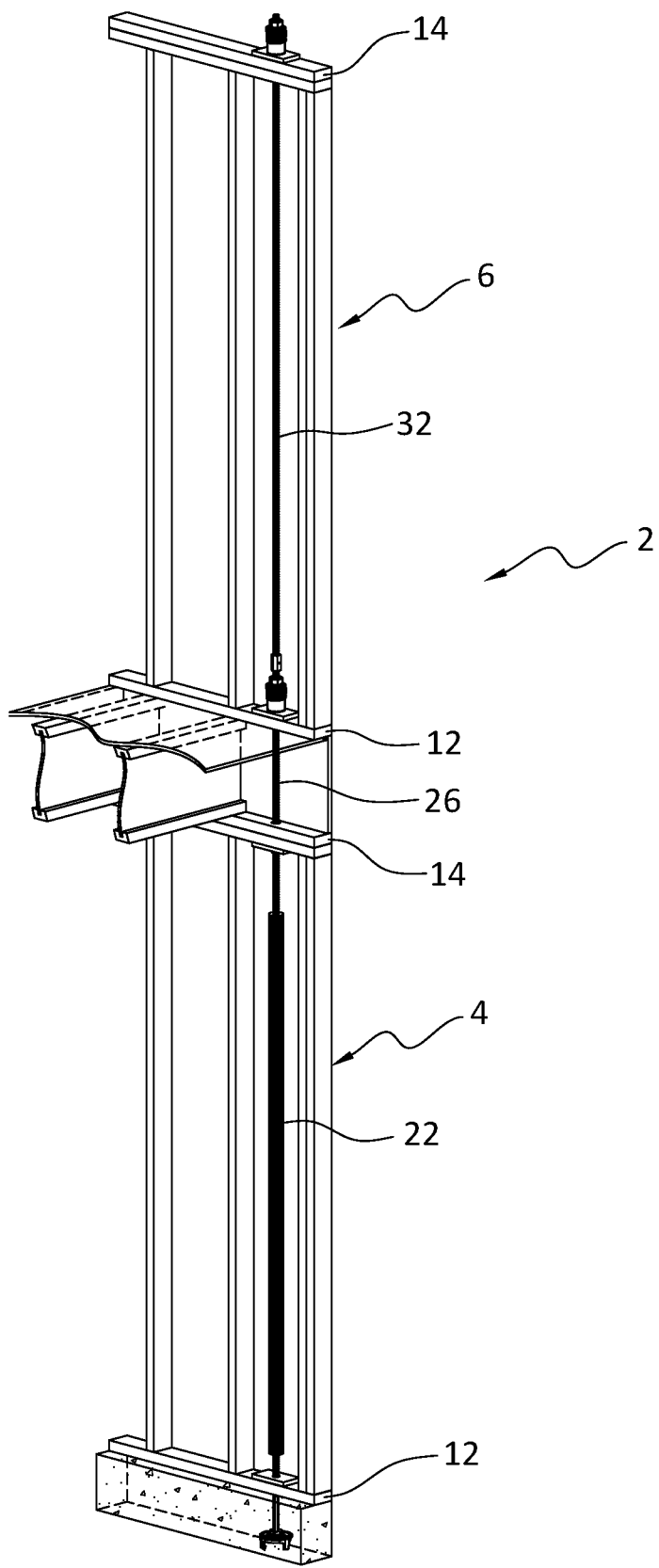
FIG. 28 is a perspective fragmentary view of a stud-framed building wall, incorporating another embodiment of the present invention.
Figure 29:
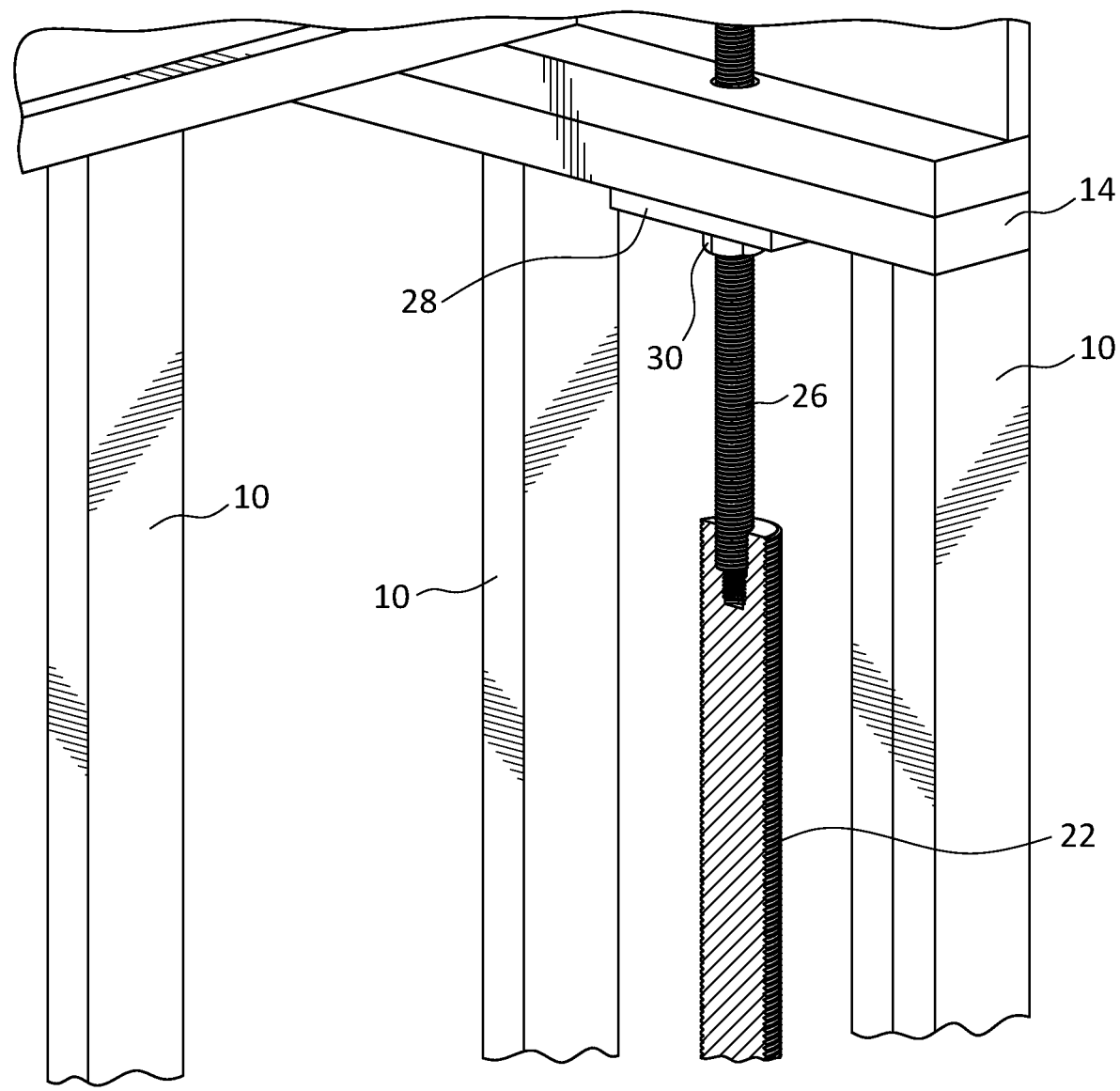
FIG. 29 is an enlarged perspective view of a portion of the wall of FIG. 28.

Referring to FIGS. 28 and 29, the compression rod 22 shown in FIGS. 1-19 or the two-piece compression rods 74 and 76 shown in FIGS. 20-27 may be threaded throughout their entire length.

Figure 30:
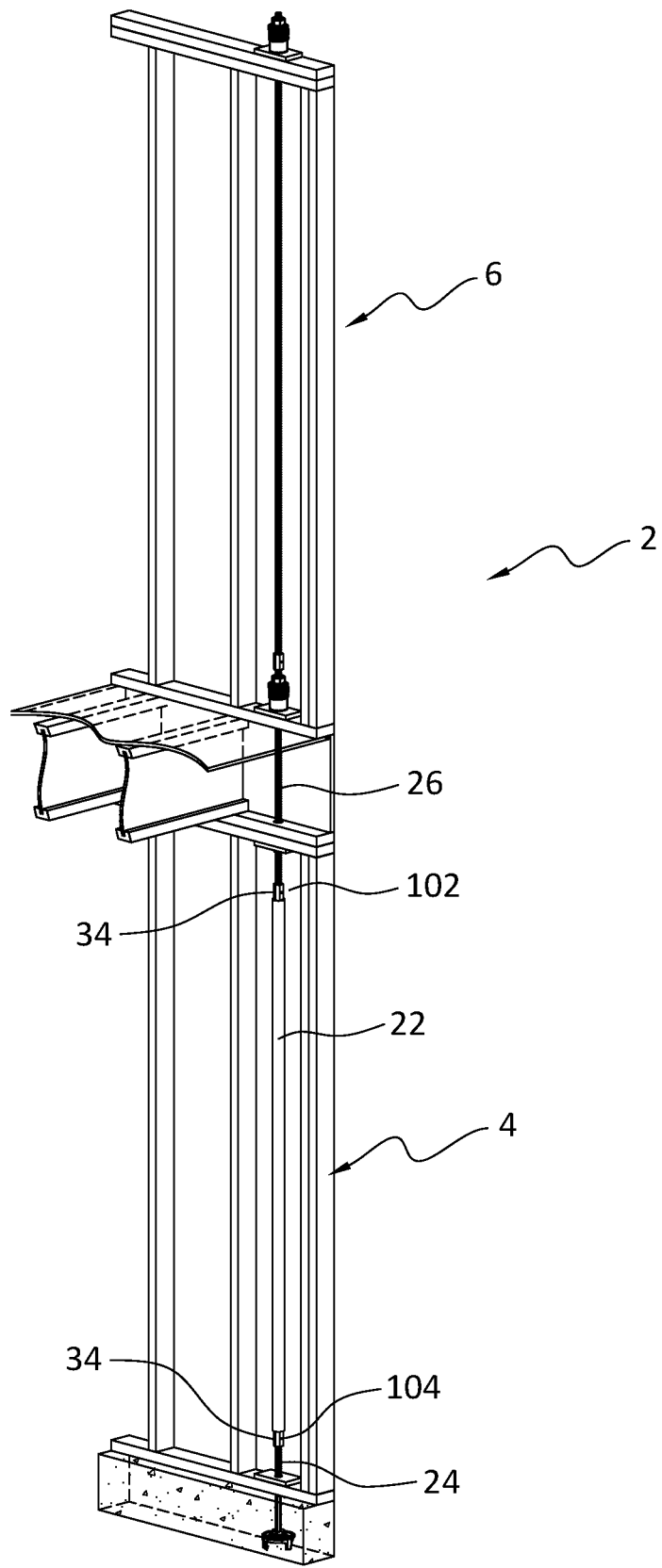
FIG. 30 is perspective fragmentary view of a stud-framed building wall, incorporating another embodiment of the present invention.
Figure 31:
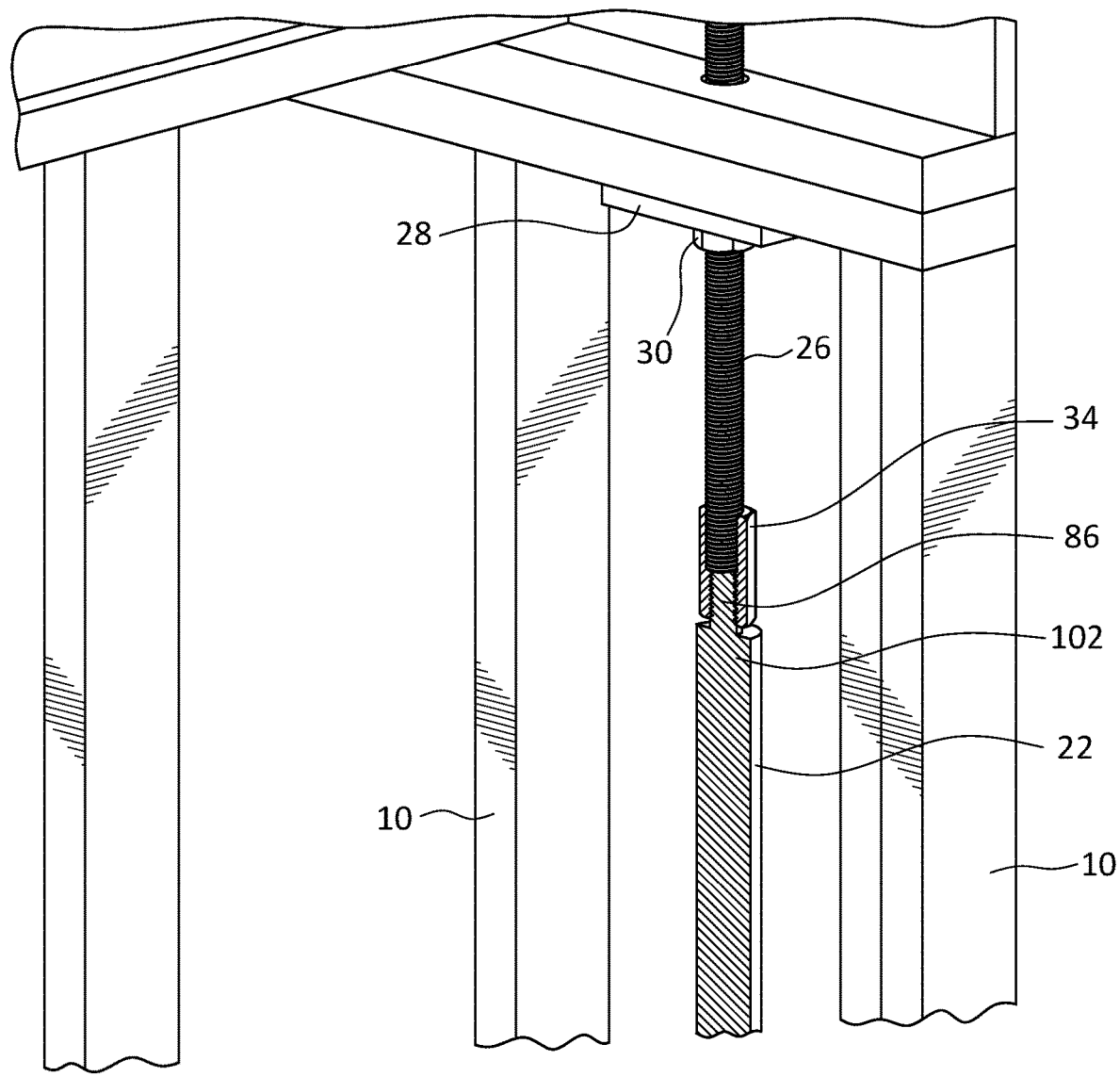
FIG. 31 is an enlarged perspective view of a portion of the wall of FIG. 30.

Referring to FIGS. 30 and 31, the compression rod 22 shown in FIGS. 1-19 or the two-piece compression rods 74 and 76 shown in FIGS. 20-27 may be modified where the end portions 102 and 104 are provided with respective reduced diameter, outside threaded portions 86 connected to the anchor rod 24 and the intermediate threaded rod 26 with the respective couplings 34.

Figure 32:
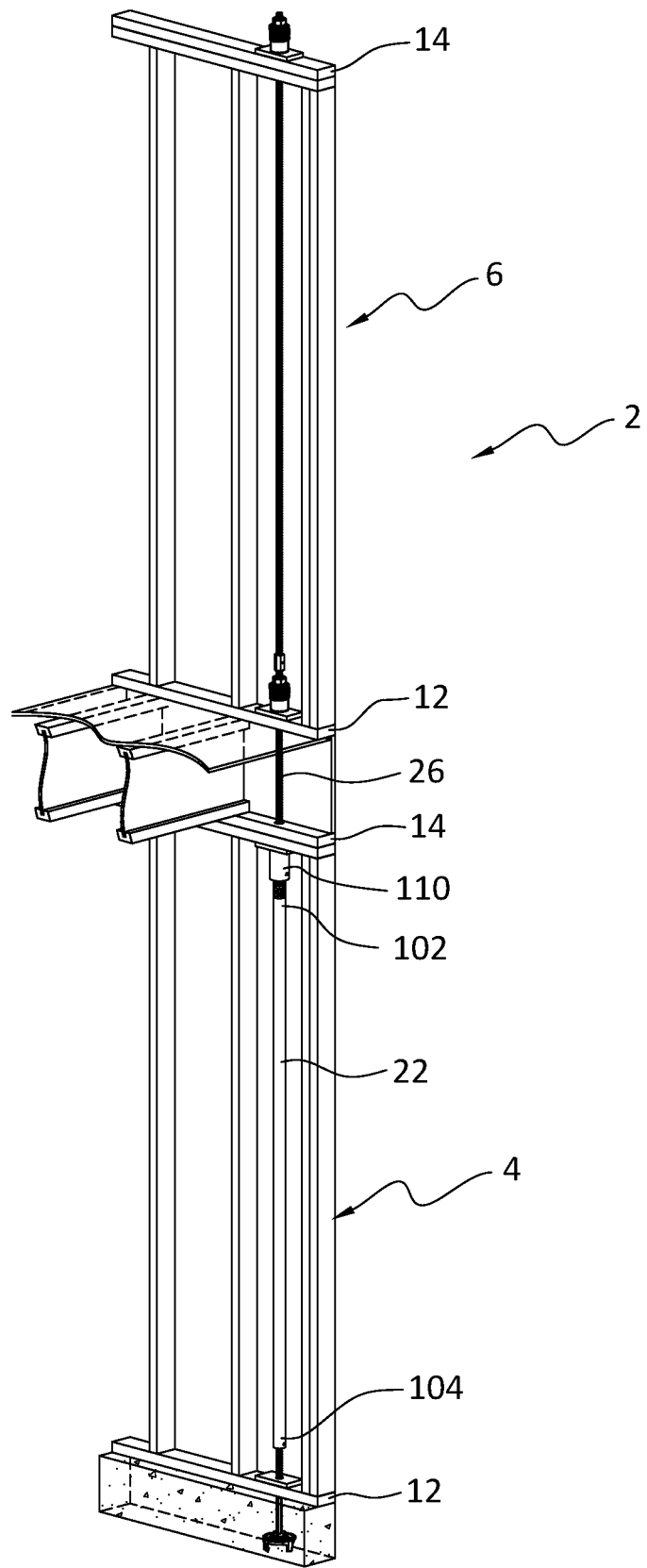
FIG. 32 is perspective fragmentary view of a stud-framed building wall, incorporating another embodiment of the present invention.
Figure 33:
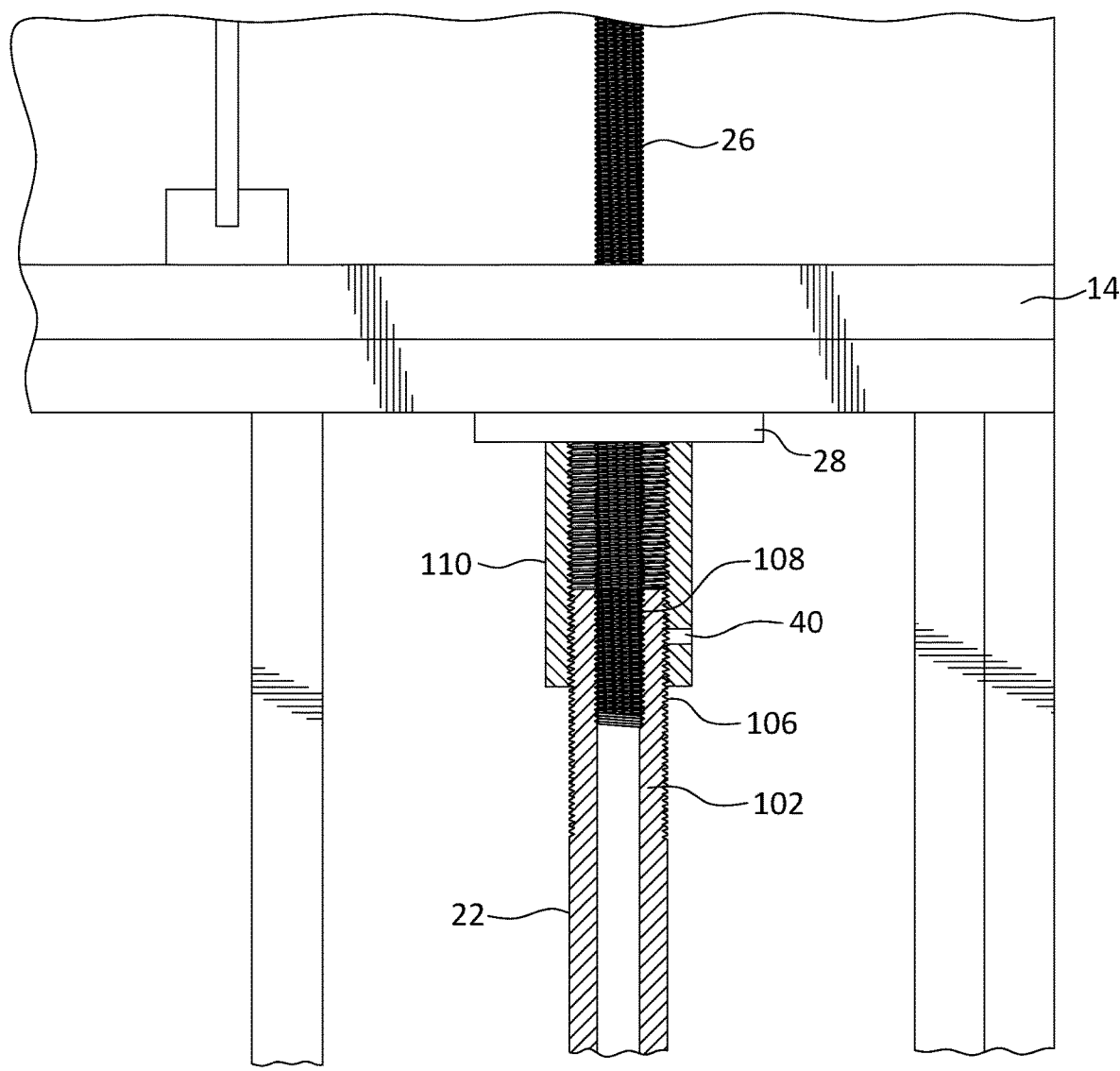
FIGS. 33-39B are enlarged perspective views of portions of the wall of FIG. 32, some shown with modifications.
Figure 34:
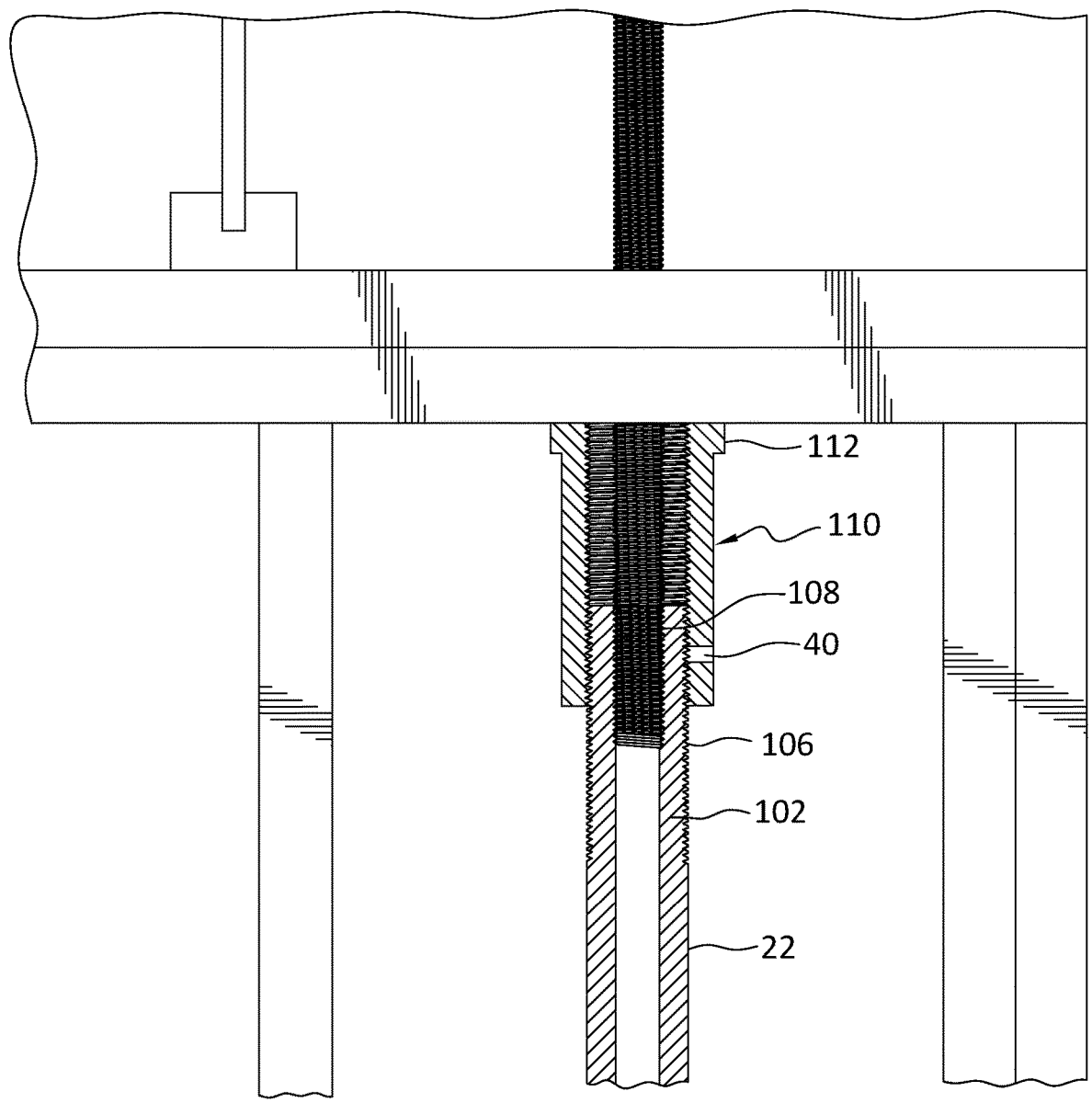

Referring to FIGS. 32, 33 and 34, the connection of the upper end of the compression rod 22 to the top plate 14 shown in FIGS. 1-31 may be modified by providing the end portion 102 of the compression rod 22 with an outside thread 106 in addition to the inside thread 108. A cylindrical coupling 110 connects the compression rod 22 to the intermediate threaded rod 26. The coupling 110 bears against the bearing plate 28. The sight hole 40 provides a visual check on the extent of travel of the threads 106 inside the coupling 110. The nut 30 used in connection with the bearing plate becomes unnecessary with the use of the coupling 110. Referring to FIG. 34, the cylindrical coupling 110 may be modified with a circumferential flange 112 to take the place of the bearing plate 28. The compression rod 22 may be solid or tubular.

Figure 35:
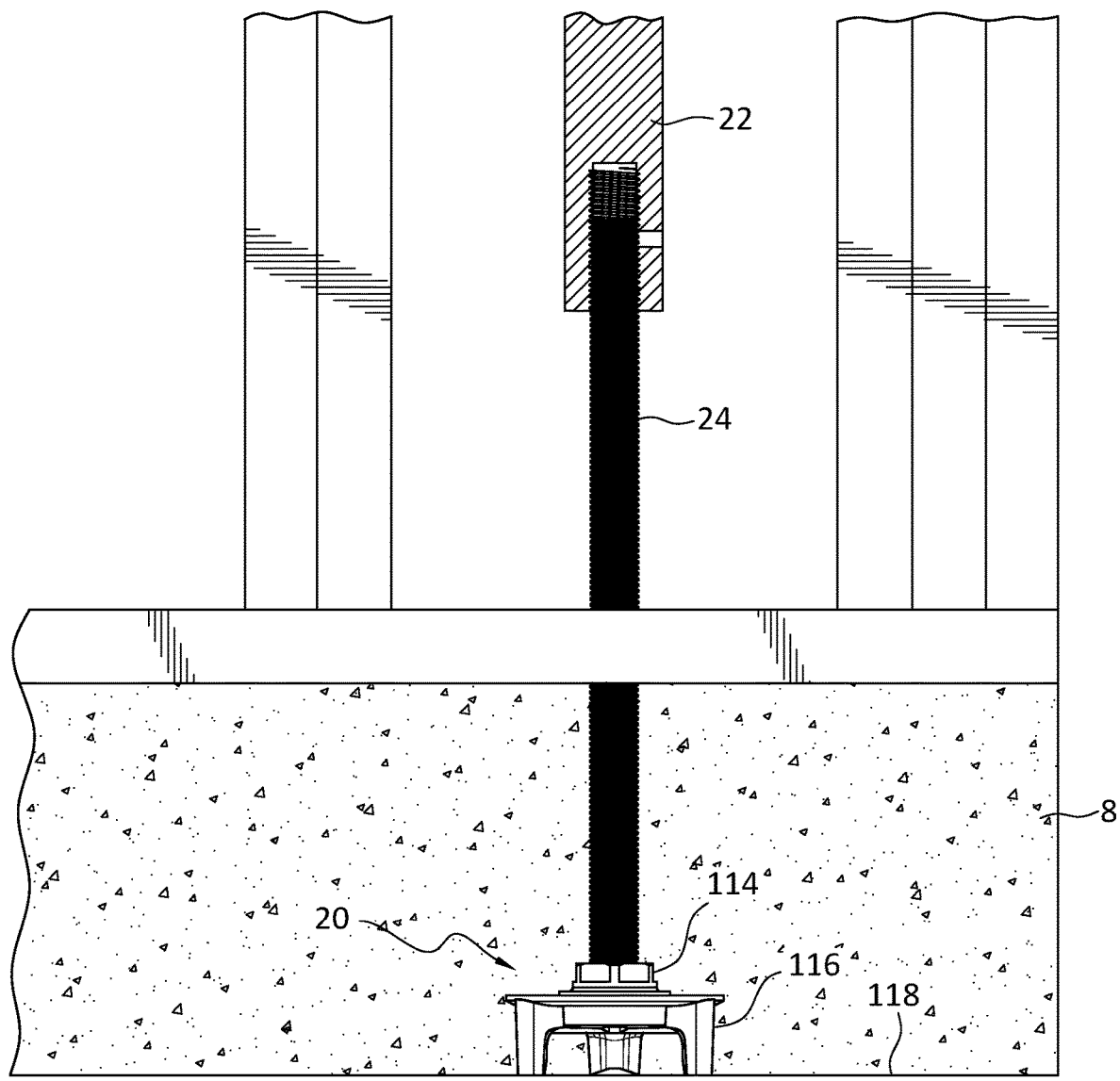

Referring to FIG. 35, the anchor 20 shown in the various embodiments of the wall, for example in FIG. 1, includes an anchor body 114 supported on a support or chair 116. The anchor rod 24 is supported by the chair 116. The anchor body 114 is threaded to the anchor rod 24. The anchor body 114 may be a standard nut, a metal plate, a cylindrical body, or any of the anchors disclosed in U.S. Pat. Nos. 8,943,777, 9,097,001, 9,222,251, 9,416,530, 9,447,574, 9,702,139, 9,874,009, hereby incorporated herein by reference. The chair 116 may be any support that positions the anchor body 114 a distance from the bottom of the 118 of the concrete foundation 8. Examples of the chair 116 are disclosed in U.S. Pat. Nos. 9,222,251 and 8,943,777, hereby incorporated herein by reference.

Figure 36:
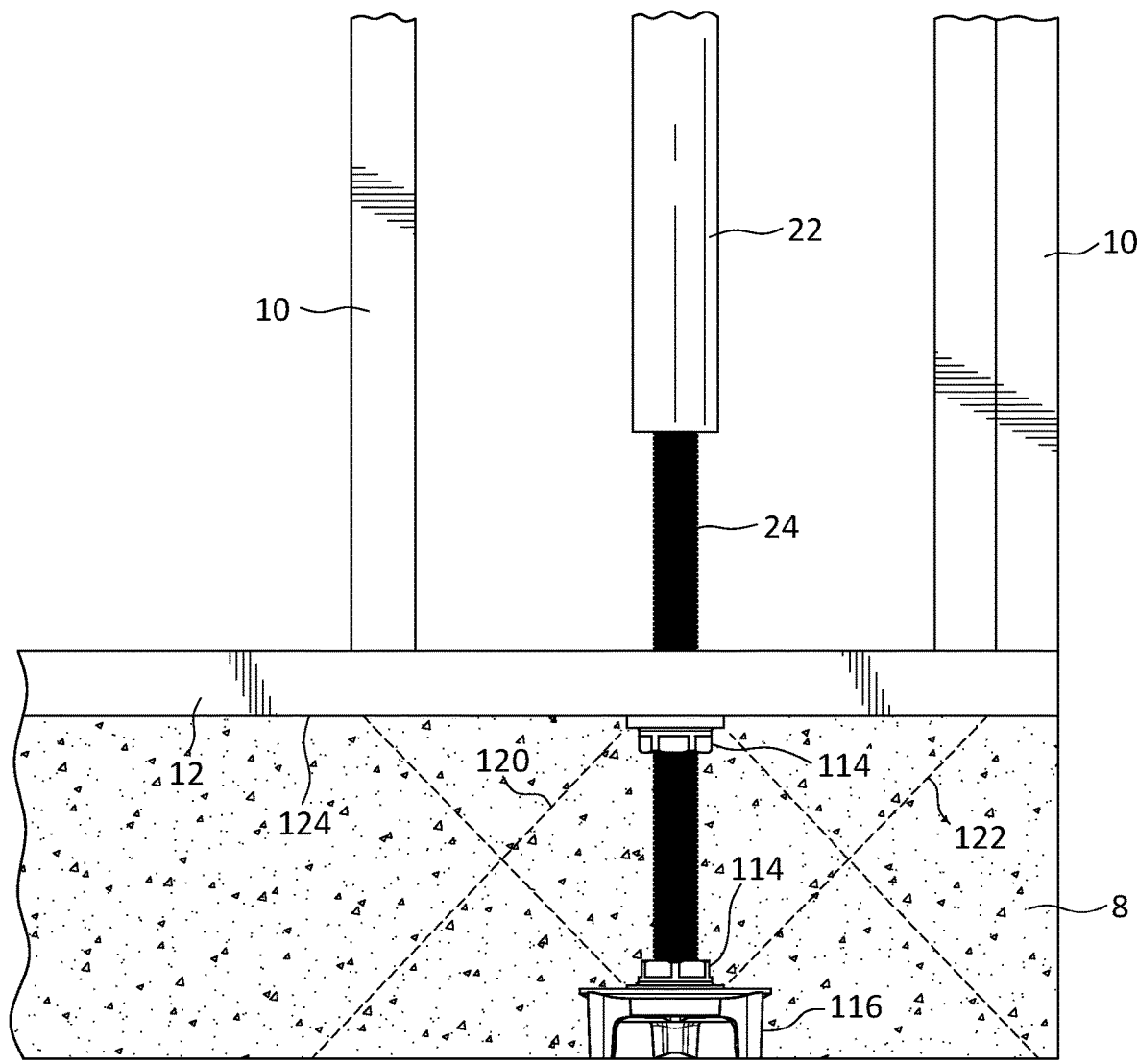

Referring to FIG. 36, the anchor 20 shown in FIG. 35 may be modified with the addition of an upper anchor body 114 disposed above the lower anchor body 114. The upper anchor body 114 is configured to generate a shear cone 120 in the concrete foundation 8 when subjected to compression (downward direction) forces. Similarly, the lower anchor body 114 is configured to generate a shear cone 122 when subjected to tension (upward direction) forces. Accordingly, the anchor arrangement shown can transfer both compression and tension forces to the foundation 8. The upper anchor body 114 is shown embedded flush with the upper surface 124 of the foundation 8 but it should be understood that it may be disposed below or on top of the top surface 124, depending on the expected load and the volume of the shear cone 120 sufficient to support the load.

Figure 37:
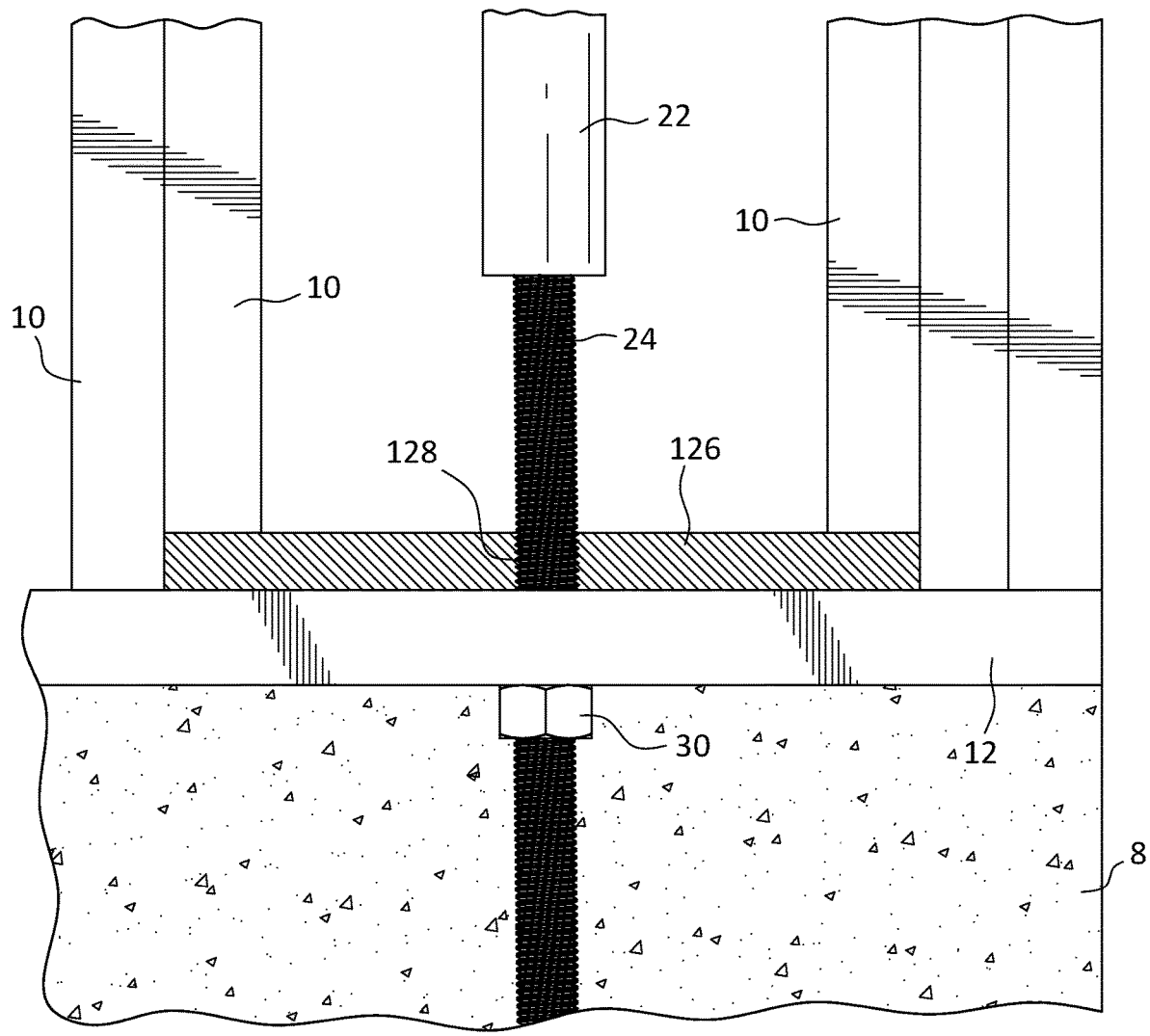

Referring to FIG. 37, the upper anchor body 114 shown in FIG. 36 may be a nut 30. The embodiment of FIG. 36 may be further modified by providing a cross-member or compression plate 126 disposed over the bottom plate 12 to support the bottom ends of two vertical studs 10. The compression plate 126 has a threaded opening 128, which is threaded to the anchor rod 24. In this configuration, compression forces from the vertical framing members or studs 10 are transferred to the rod 24 through the cross-member 126. An additional advantage of the plate 126 is that it has a higher compressive strength than the underlying bottom plate 12 so that forces on the compression plate 126 is spread over a larger area on the bottom plate 12, as disclosed in co-pending application Ser. Nos. 16/296,865 and 16/415, 595, hereby incorporated herein by reference. The plate 126 is preferably made of metal.

Figure 38:
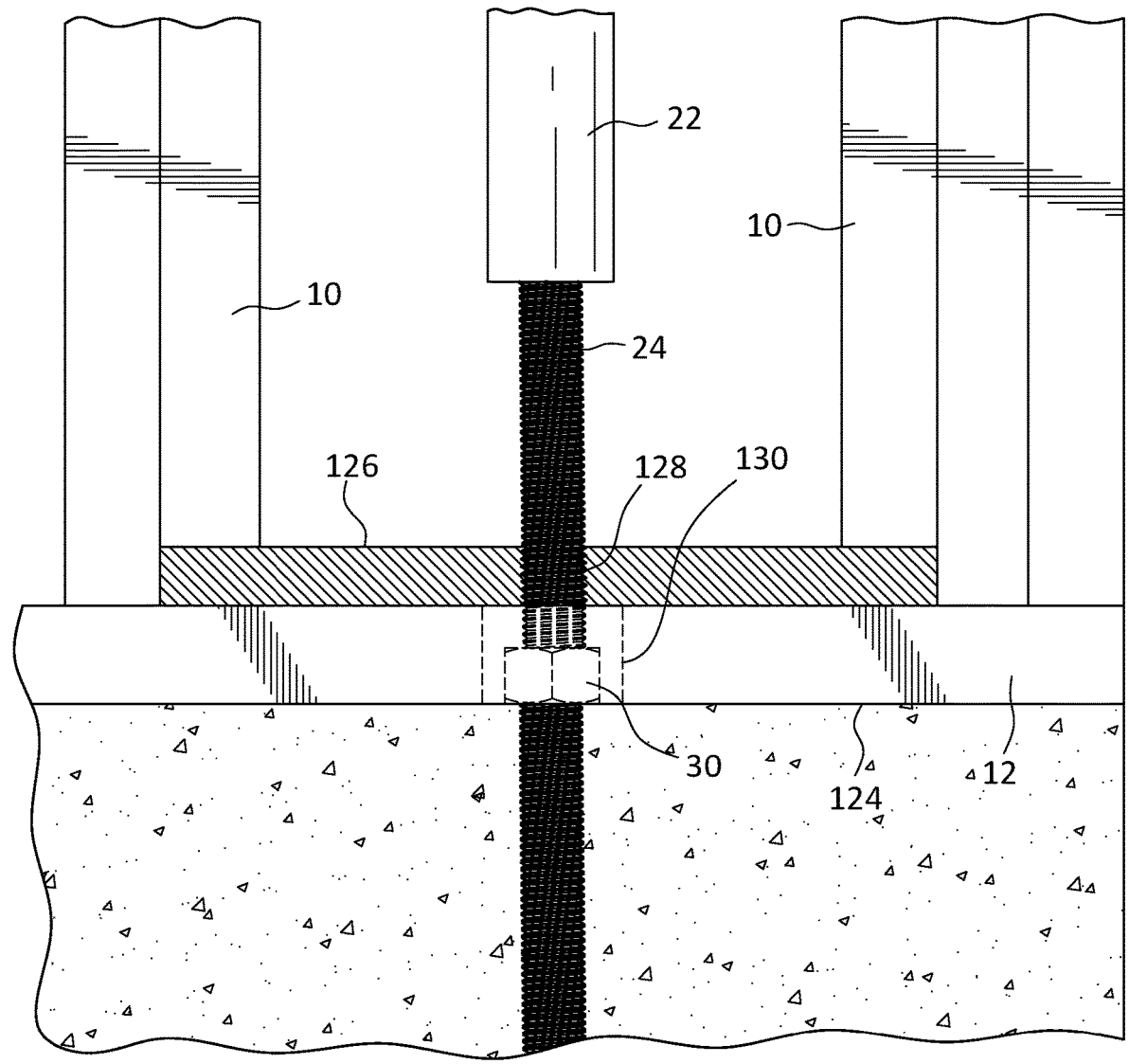

Referring to FIG. 38, the embodiment of FIG. 37 may be modified by disposing the nut 30 on the top surface 124 of the concrete foundation 8. An opening 130 in the bottom plate 12 receives the nut 30.

Figure 39A:
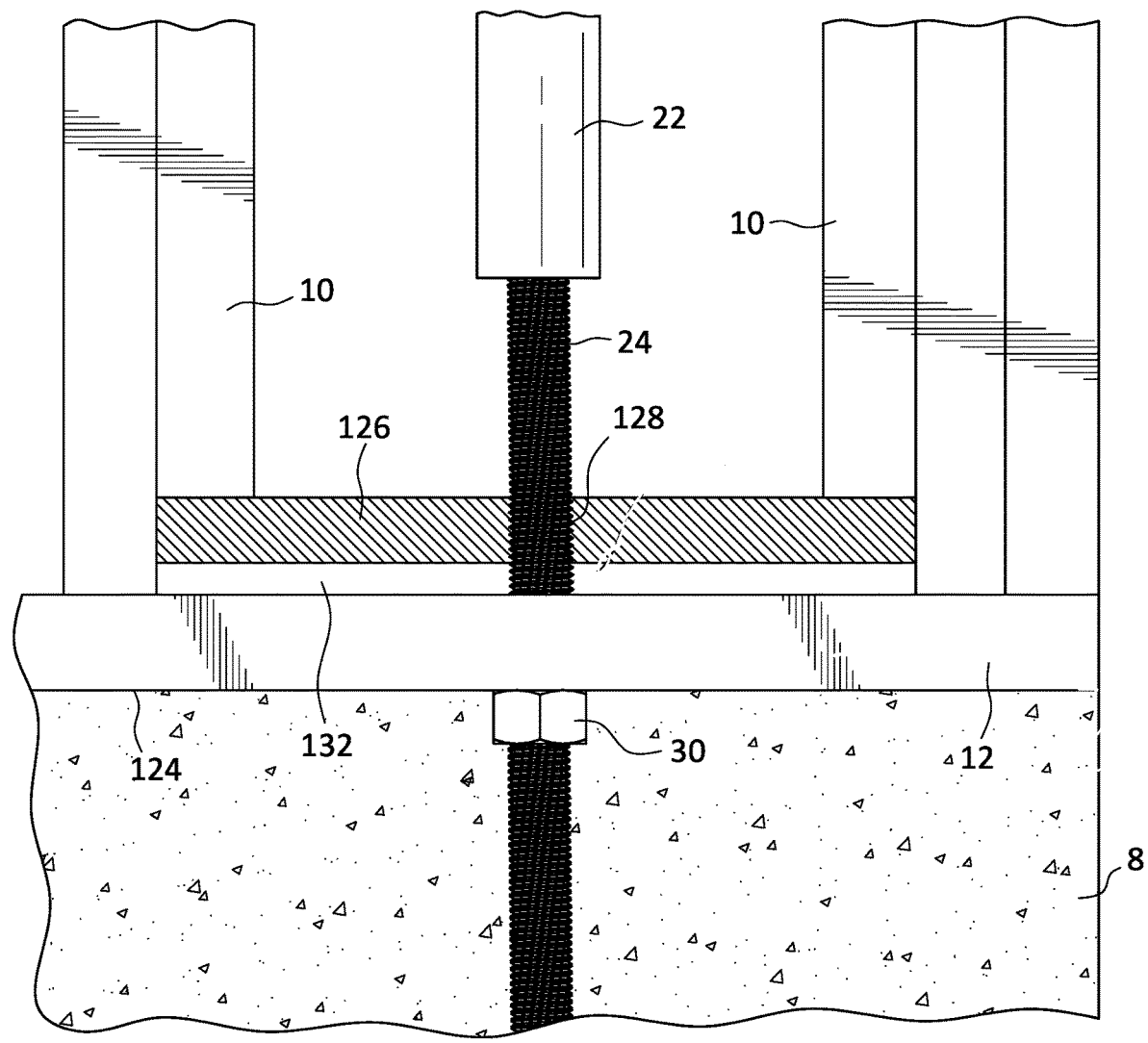

Referring to FIG. 39A, the embodiment of FIG. 37 may be modified by raising the compression plate 126 above the bottom plate 12, creating a gap 132 between the compression plate 126 and the bottom plate 12. The nut 30 is embedded in the foundation and flush with the top surface 124 of the concrete foundation 8. The compression plate 126 is threaded to the anchor rod 24, advantageously allowing compression loading from the vertical framing members or studs 10 bearing on the plate 126 to be transferred directly to the rod 24 via the cross-member 126. The plate 126 is preferably made of metal.

Figure 39B:
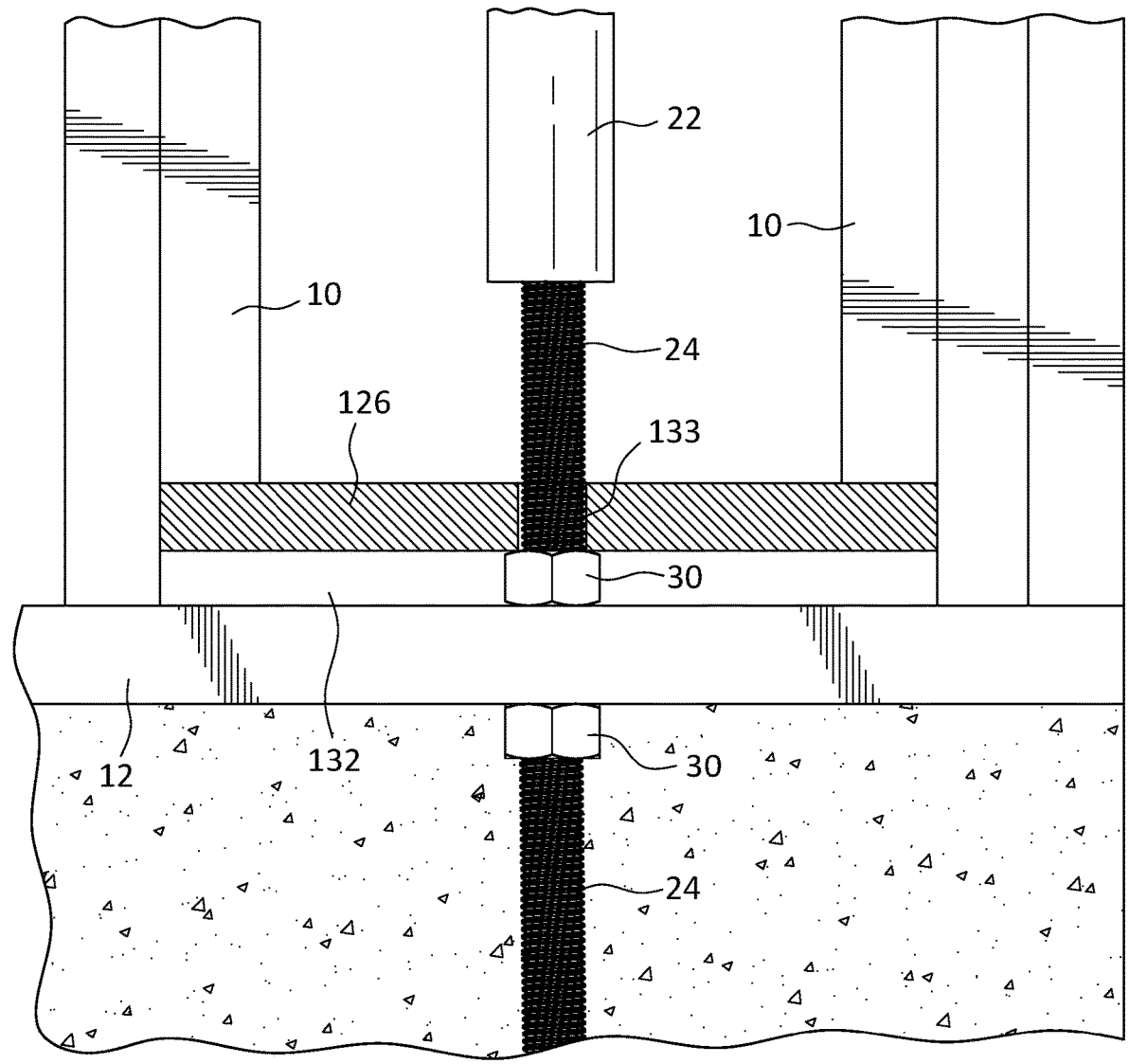

Referring to FIG. 39B, the embodiment of FIG. 39A may be modified with the addition of an upper nut 30 within the gap 132. The compression plate 126 is provided with a non-threaded opening 133. Compression loading from the vertical framing members or studs 10 bearing on the plate 126 is transferred to the rod 24 via the plate 126 bearing on the upper nut 30. The upper nut 30 disposed on the bottom plate 12 engages the bottom portion of the plate around the opening 133.

Figure 40:
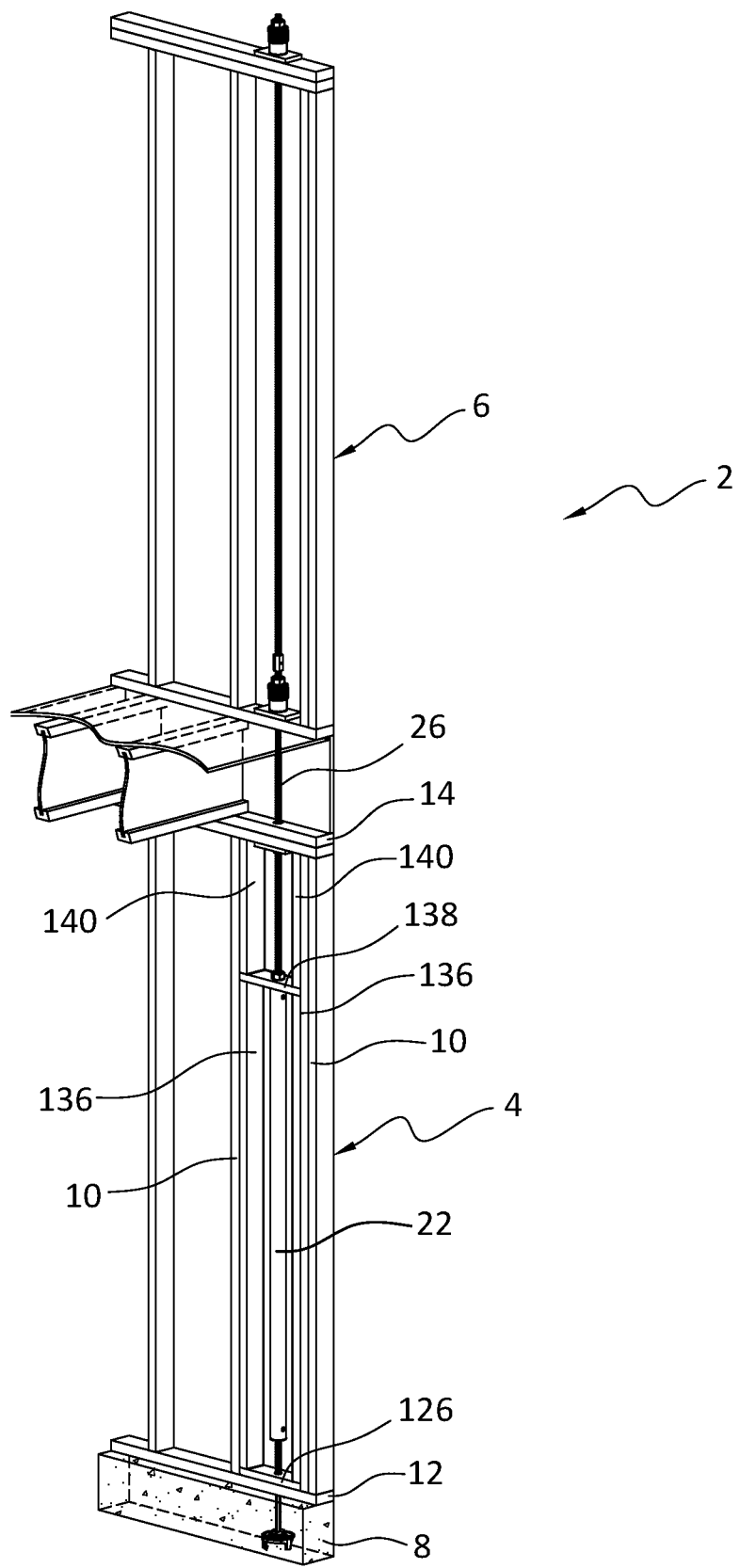
FIG. 40 is perspective fragmentary view of a stud-framed building wall, incorporating another embodiment of the present invention.
Figure 41:
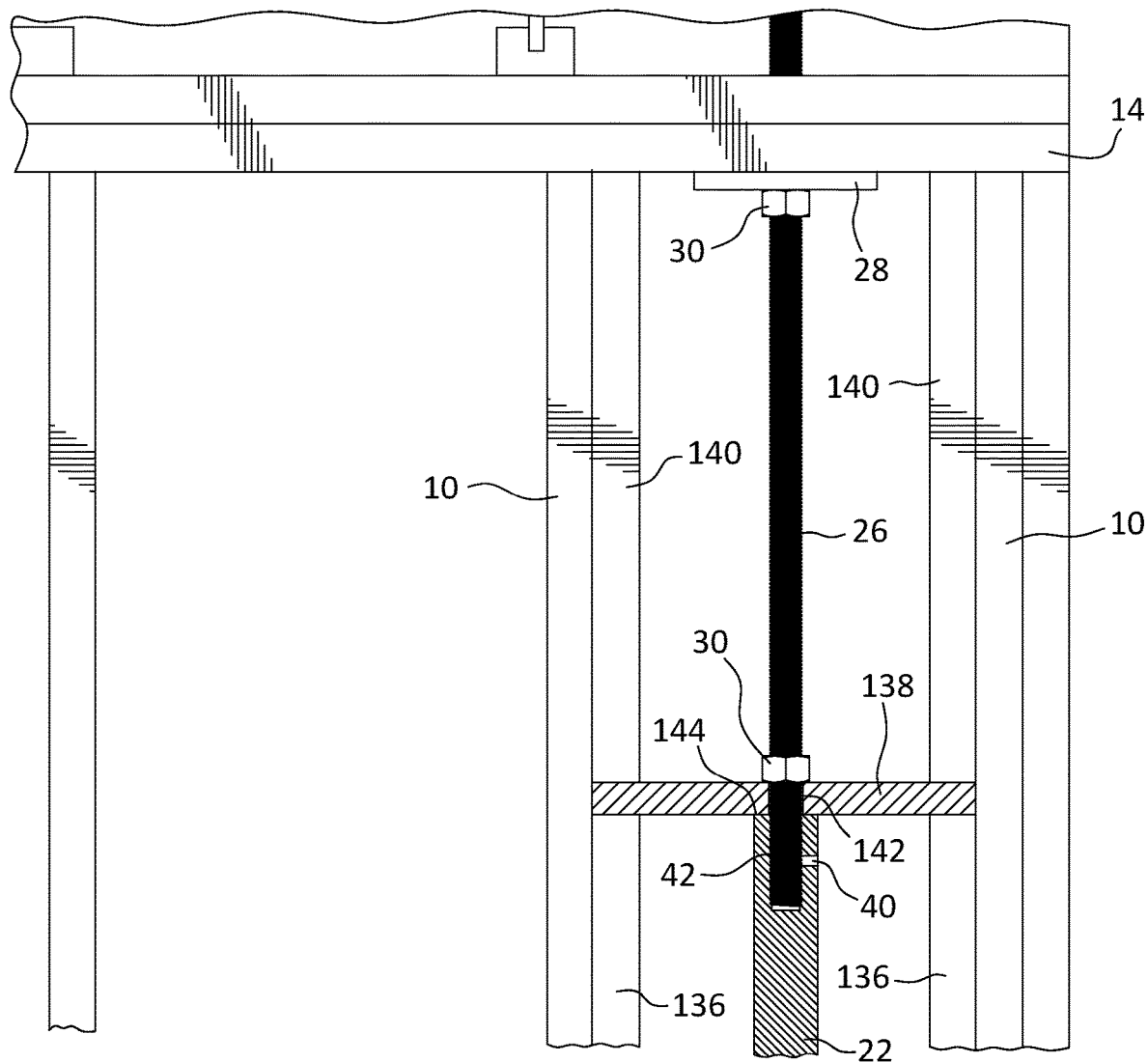
FIGS. 41-45 are enlarged perspective views of portions of the wall of FIG. 40, some shown with modifications.

Referring to FIGS. 40 and 41, the embodiment shown in FIG. 9 may be modified by combining the embodiment of FIG. 37 and the provision of reinforcement studs 136 that extend between the compression plate 126 and a cross-member 138. Reinforcement studs 140 also extend between the cross-member 138 and the top plate 14. The reinforcement studs 136 and 140 are operably attached to the respective adjacent studs 10 by nails or screws. The bottom ends of the reinforcement studs 136 bear on the bearing plate 126. The cross-member 138 is supported by the top ends of the reinforcement studs 136. The bottom ends of the reinforcement studs 140 bear on the cross-member 138. The threaded rod 26 extends through an unthreaded opening 142 in the cross-member 138 and is threaded to the threaded bore 42. The nut 30 secures the cross-member 138 against the top edge 144 of the compression rod 22. In this configuration, compression and tension forces from the vertical framing members or reinforcement studs 136 and 140 are transferred to the compression rod 22 via the cross-member 138. When the wall is under compression, the studs 140 transfer compression forces to the compression rod via the cross-member 138. When the wall is under tension, the studs 136 transfer tension forces to the compression rod 22 via the cross-member 138.

Figure 42:
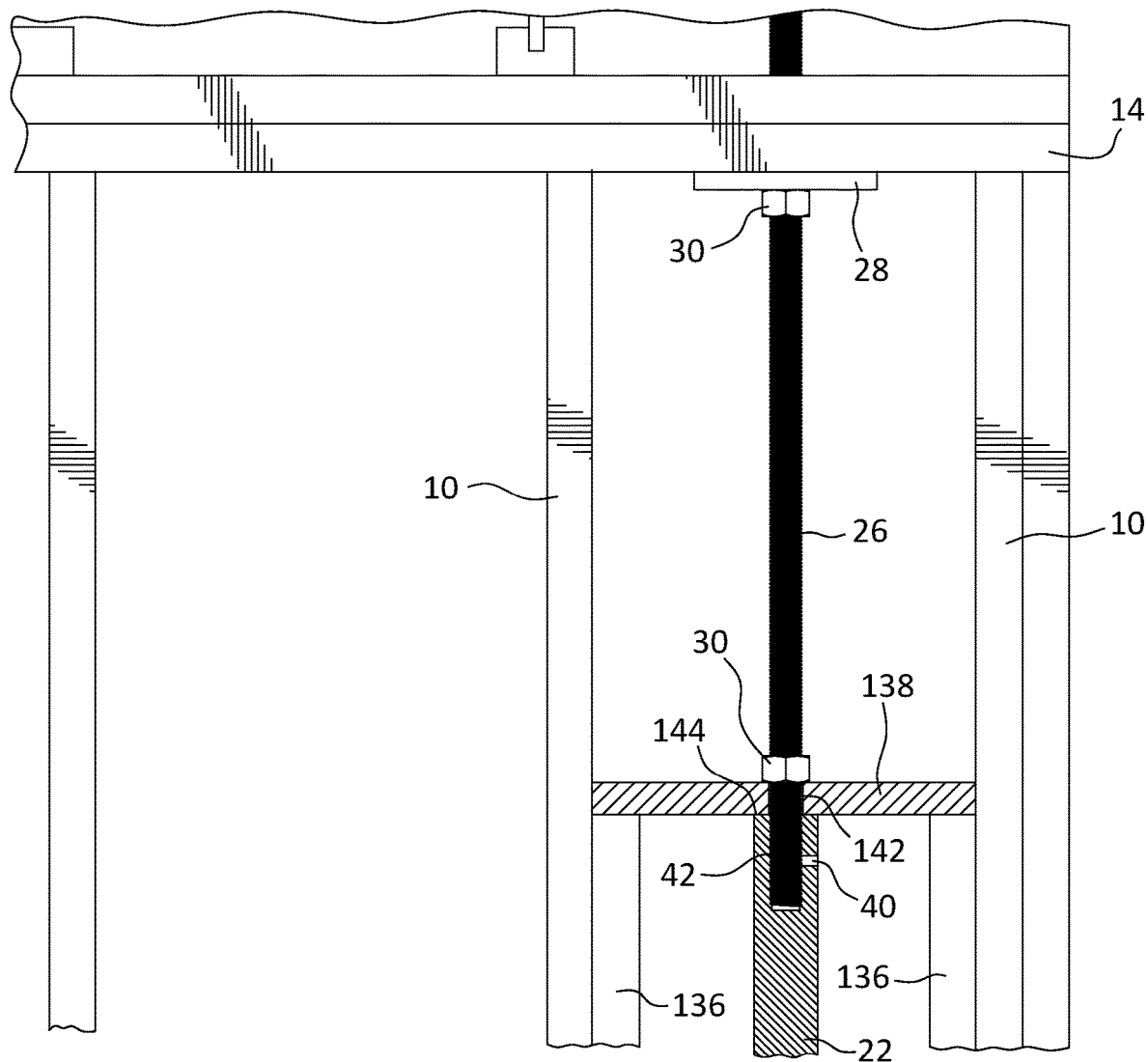

Referring to FIG. 42, the embodiment of FIG. 40 may be modified wherein the reinforcement studs 140 are omitted. In this configuration, tension forces from above are transferred to the compression rod 22 via the threaded rod 26 and to the reinforcement studs 136 via the cross-member 138, which is held in place by the nut 30. Compression forces from the top plate 14 are transferred to the compression rod 22 via the bearing plate 28 and the threaded rod 26.

Figure 43:
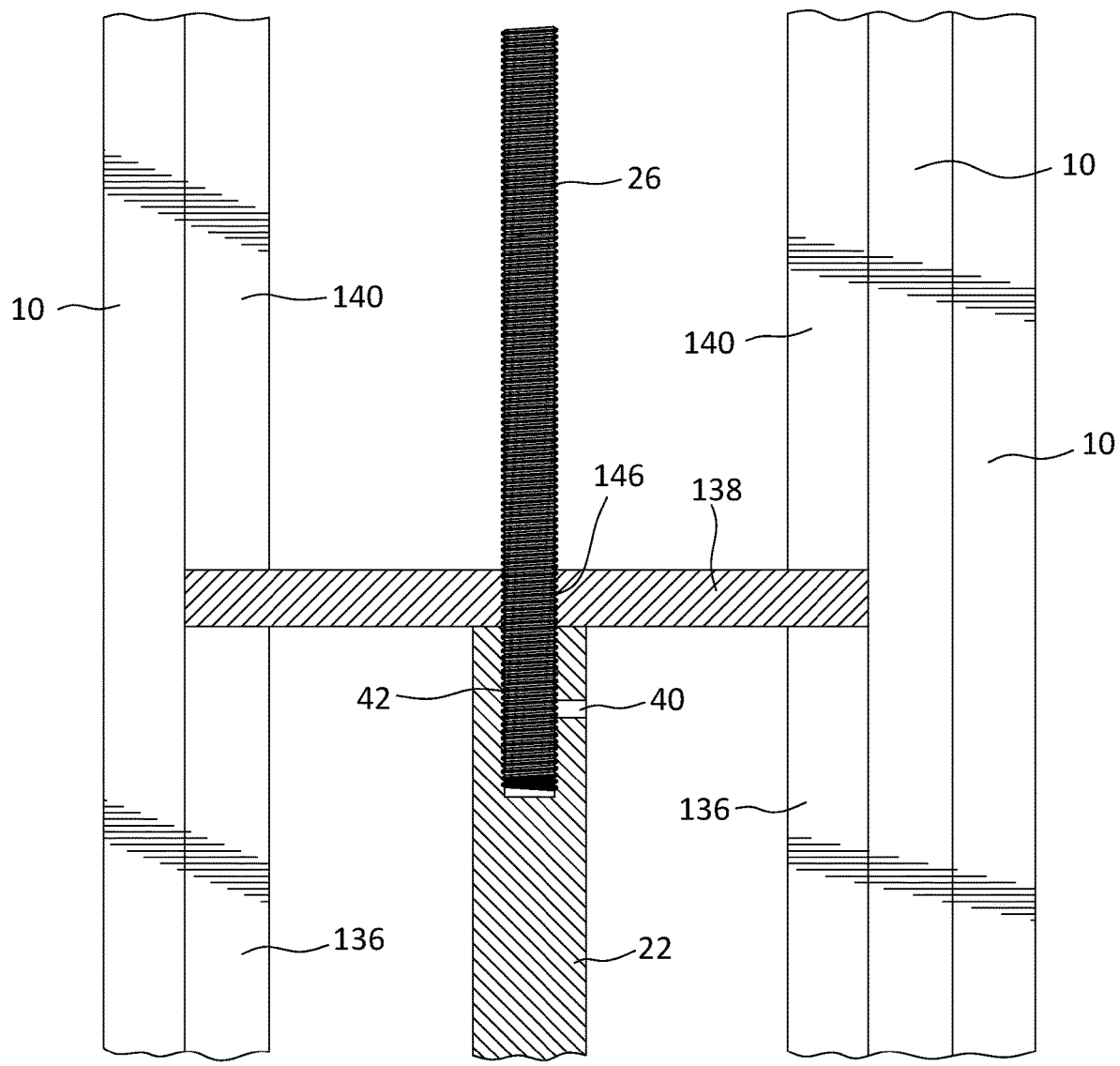

Referring to FIG. 43, the embodiments of FIGS. 41 and 42 may be modified by providing the cross-member 138 with a threaded hole 146, eliminating the use of the nut 30 to attach the cross-member 138 to the compression rod 22.

Figure 44:
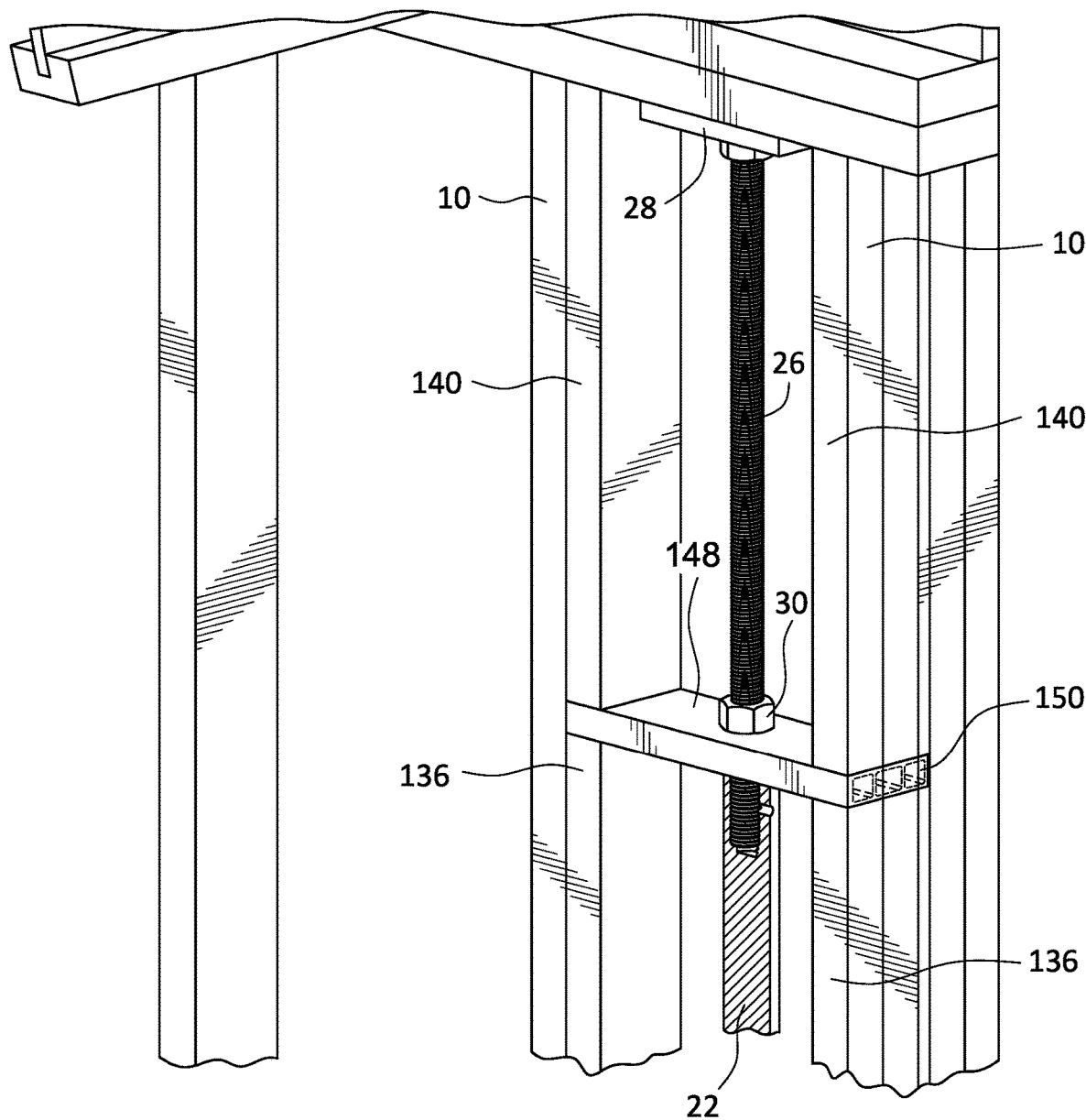

The cross-member 138 may be solid metal as shown in FIGS. 40-43 or hollow metal 148 with longitudinal openings 150 as shown in FIG. 44, and disclosed in U.S. Pat. No. 9,097,000, hereby incorporated herein by reference.

Figure 45:
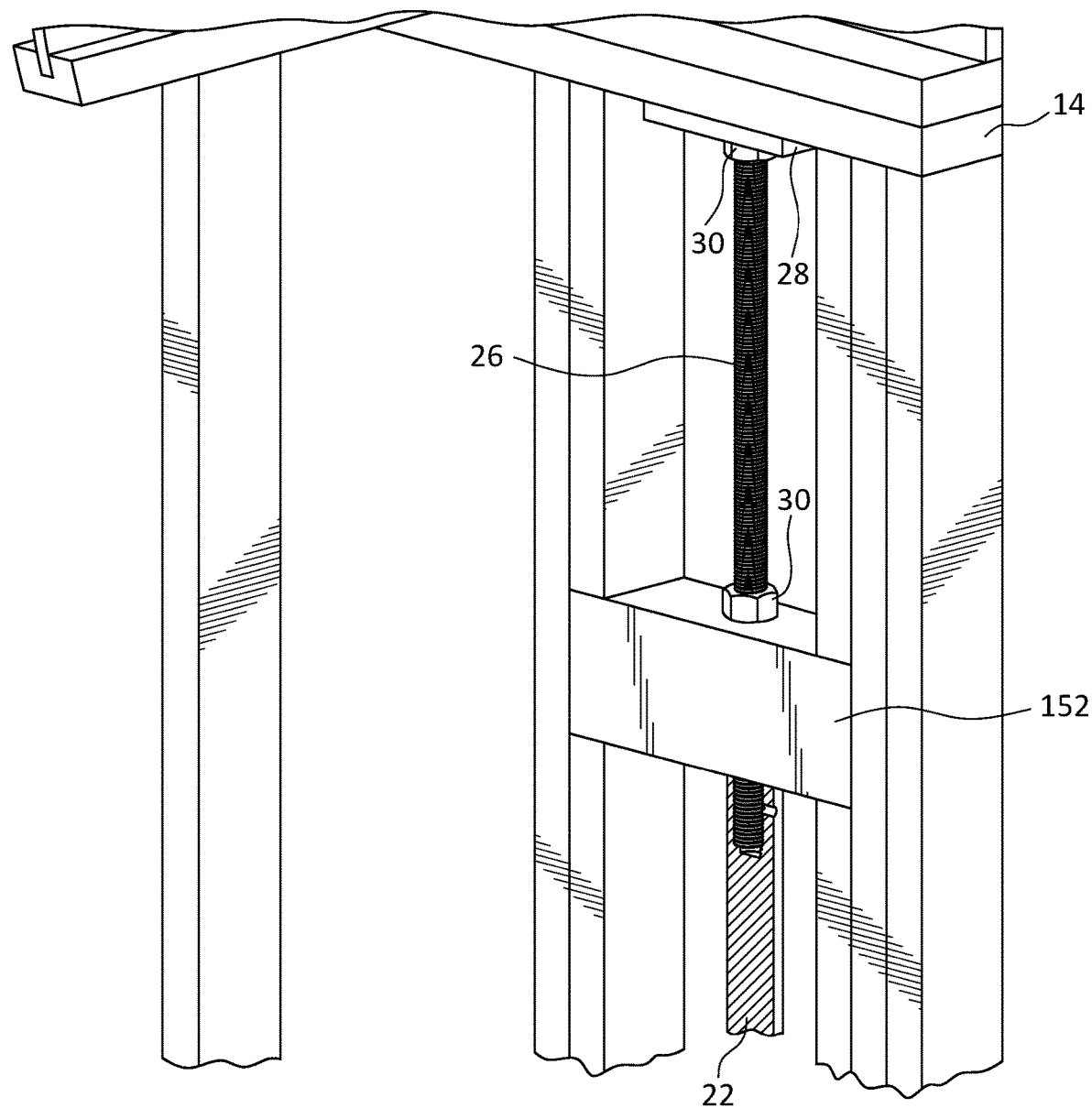

The cross-member 138 may be a solid wood member 152, as shown in FIG. 45.

It should be understood that the cross-members 138, 148 and 152 are interchangeable.

Figure 46:
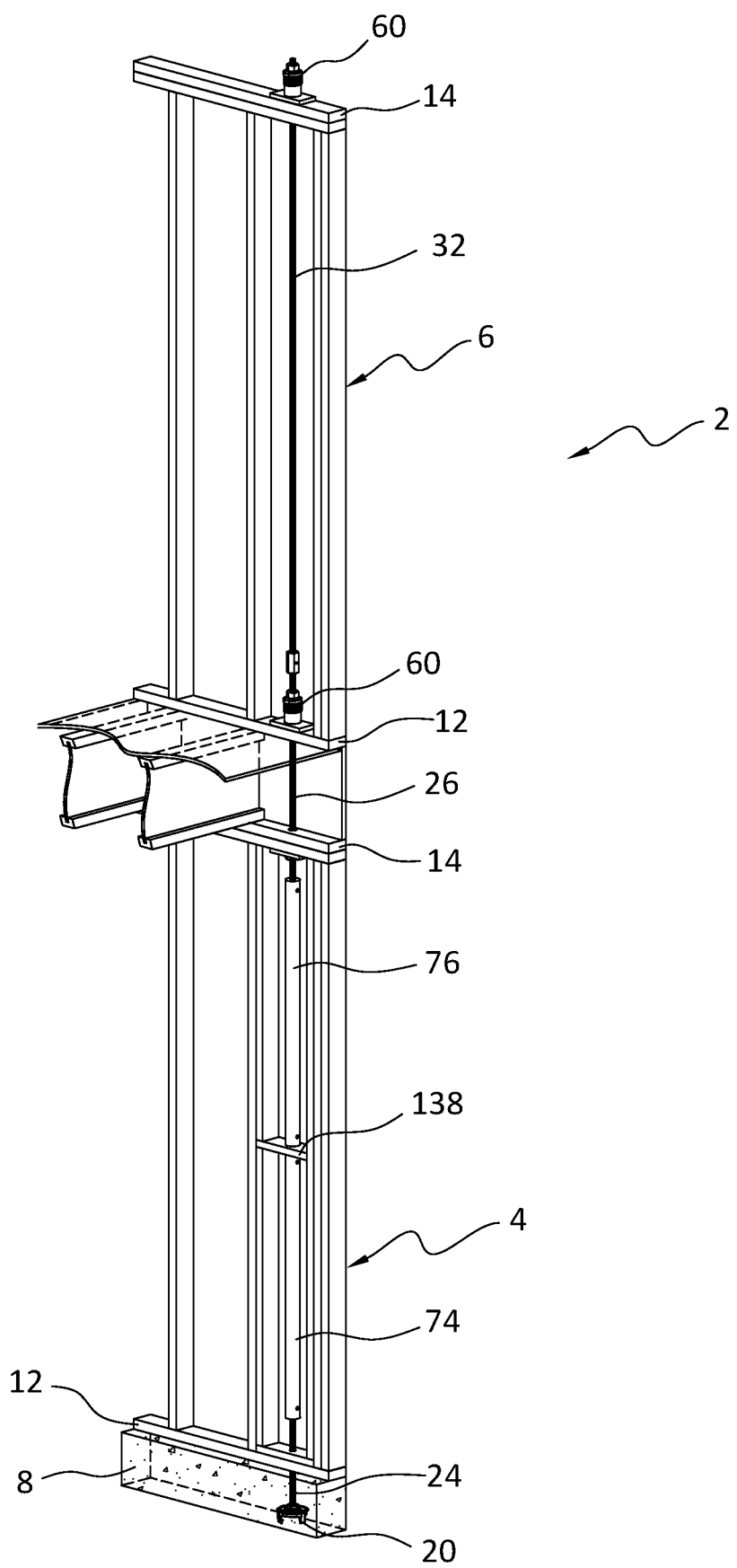
FIG. 46 is perspective fragmentary view of a stud-framed building wall, incorporating another embodiment of the present invention.
Figure 47:
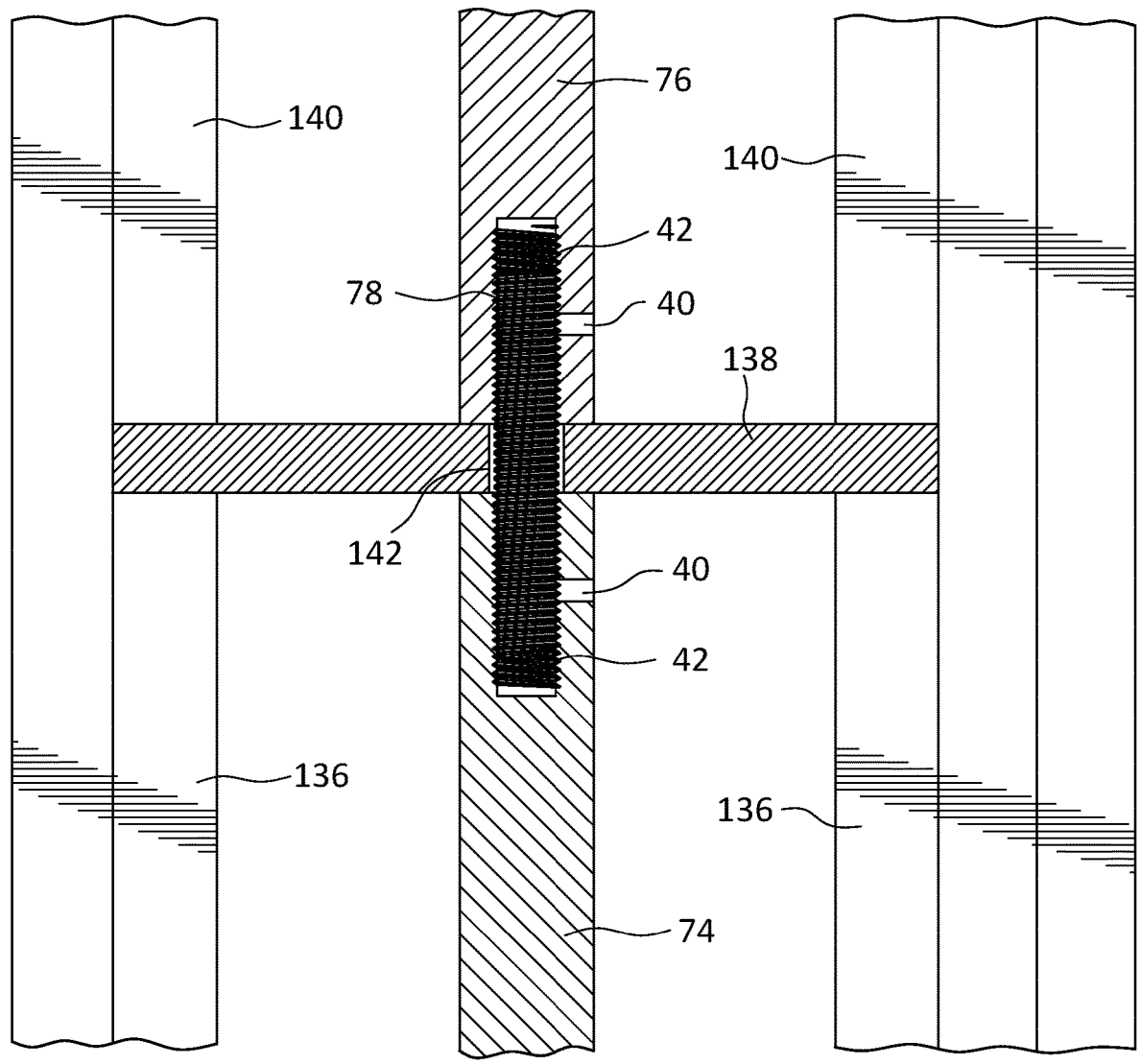
FIGS. 47-48 are enlarged perspective views of portions of the wall of FIG. 46.
Figure 48:
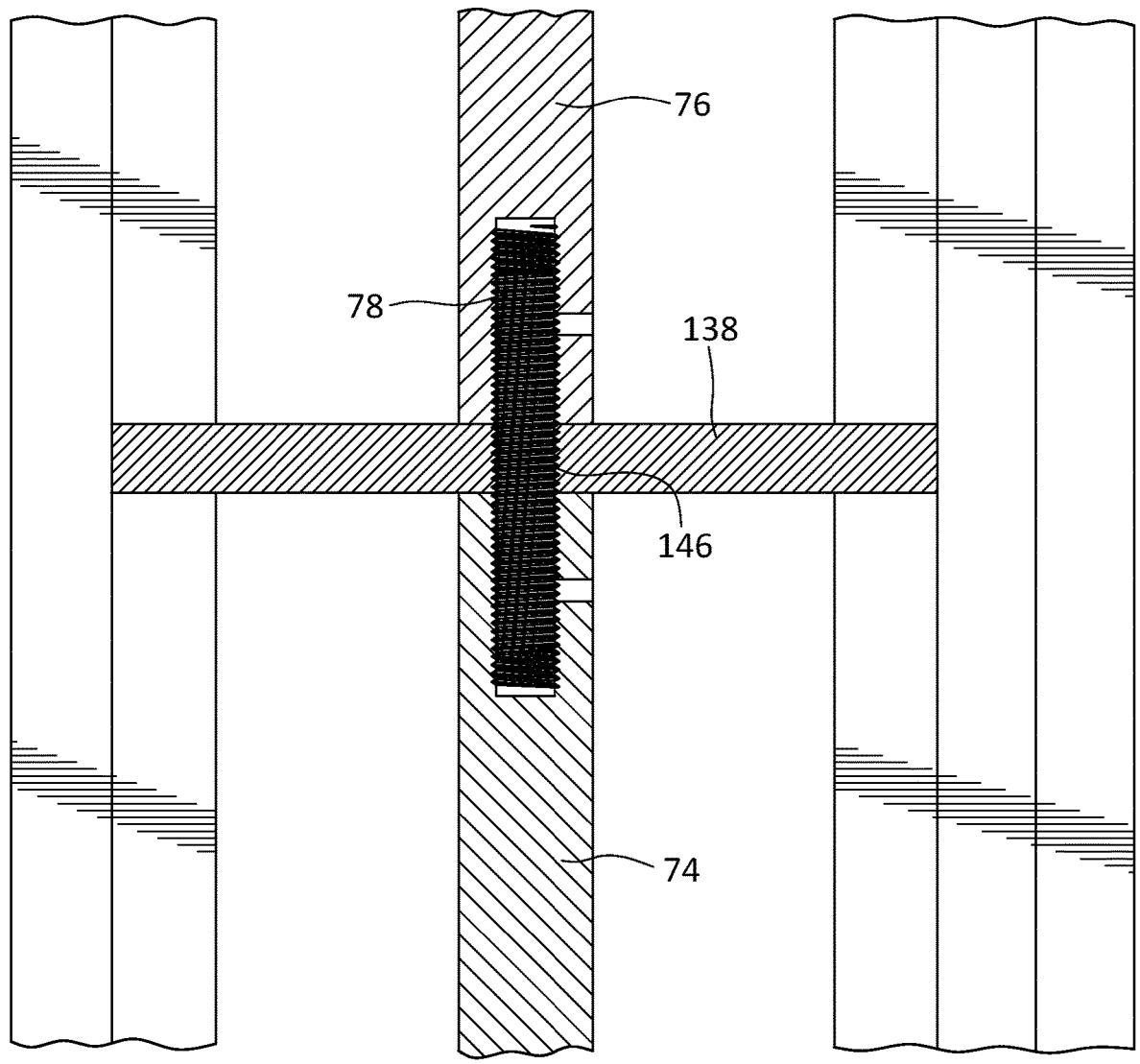

Referring to FIGS. 46-48, the embodiment of FIG. 40 may be modified wherein the compression rod 22 is replaced with the two-piece compression rods 74 and 76 shown in FIG. 20 and wherein the cross-member 138 is disposed between the opposing ends of the compression rods 74 and 76.

Referring to FIG. 47, the upper and lower compression rods 76 and 74 are joined with the threaded rod 78 threaded to the threaded bores 42. The opening 142 is preferably unthreaded.

Referring to FIG. 48, the cross-member 138 is provided with the threaded hole 146. The threaded rod 78 is threaded to the hole 146.

Figure 49:
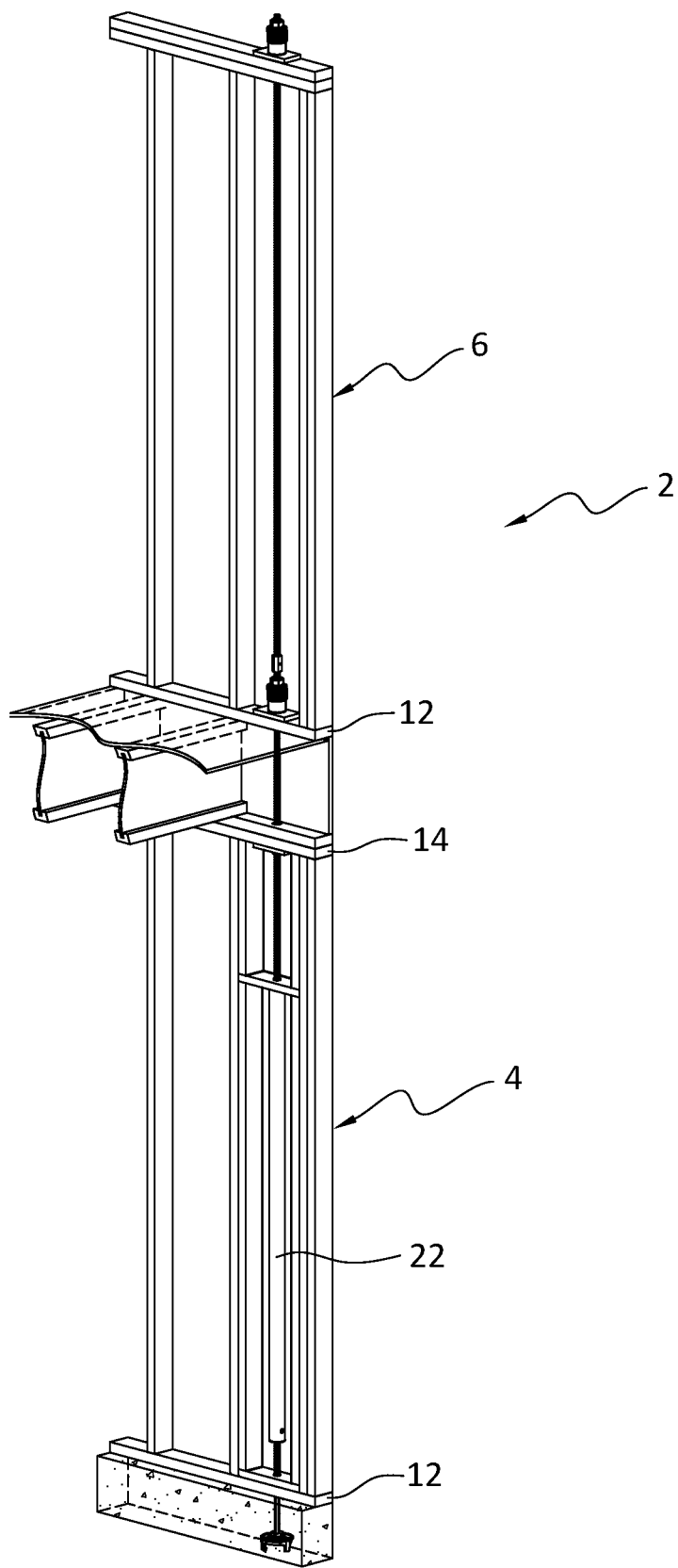
FIG. 49 is perspective fragmentary view of a stud-framed building wall, incorporating another embodiment of the present invention.
Figure 50:
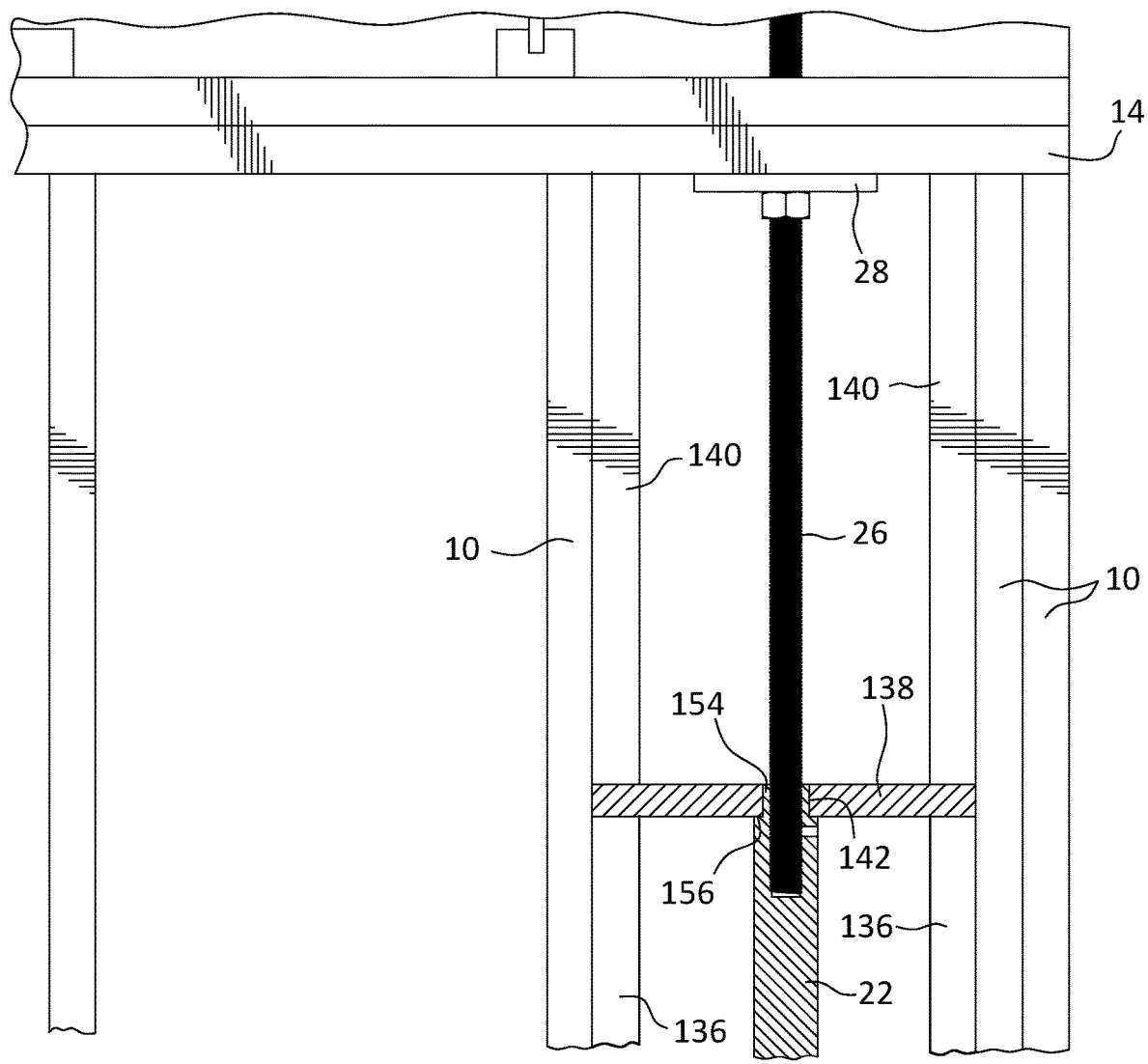
FIGS. 50-53 are enlarged perspective views of portions of the wall of FIG. 50 with some shown with modifications.

Referring to FIGS. 49 and 50, the embodiment shown in FIG. 43 may be modified wherein the end portion of the compression rod 22 is provided with a smaller diameter portion 154 with a circumferential shoulder 156 which provides support to the cross-member 138. The opening 142 is preferably unthreaded.

Figure 51:
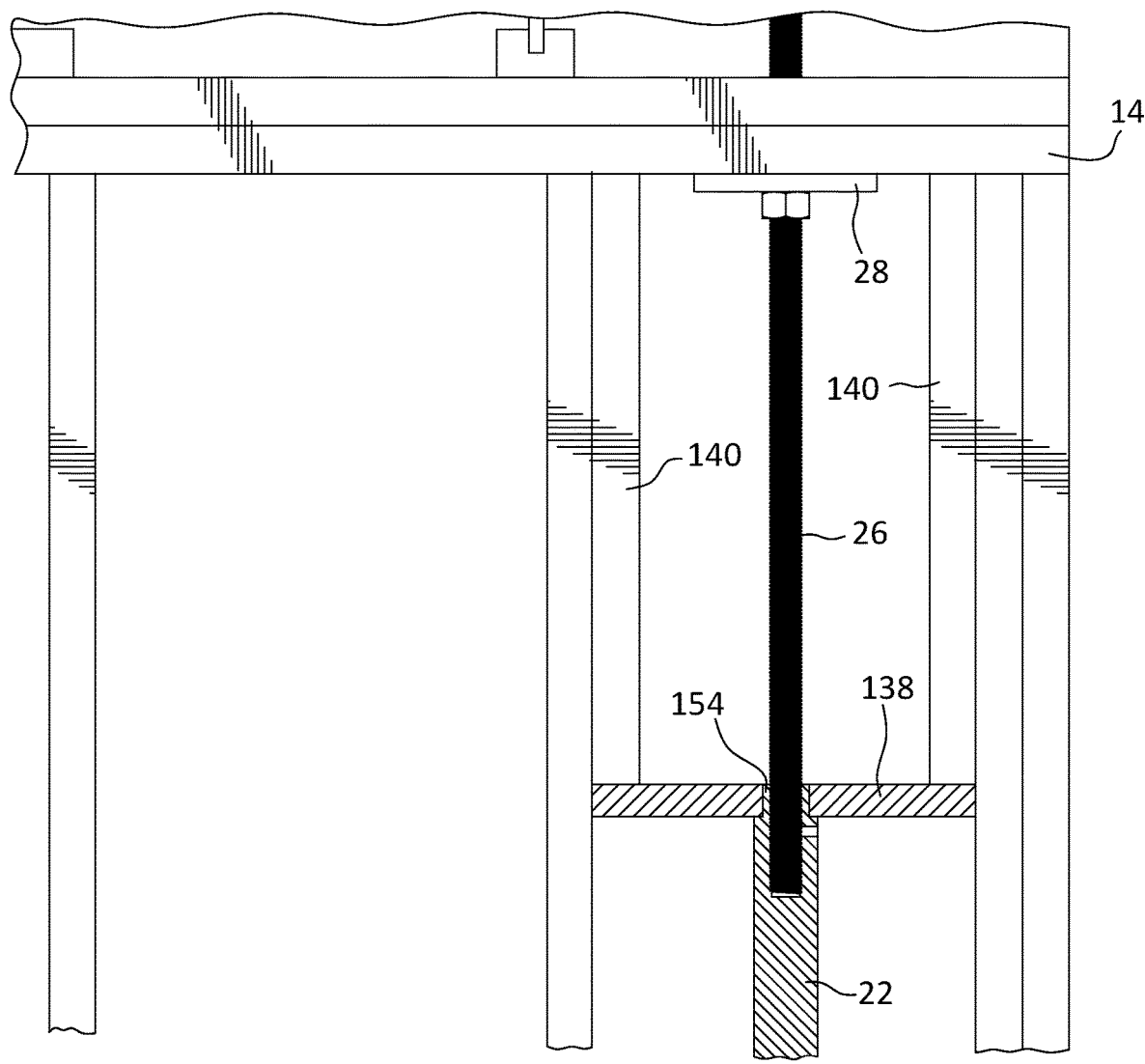

Referring to FIG. 51, the embodiment of FIG. 49 may be modified wherein the reinforcement studs 136 shown in FIG. 50 are removed. In this configuration, the cross-member 138 can transfer compression forces from the vertical framing members or reinforcement studs 140 to the compression rod 22. In addition, compression forces from the horizontal framing member or top plate 14 are transferred to the bearing plate 28 and thence to the compression rod 22.

Figure 52:
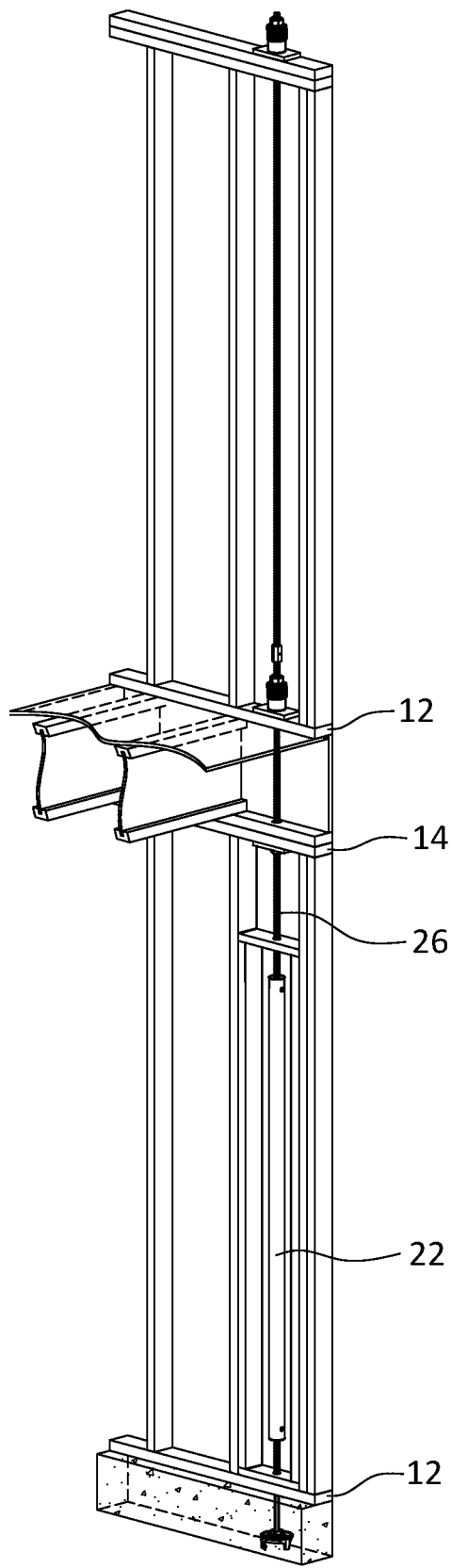
Figure 53:
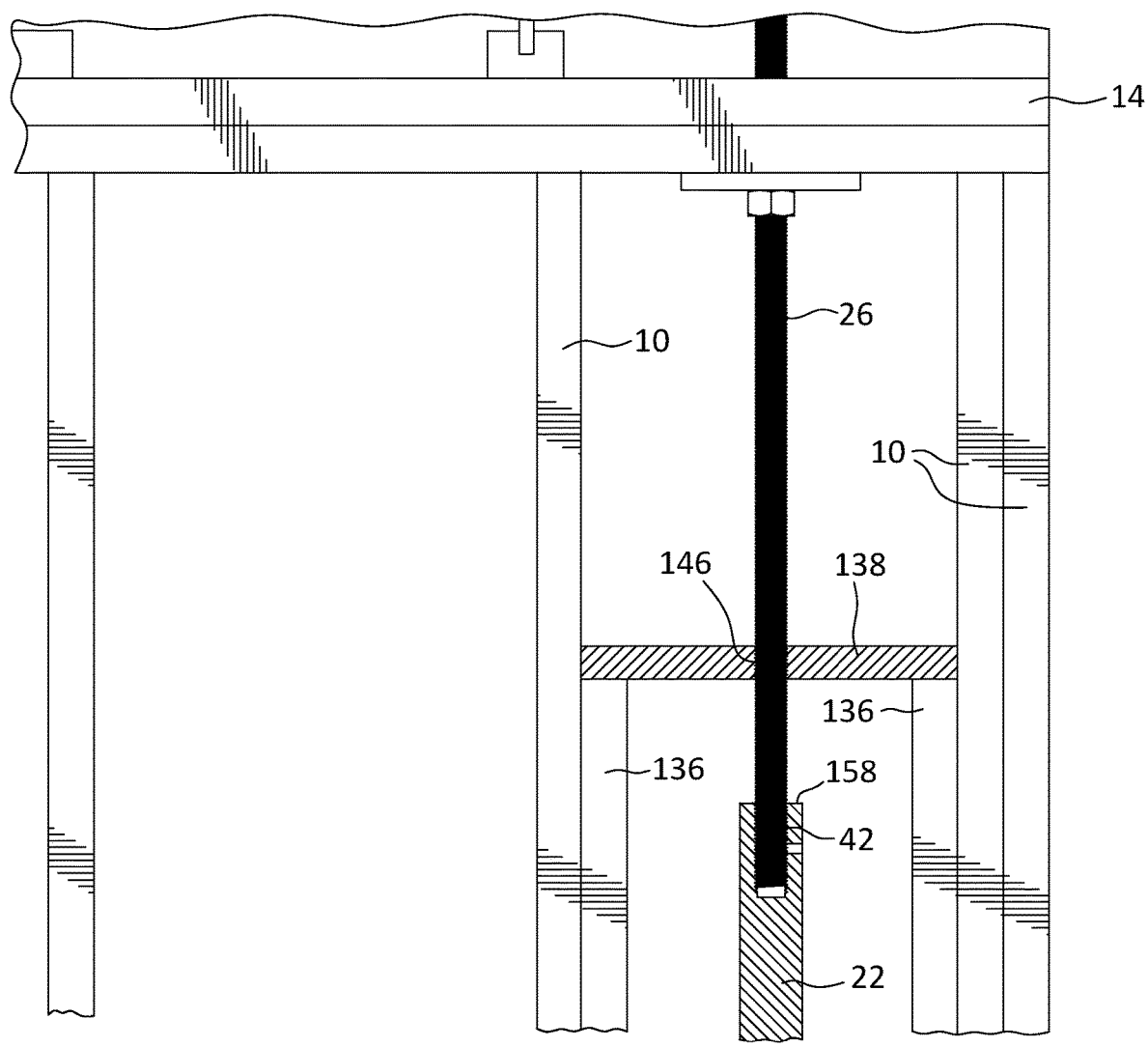

Referring to FIGS. 52 and 53, the embodiment of FIG. 42 may be modified wherein the top end 158 of the compression rod 22 is spaced apart from the cross-member 138. The threaded rod 26 is threaded to the threaded bore 42 and the threaded hole 146. In this configuration, compression forces from above are transferred to the compression rod 22 via the bearing plate underneath the top plate 14 and the threaded to the rod 26. Similarly, tension forces from the reinforcement studs 136 are transferred to the compression rod 22 via the threaded rod 26 and the cross-member 138, which is threaded to the rod 26.

Figure 54:
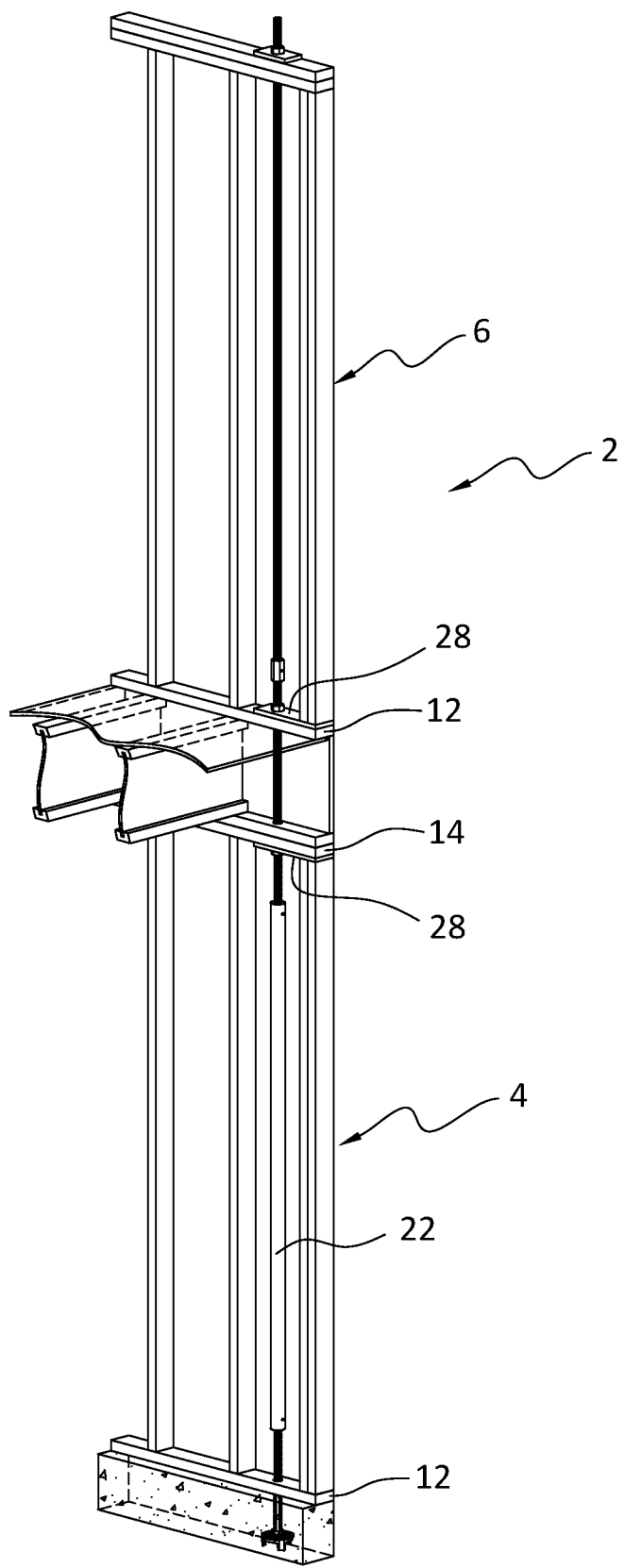
FIG. 54 is perspective fragmentary view of a stud-framed building wall, incorporating another embodiment of the present invention.
Figure 55:
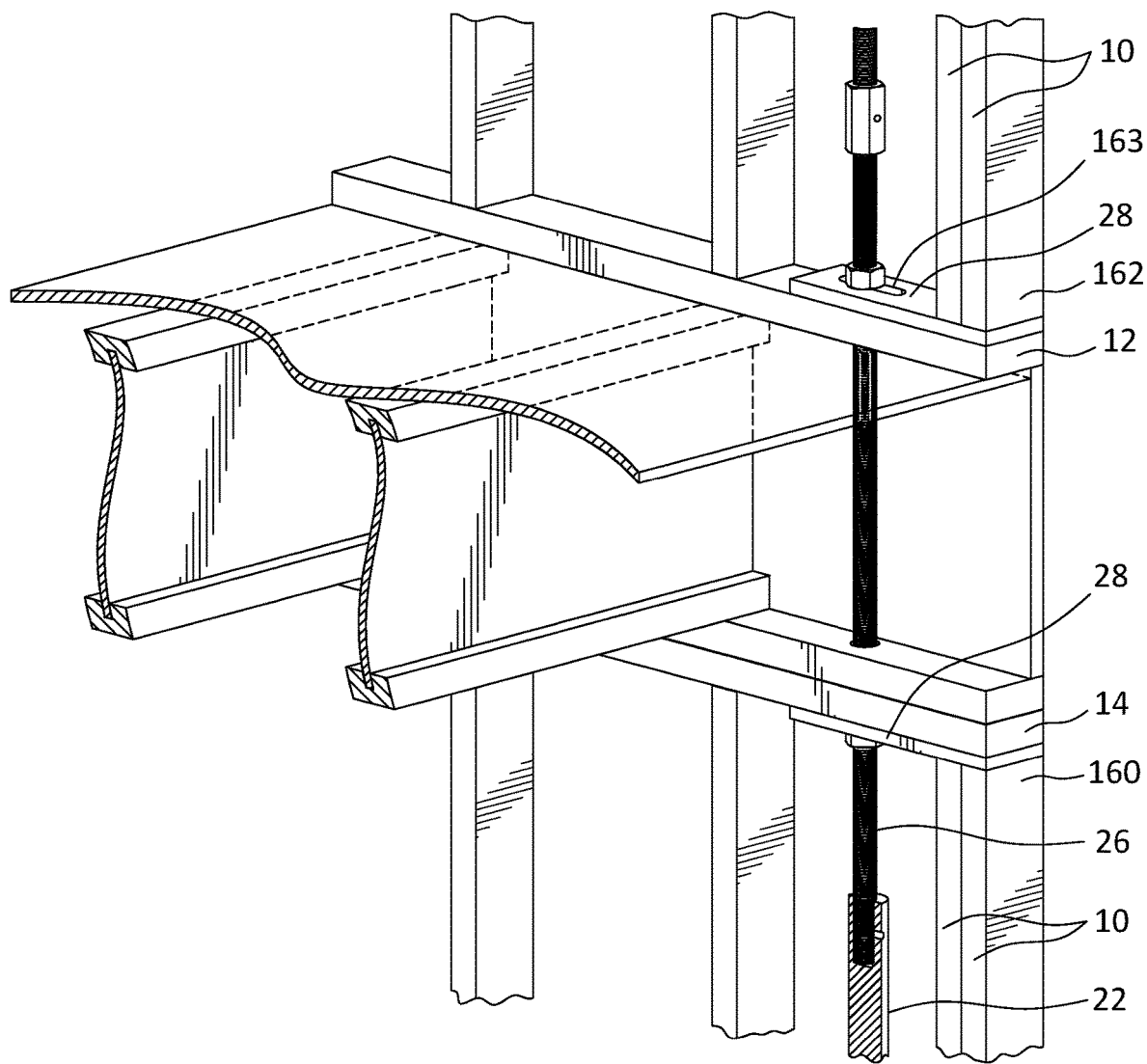
FIGS. 55-57 are enlarged perspective views of portions of the wall of FIG. 54, with some shown with modifications.

Referring to FIGS. 54 and 55, the embodiment shown in FIG. 1 may be modified wherein one end of each of the bearing plates 28 is extended to encompass the top ends 160 and the bottom ends 162 of the respective studs 10. The extended bearing plate 28, preferably made of solid metal, has a larger compressive strength than the top plate 14 and the bottom plate 12 to minimize crushing the horizontally oriented wood fibers of the top plate and the bottom plate by the vertically oriented wood fibers of the studs 10. Since the studs 10 with their vertically oriented wood fibers are able to carry more load than the top plate and the bottom plate with their horizontally oriented wood fibers, the bearing plate 28 advantageously spread the forces from the top ends 160 and bottom ends 162 of the studs 10 into a larger area on the respective top plate 14 and the bottom plate 12. The extended bearing plate 28 preferably has an elongated opening 163 to advantageously provide adjustability to the positioning of the bearing plate 28. Co-pending application Ser. No. 16/296,865, hereby incorporated herein by reference, discloses the use of bearing plate 28 as a compression plate to reduce crushing of the underlying wood part.

In the configuration shown in FIG. 55, the lower extended bearing plate 28 underneath the top plate 14 is able to transfer compression forces from the horizontal framing member 14 to the compression rod 22. The extended bearing plate 28 advantageously provides the additional function of the cross-member or compression plate 126. In the case where the upper extended bearing plate on top of the bottom plate 12 is threaded to the rod 26, the extended bearing plate 28 is able to transfer compression forces from the vertical framing members or studs 10 to the compression rod 22.

Figure 56:
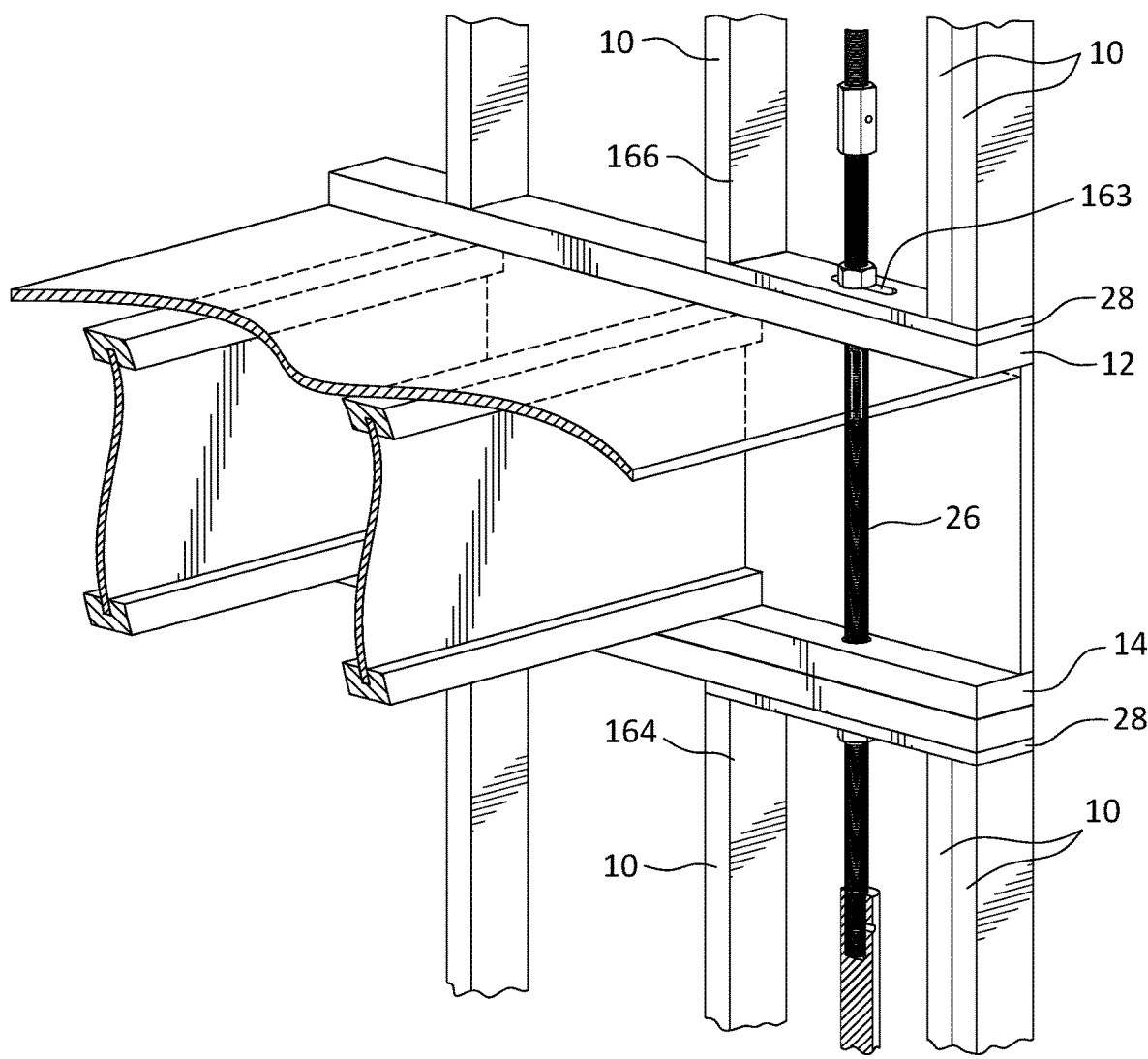

Referring to FIG. 56, the extended bearing plate 28 shown in FIG. 55 may be further extended to encompass the top end 164 and the bottom end 166 of the opposite studs 10.

Figure 57:
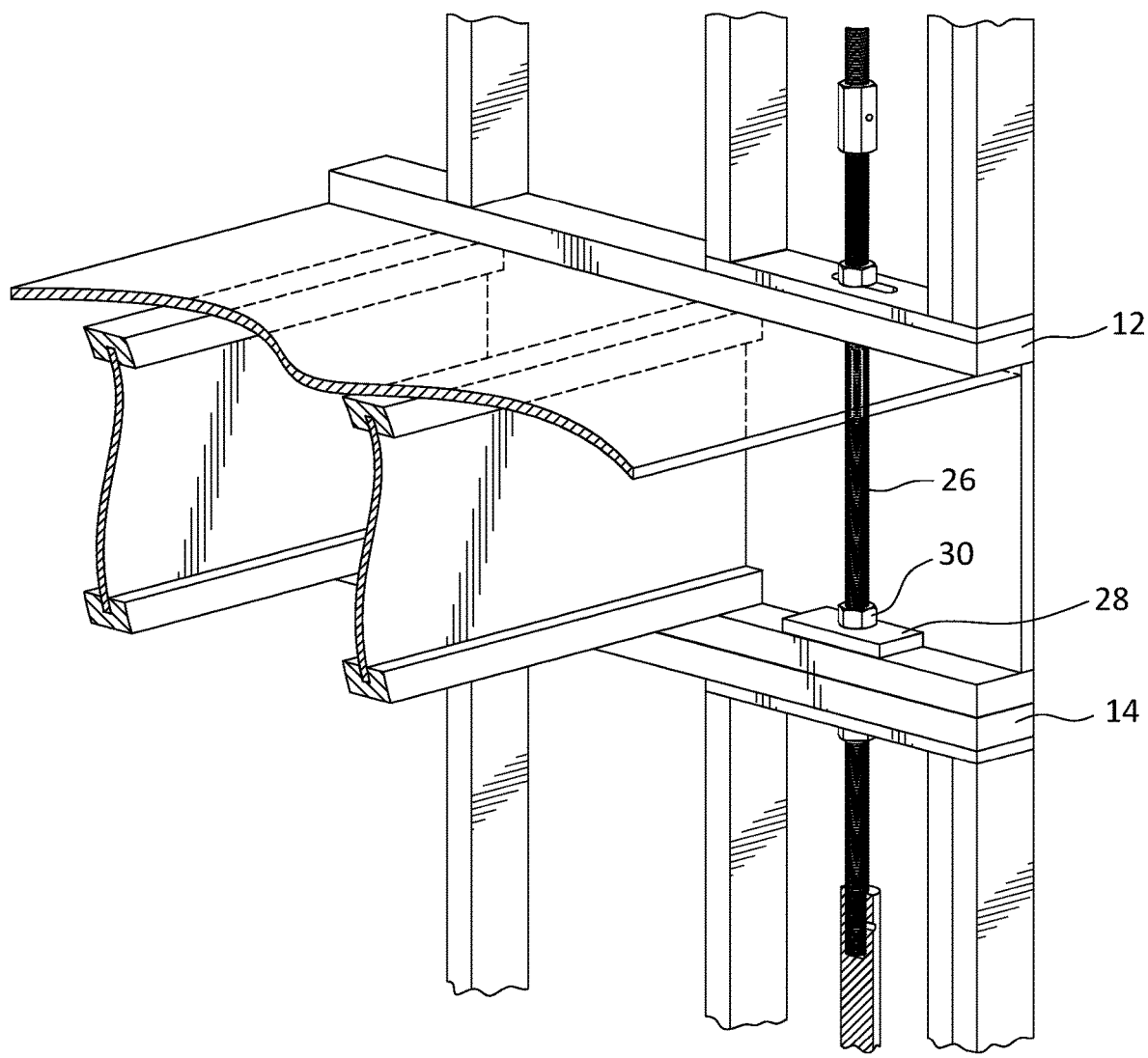

Referring to FIG. 57, the embodiment of FIG. 56 may be modified wherein a bearing plate 28 on top of the top plate 14 is added for tension forces.

Figure 58:
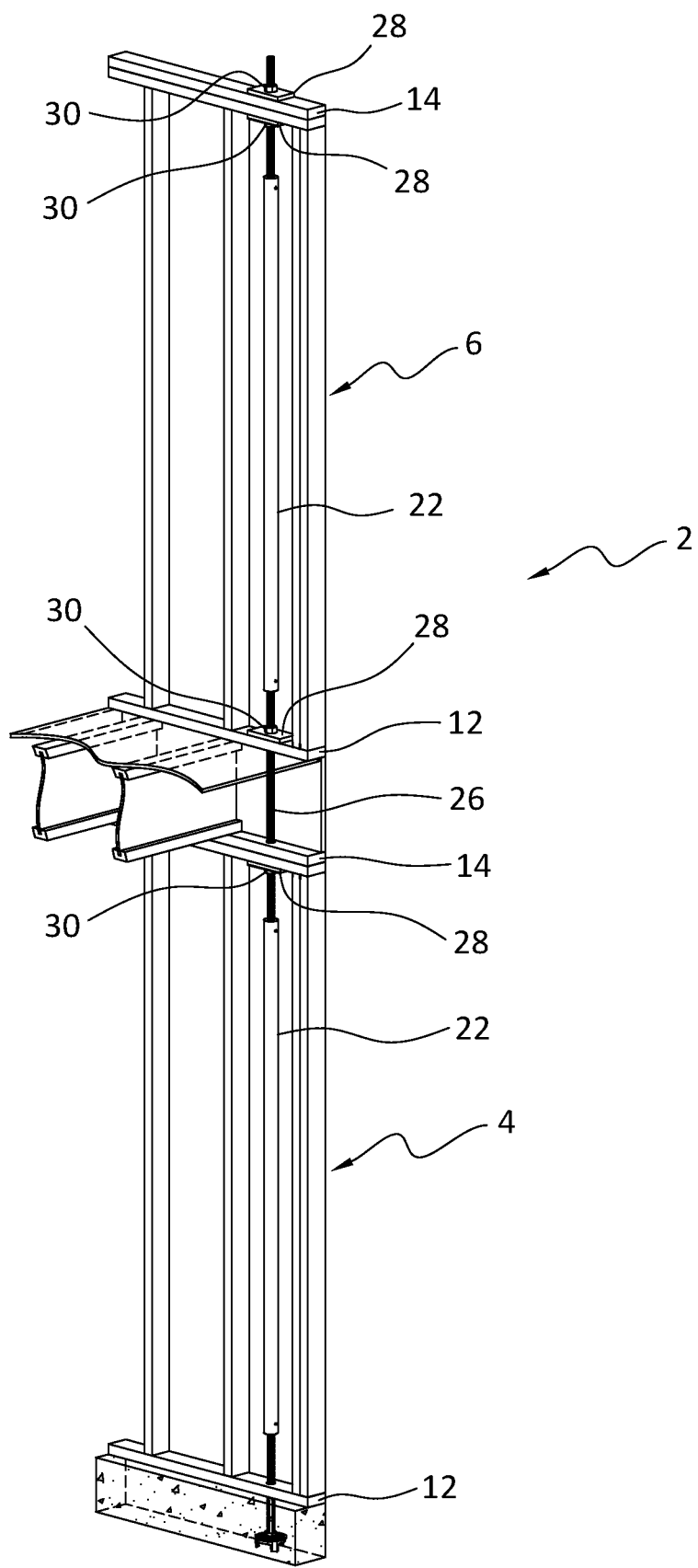
FIG. 58 is a perspective fragmentary view of a stud-framed building wall, incorporating another embodiment of the present invention.

Referring to FIG. 58, the tie rod 32 in the upper wall 6 shown in the configuration of FIG. 1 is replaced with a compression rod 22. A bearing plate 28 is provided on the underside of the top plate 14 of the upper wall 6. The additional bearing plate 28 provides for transfer of compression forces to the upper compression rod 22.

Figure 59:
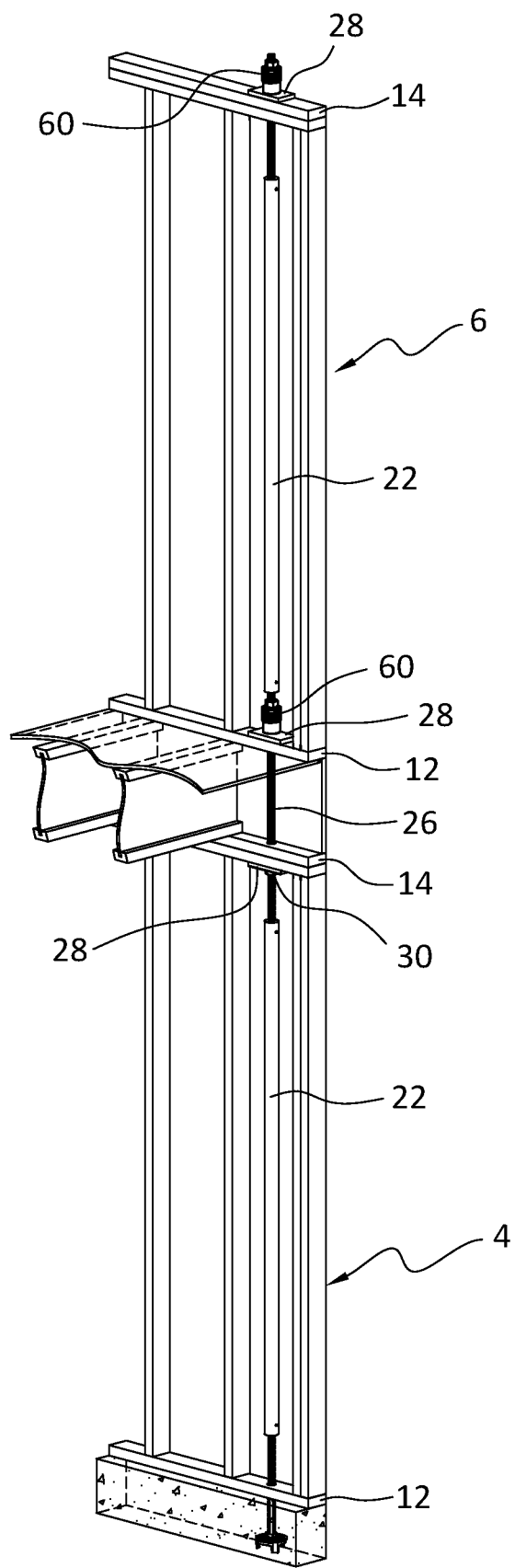
FIGS. 59-62 are perspective fragmentary views of the stud-framed building wall of FIG. 58 with some modifications.

Referring to FIG. 59, the embodiment of FIG. 58 may be modified wherein the expandable connector 60 is interposed between the bearing plate 28 and the nut 30 on the bottom plate 12 and the top plate 14 of the upper wall 6.

Figure 60:
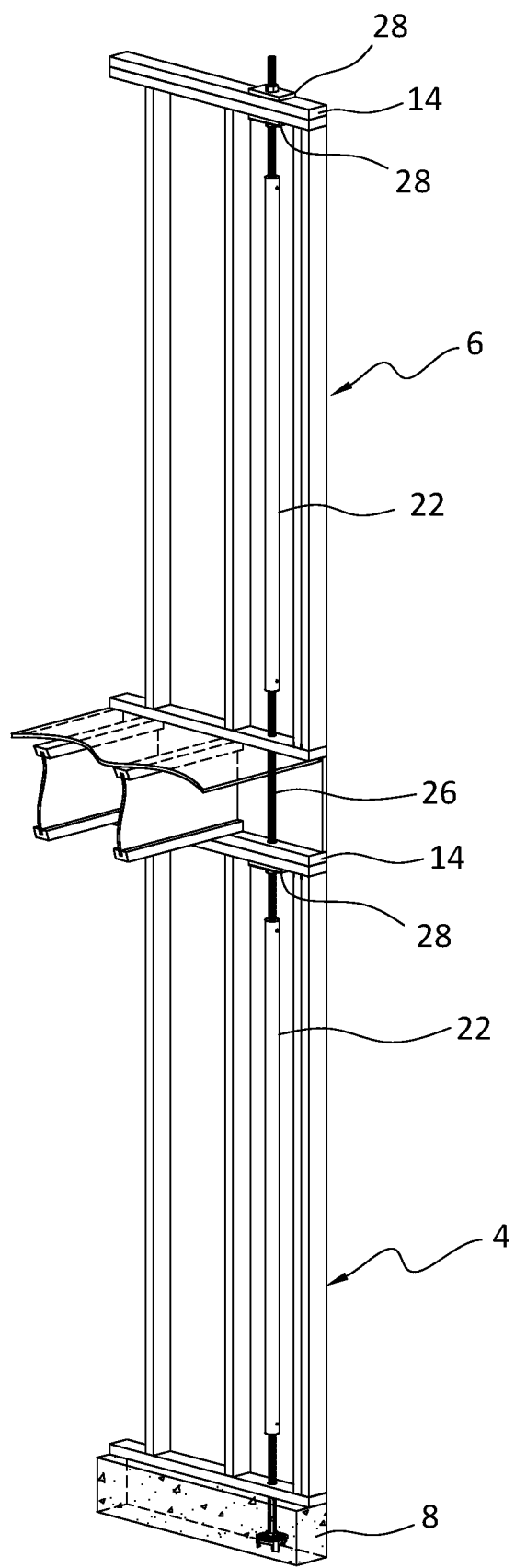

Referring to FIG. 60, the embodiment of FIG. 58 may be modified wherein the bearing plate 28 on the bottom plate 12 of the upper wall 6 is eliminated. Compression forces are transferred to the compression rods 22 through the bearing plates disposed on the respective underside of the top plates 14. Tension forces are transferred to the compression rods 22 through the bearing plate 28 on the top plate 14 of the upper wall 6.

Figure 61:
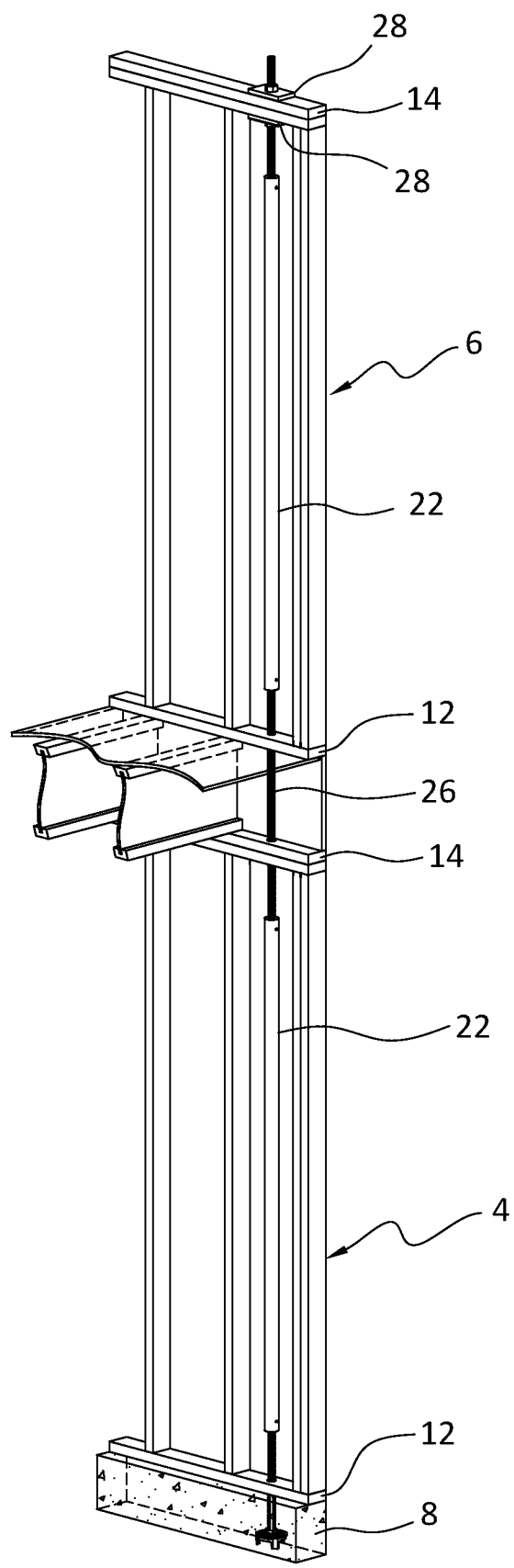

Referring to FIG. 61, the embodiment of FIG. 60 may be modified wherein the bearing plate 28 underneath the top plate 14 of the lower wall 4 is eliminated. Compression forces are transferred to the compression rods 22 through the bearing plate 28 underneath the top plate 14 of the upper wall 6. Tension forces are transferred through the bearing plate 28 on the top side of the top plate 14 of the upper wall 6.

Figure 62:
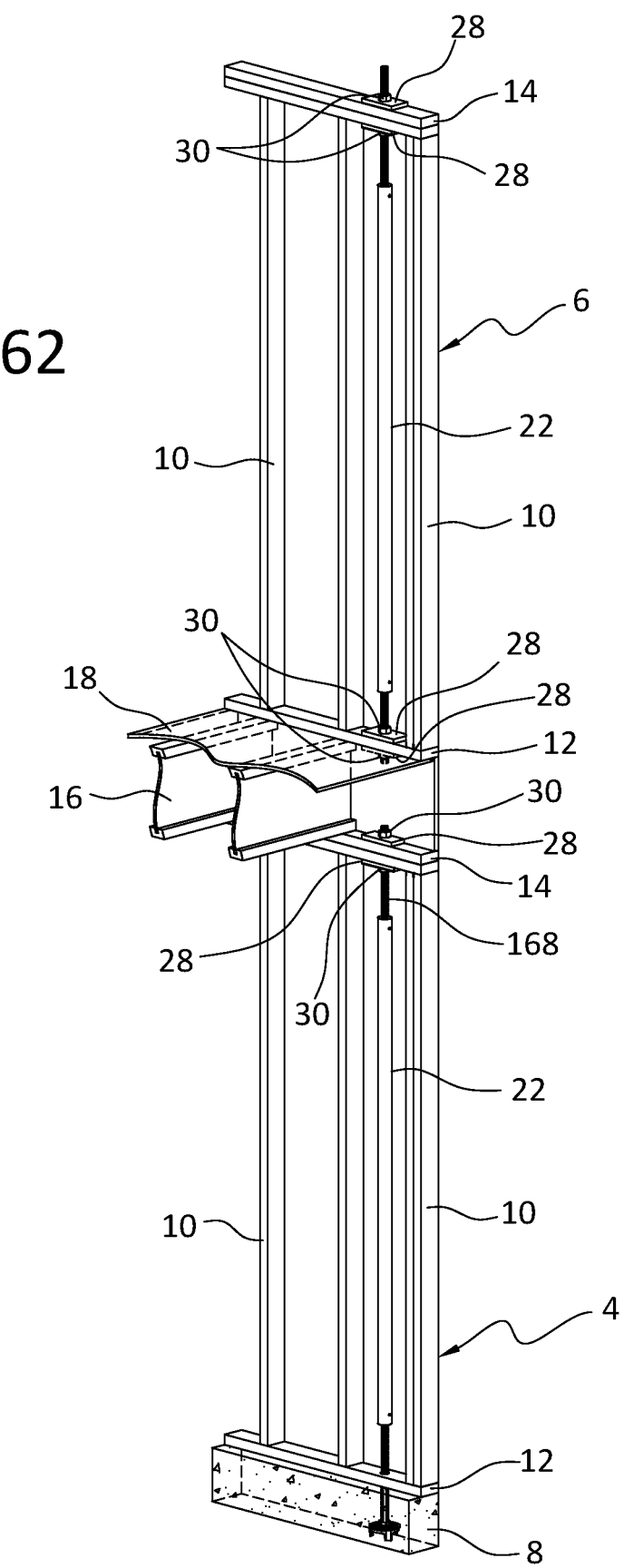

Referring to FIG. 62, the embodiment of FIG. 58 may be modified wherein the lower compression rod 22 in the lower wall 4 is not directly connected to the upper compression rod 22 in the upper wall 6. The lower compression rod 22 is connected to the top plate 14 with a threaded rod 168. Bearing plates 28 are attached to the rod 168 with nuts 30. The upper compression rod 22 is attached to the bottom plate 12 and the top plate 14 of the upper wall 6 through the bearing plates 28 and the nuts 30.

Compression and tension forces from the upper wall 6 are transferred to the lower compression rod 22 through the subfloor 18, the floor joists 16, the top plate 14 and the wall sheathing (not shown, typically plywood, oriented strand board, etc.) that is nailed on the outside of the studs 10.

Figure 63:
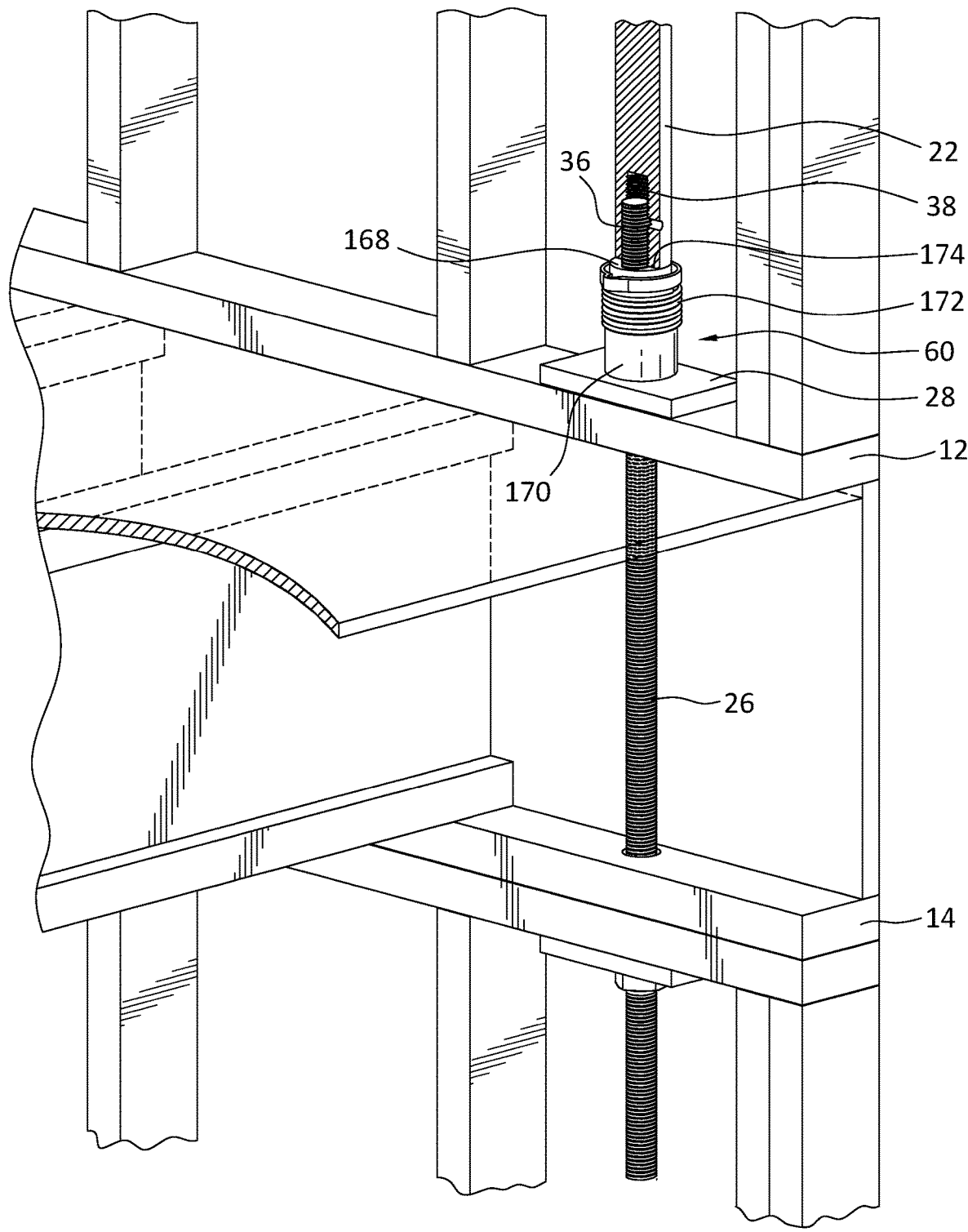
FIGS. 63-64 are enlarged perspective views of portions of the wall of FIG. 58 with some shown with modifications.

Referring to FIG. 63, the expandable connector 60 is of the type shown in U.S. Pat. No. 8,136,318, with an inner cylindrical member 168 axially movable within an outer cylindrical member 170 under the action of a spring 172. The bottom end 174 of the upper compression rod 22 engages the inner cylindrical member 168 so that any slack that may develop in the intermediate threaded rod 26 is taken up by the expandable connector 60 as the inner cylindrical member 168 moves upwardly while the outer cylindrical member 170 remains engaged with the bearing plate 28.

Figure 64:
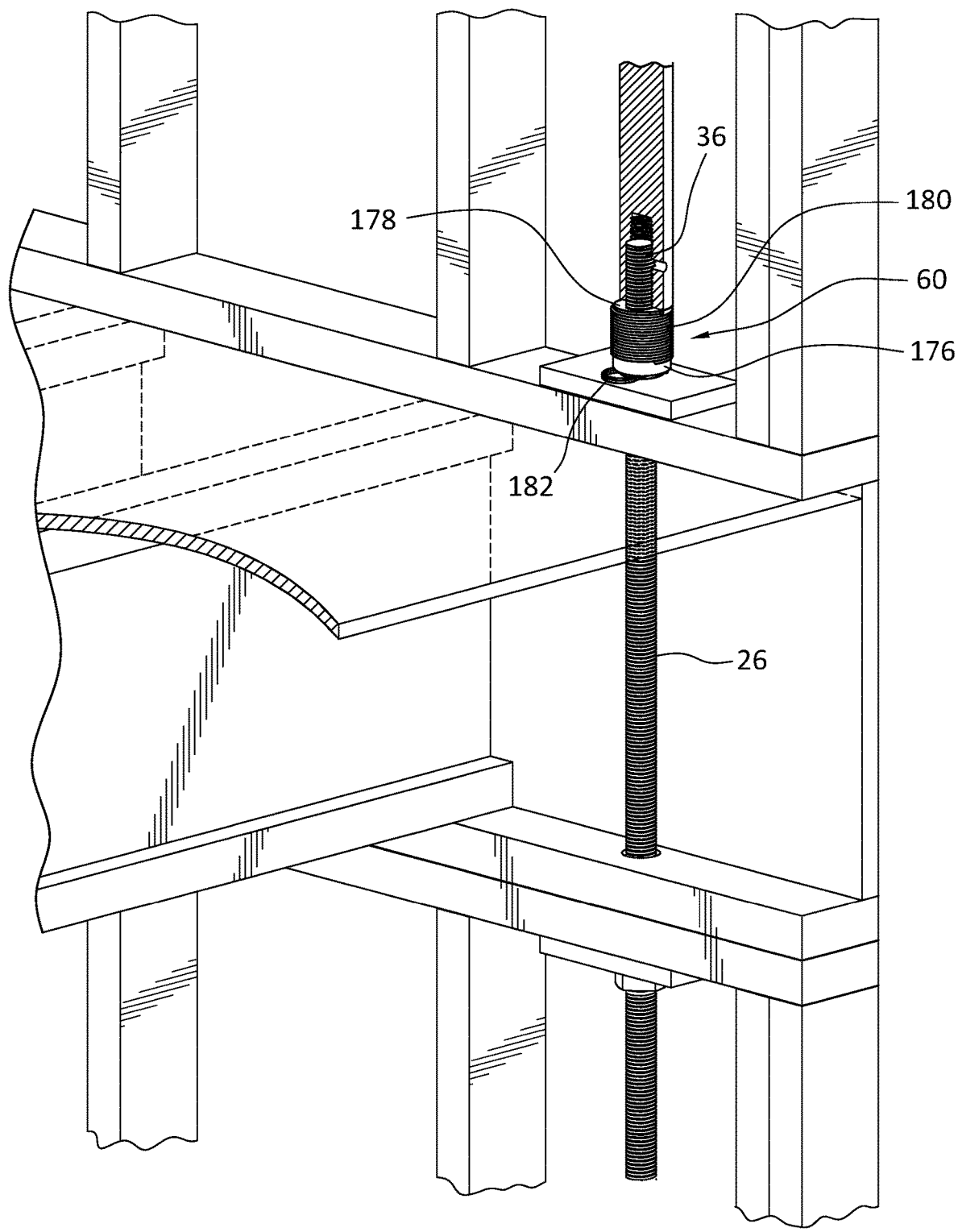

Referring to FIG. 64, the expandable connector 60 is of the type disclosed in U.S. Pat. No. 10,337,185, (FIGS. 41-43) hereby incorporated herein by reference. This type of expandable connector works by relative rotational movement between an outer cylindrical member 176 and inner cylindrical member 178 due to the unwinding of a torsion spring 180. The rotational movement serves to expand the connector to take up any slack in the rod 26. The bottom end 174 of the upper compression rod 22 engages the inner cylindrical member 178 so that any slack that may develop in the intermediate threaded rod 26 is taken up by the expandable connector 60. The clip 182 is removed to activate the connector.

Figure 65B:
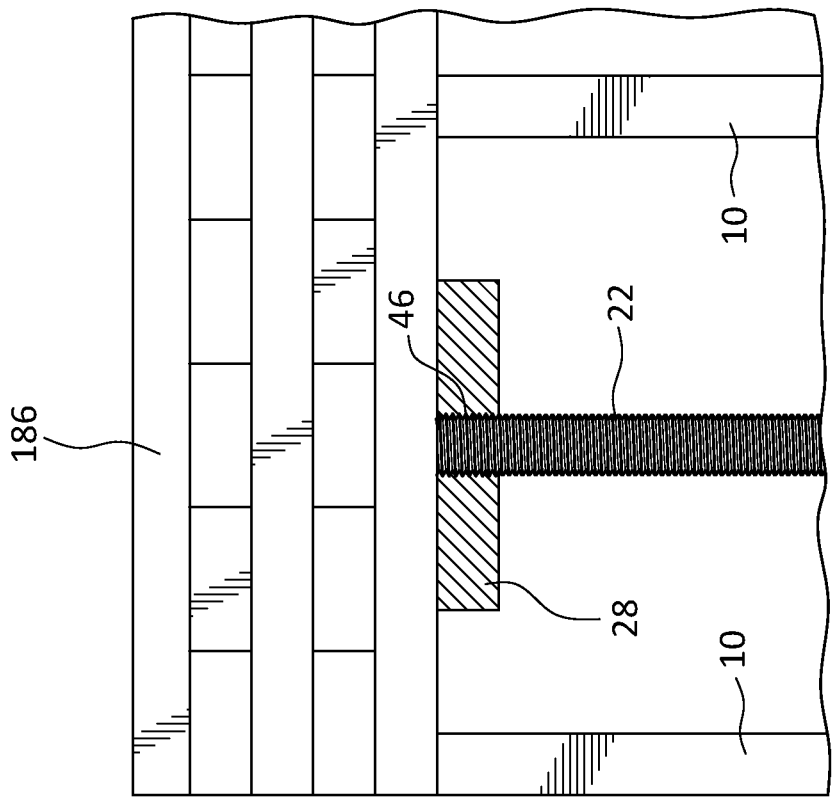
Figure 65A:
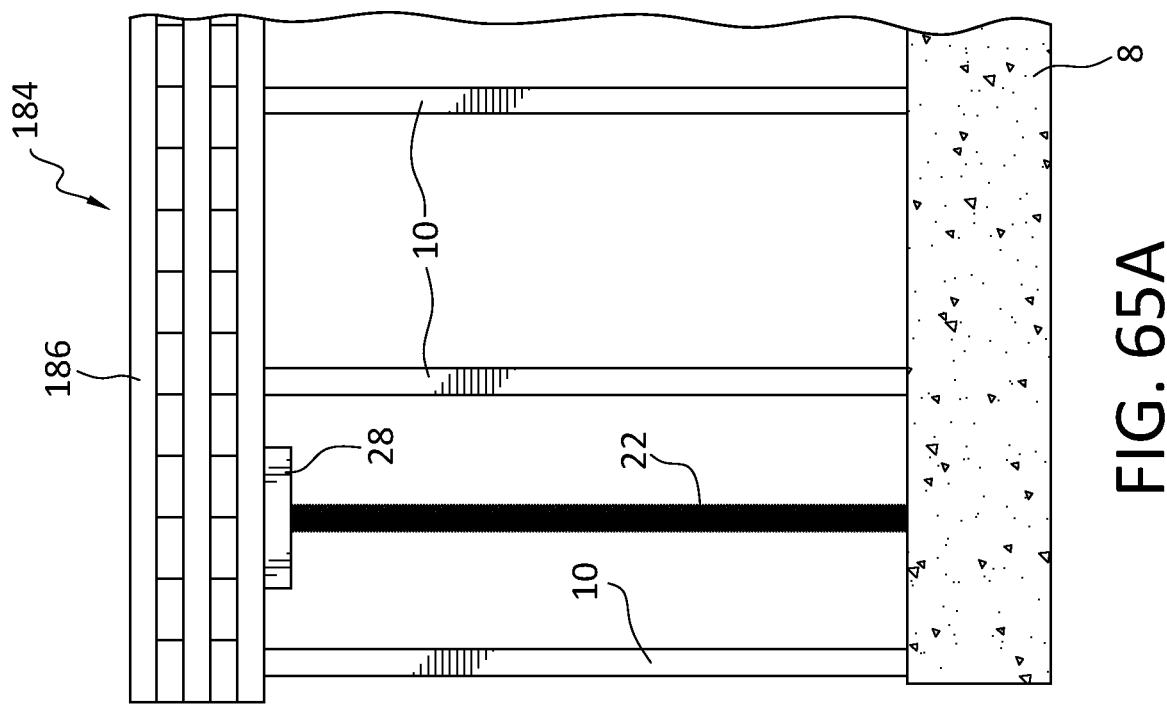

Referring to FIGS. 65A and 65B, a wall 184 using a cross-laminated timber (CLT) flooring 186 is disclosed. Use of CLT flooring 186 is disclosed in application Ser. Nos. 16/415,595 and 16/780,472, hereby incorporated by reference. The compression rod 22 is designed to resist compression forces from the CLT flooring 186. The bearing plate 28 transfers the compression forces from the CLT flooring 186 to the compression rod 22 and the foundation 8. Single studs 10 bearing on the top surface of the foundation support the static load of the flooring 186. The compression rod 22 supports compression forces during dynamic loading caused by shear forces on the wall 184 during earthquakes, hurricanes, storms, tornadoes, etc. The bottom end of the compression rod 22 bears on the top surface of the foundation 8. The top end of the compression rod 22 is operably attached to the bearing plate 28. Referring to FIG. 65B, the compression rod 22 is threaded to the bearing plate 28 in the opening 46 with the end of the compression rod being flush with top side of the bearing plate 28.

Referring to FIGS. 66A-66B, the wall embodiment of FIG. 65A may be modified wherein the bottom end portion of the compression rod 22 is embedded in the concrete foundation 8 with a nut 30 bearing on the top surface of the foundation 8.

Compression forces from the CLT flooring 186 are transferred to the compression rod 22 through the bearing plate 28, which is attached to the compression rod 22 with a nut 30 or a threaded anchor body 114, or any threaded body such as a metal plate, a cylindrical body, or any of the anchors disclosed in U.S. Pat. Nos. 8,943,777, 9,097,001, 9,222,251, 9,416,530, 9,447,574, 9,702,139, 9,874,009. The opening 46 in the bearing plate 28 is unthreaded. The top end portion of the compression rod 22 may extend into the opening 46 partway. Single or double studs 10, depending on the load in the bottom floor in the stud bay in which the compression rod 22 is disposed, may be used to support the static loading, with the compression rod 22 providing additional support for the dynamic loading during earthquakes, hurricanes, storms, tornadoes, etc.

Figure 67:
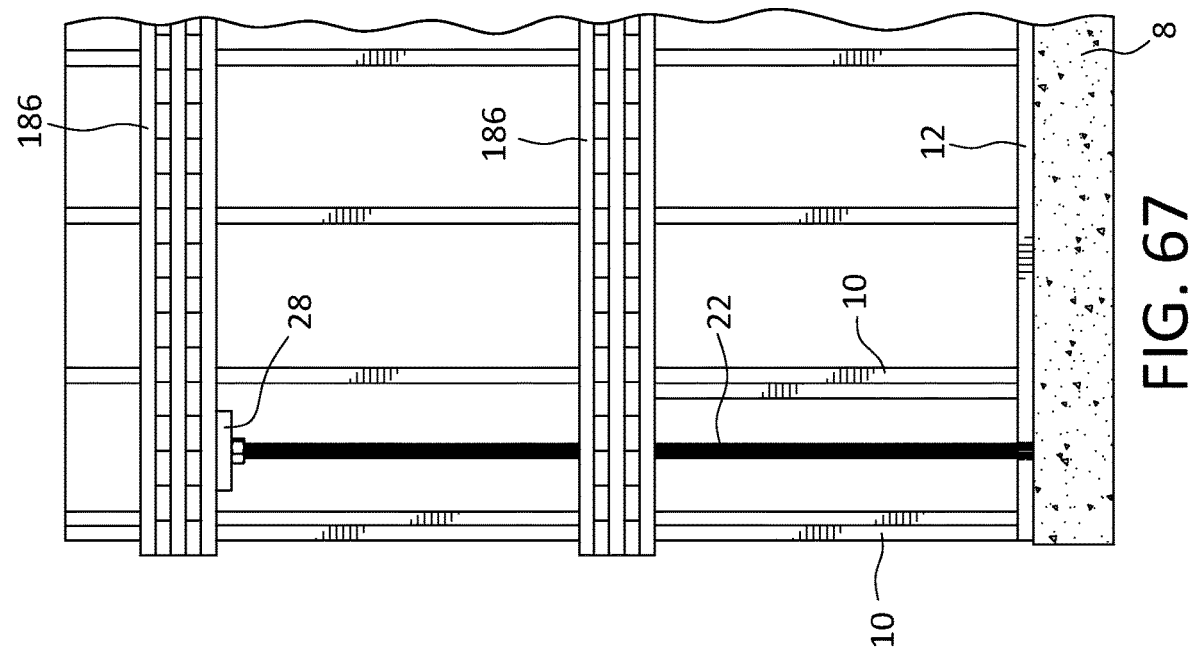

Referring to FIG. 67, the compression rod 22 shown in FIG. 65A may be modified to support compression forces from an upper CLT flooring 186, which may be one or more stories above the ground floor. The top end portion of the compression rod 22 is shown threaded to the bearing plate 28 but an unthreaded opening 46 and a nut 30, as shown in FIG. 66B may also be used. The compression rod 22 extends through an opening in the lower CLT flooring 186 and ends at the bearing plate 28 underneath the upper CLT flooring 186. The depth of the opening in the lower CLT flooring 186 advantageously helps stabilize the compression rod 22 when under compression. Single or double studs 10, depending on the load in the bottom floor, may be used to support static loading.

Figure 68:
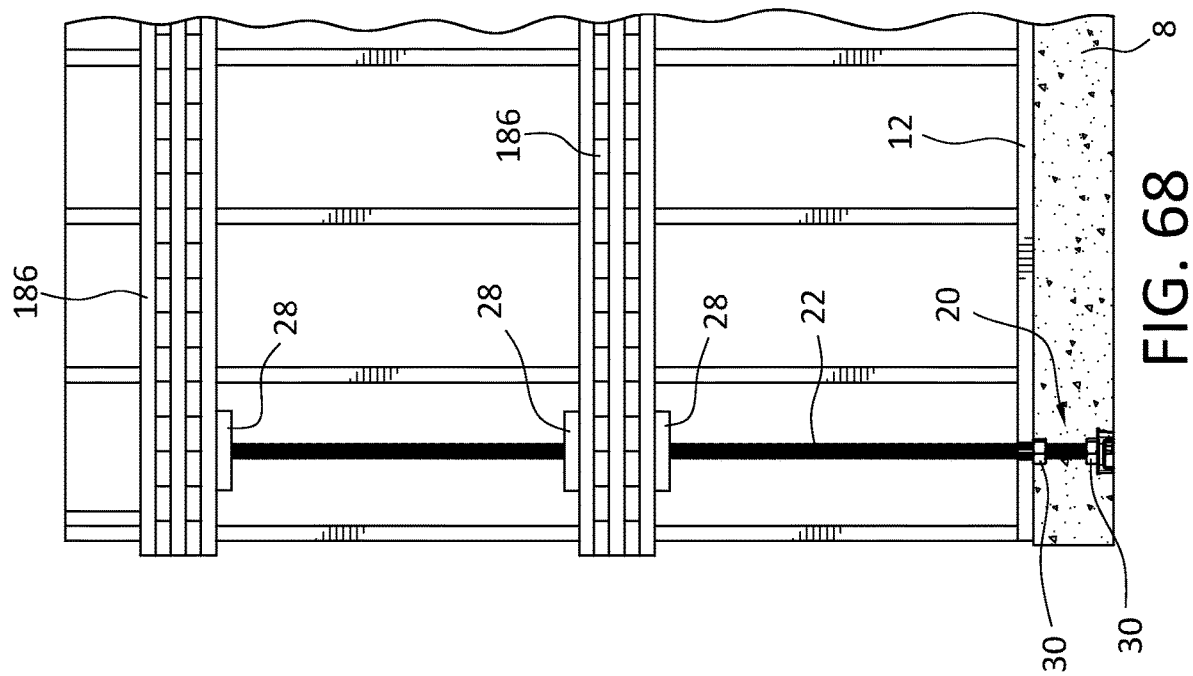

Referring to FIG. 68, the embodiment shown in FIG. 67 may be modified wherein tension and compression loadings from the lower CLT flooring 186 are added to the compression rod 22. The bearing plate on top of the lower CLT flooring 186 transfers tension loading to the compression rod 22. The bearing plate 28 on the underside of the lower CLT flooring 186 provides compression loading from the lower CLT flooring 186 to the compression rod 22. The compression rod 22 is shown threaded to the bearing plates 28 but the bearing plates may also use unthreaded openings 46 in combination with the nuts, as shown in FIG. 66B, to attach the bearing plates to the compression rod 22.

To handle the tension forces, the anchor 20 using a nut 30 is embedded in a lower portion of the concrete foundation 8 (see FIG. 36). The nut 30 embedded in the upper portion of the concrete foundation 8 is used to transfer compression forces to the foundation. The nut 30 for transferring the compression forces to the foundation may be disposed on top of the concrete foundation (FIG. 66A) or embedded flush or below the top surface of the foundation in the upper portion of the concrete foundation. The nut 30 may be substituted with the threaded anchor body 114, or any threaded body such as a metal plate, a cylindrical body, or any of the anchors disclosed in U.S. Pat. Nos. 8,943,777, 9,097,001, 9,222,251, 9,416,530, 9,447,574, 9,702,139, 9,874,009.

Referring to FIGS. 69A and 69B, the compression rod 22 may be made of several sections joined with couplers to achieve the required length. For example, the lower portion 188 of the compression rod 22 may be a separate piece joined to the rest of the compression rod 22 with the coupling 34. Along with the nut 30, the lower portion 188 becomes a bolt (headless) and nut assembly that is used for anchoring the compression rod 22 to the concrete foundation 8.

It should be understood that the various components shown in a particular configuration of a wall may be interchanged with other components shown in another configuration of a wall to arrive at a different configuration to provide a wall reinforced for tension and/or compression forces. The wall shown is reinforced for compression and tension forces. The lower bearing plate 28 below the upper CLT flooring 186 transfers compression loading to the compression rod 22 to the concrete foundation 8 via the upper nut 30. The upper bearing plate 28 on top of the upper CLT flooring 186 transfers tension loading to the compression rod 22 to the concrete foundation 8 via the lower nut 30.

Referring to FIG. 69B, the upper nut 30 generates a shear cone 120 in the concrete foundation 8 in response to compression forces on the compression rod 22. Similarly, the lower nut 30 generates a shear cone 122 in response to tension forces on the compression rod 22. See also FIG. 36.

The configurations of the compression rods 22 shown in FIGS. 65A-69B are equally applicable to stud walls not using the CLT floorings 186, such as the wall shown in FIG. 1.

It should also be understood that where double studs are shown in a particular configuration of a stud wall, a single stud is equally applicable, depending on the expected load.

While this invention has been described as having preferred design, it is understood that it is capable of further modifications, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A reinforced building wall, comprising:
   a) a first stud wall disposed above a foundation;
   b) the first stud wall including a first bottom plate and a first top plate;
   c) a second stud wall disposed above the first stud wall, the second stud wall including a second bottom plate and a second top plate;
   d) a compression rod having a first end with a first threaded bore and a second end with a second threaded bore, the first threaded bore and the second threaded bore being formed in and monolithic with the respective first end and the second end of the compression rod, the first end being operably attached to the foundation;
   e) a horizontal first member disposed in and operably attached to the first stud wall, the first member being operably attached to the compression rod to transfer compression forces to the compression rod and the foundation; and f) a horizontal second member operably attached to the second stud wall and operably attached to the compression rod to transfer tension forces to the compression rod.

2. The reinforced building wall as in claim 1, wherein the first member includes a first bearing plate engaging an underside of the first top plate.

3. The reinforced building wall as in claim 2, wherein:
a) a first threaded rod is operably attached to the second threaded bore of the compression rod; and
b) a first fastener is threaded to the first threaded rod and bears on an underside of the first bearing plate.

4. The reinforced building wall as in claim 3, wherein:
a) a second bearing plate is disposed on the first top plate; and
b) a second fastener is threaded to the threaded rod and bears on the second bearing plate.

5. The reinforced building wall as in claim 2, wherein:
a) a threaded rod is operably attached to the second threaded bore of the compression rod; and
b) the first bearing plate is threaded to the threaded rod.

6. The reinforced building wall as in claim 2, wherein the first threaded bore and the second threaded bore include respective sight holes.

7. The reinforced building wall as in claim 6, wherein at least one of the first threaded bore and the second threaded bore includes multi-diameter threads.

8. The reinforced building wall as in claim 2, wherein a coupling is operably attached to the compression rod and bears on the first bearing plate.

9. The reinforced building wall as in claim 2, wherein a first stud includes a first top end engaging an underside portion of the first bearing plate.

10. The reinforced building wall as in claim 9, wherein:
a) a threaded rod is operably attached to the second threaded bore of the compression rod; and
b) a first fastener is threaded to the threaded rod and bears on the first bearing plate.

11. The reinforced building wall as in claim 9, wherein a second stud includes a second top end engaging another underside portion of the first bearing plate.

12. The reinforced building wall as in claim 1, wherein the first threaded bore is operably attached to a first threaded rod anchored in the foundation.

13. The reinforced building wall as in claim 12, wherein:
a) a bearing plate is disposed on the first bottom plate; and
b) the first threaded rod extends through the first bottom plate and the bearing plate.

14. The reinforced building wall as in claim 13, wherein a first stud includes a first bottom end bearing on one end the bearing plate.

15. The reinforced building wall as in claim 14, wherein a second stud includes a second bottom end bearing on an another end of the bearing plate.

16. The reinforced building wall as in claim 1, wherein the first member includes a bearing plate disposed on the first bottom plate.

17. The reinforced building wall as in claim 1, wherein:
a) a coupling is attached to the compression rod; and
b) the coupling includes a flange portion engaging an underside of the first top plate.

18. The reinforced building wall as in claim 1, wherein the first member includes a cross member operably attached to the second end of the compression rod and operably attached to the first stud wall.

19. The reinforced building wall as in claim 18, wherein:
a) a threaded rod is operably attached to the second threaded bore of the compression rod; and
b) a first fastener is threaded to the threaded rod and bears on the first member.

20. The reinforced building wall as in claim 19, wherein:
a) a first bearing plate engages an underside of the first top plate; and
b) a second fastener is threaded to the threaded rod and bears on the first bearing plate.

21. The reinforced building wall as in claim 18, wherein:
a) a threaded rod is operably attached to the second threaded bore of the compression rod; and
b) the threaded rod is threaded to the first member.

22. The reinforced building wall as in claim 18, wherein a first stud and a second stud include top ends engaging an underside of the first member.

23. The reinforced building wall as in claim 22, wherein a third stud and a fourth stud include bottom ends disposed on top of the first member.

24. The reinforced building wall as in claim 18, wherein the first member is hollow metal.

25. The reinforced building wall as in claim 18, wherein the first member includes wood.

26. The reinforced building wall as in claim 18, wherein the first member is supported on the second end of the compression rod.

27. The reinforced building wall as in claim 26, wherein the compression rod includes a reduced diameter portion disposed inside an opening in the first member.

28. The reinforced building wall as in claim 1, wherein the compression rod includes a first section and a second section operably joined end-to-end with a first free end having the first threaded bore and a second free end having the second threaded bore.

29. The reinforced building wall as in claim 28, wherein the first section and the second section include respective opposite threaded bores and a threaded rod is threaded to the opposite threaded bores.

30. The reinforced building wall as in claim 29, wherein the first member is disposed between the first section and the second section.

31. The reinforced building wall as in claim 30, wherein the threaded rod is threaded to the first member.

32. The reinforced building wall as in claim 29, wherein the opposite threaded bores include respective sight holes.

33. The reinforced building wall as in claim 28, wherein the first section is threaded into a threaded bore in the second section.

34. The reinforced building wall as in claim 28, wherein a coupling joins the first section to the second section.

35. The reinforced building wall as in claim 34, wherein the first section and the second section are tubular.

36. The reinforced building wall as in claim 28, wherein the first section is in bearing engagement with the second section.

37. The reinforced building wall as in claim 1, wherein a horizontal third member is operably attached to the compression rod to transfer compression forces to the compression rod.

38. The reinforced building wall as in claim 37, wherein:
a) a threaded rod is operably attached to the second threaded bore of the compression rod;
b) the threaded rod is threaded to the third member; and
c) a first stud and a second stud include top ends engaging an underside of the third member.

39. The reinforced building wall as in claim 1, wherein:
a) the second member includes a bearing plate disposed on the second bottom plate; and
b) a threaded rod is operably attached to the second threaded bore of the compression rod; and
c) a first fastener is threaded to the threaded rod and bears on the second member.

40. The reinforced building wall as in claim 39, wherein a first stud includes a first bottom end disposed on top of the second member.

41. The reinforced building wall as in claim 40, wherein a second stud includes a second bottom end disposed on top of the second member.

42. The reinforced building wall as in claim 1, wherein:
a) the second member includes a bearing plate disposed on the second top plate;
b) a threaded rod is operably attached to the second threaded bore of the compression rod; and
c) a first fastener is operably threaded to the threaded rod and bears on the second member.

43. The reinforced building wall as in claim 1, wherein:
a) the second member includes a bearing plate disposed on the first top plate;
b) a threaded rod is operably attached to the second threaded bore of the compression rod; and
c) a first fastener is operably threaded to the threaded rod and bears on the second member.

44. The reinforced building wall as in claim 1, wherein:
a) the compression rod is operably attached to a first threaded rod anchored to the foundation; and
b) a first anchor is attached to the first threaded rod.

45. The reinforced building wall as in claim 44, wherein the first anchor includes a surface aligned with a top surface of the foundation.

46. The reinforced building wall as in claim 45, wherein the surface of the first anchor is disposed on the top surface of the foundation.

47. The reinforced building wall as in claim 44, wherein a second anchor is attached to the first threaded rod below the first anchor.

48. The reinforced building wall as in claim 47, wherein the first anchor and the second anchor each includes a nut.

49. A reinforced building wall, comprising:
a) a first stud wall disposed above a foundation, the first stud wall including a first bottom plate and a first top plate;
b) a second stud wall disposed above the first stud wall, the second stud wall including a second bottom plate and a second top plate;
c) a compression rod having a first end with a first threaded bore and a second end with a second threaded bore, the first threaded bore and the second threaded bore being formed in and monolithic with the respective first end and the second end of the compression rod, the first end being operably attached to the foundation;
d) a cross member operably attached to the compression rod to transfer compression forces to the compression rod and the foundation; and
e) a bearing plate on the second top plate and operably attached to the compression rod to transfer tension forces to the compression rod.

50. A reinforced building wall, comprising:
a) a first stud wall disposed above a foundation, the first stud wall including a first bottom plate and a first top plate;
b) a second stud wall disposed above the first stud wall, the second stud wall including a second bottom plate and a second top plate;
c) a compression rod having a first end with a first threaded bore and a second end with a second threaded bore, the first threaded bore and the second threaded bore being formed in and monolithic with the respective first end and the second end of the compression rod, the first end being operably attached to the foundation;
d) a first bearing plate engaging an underside of the first top plate and operably attached to the compression rod to transfer compression forces to the compression rod and the foundation; and
e) a second bearing plate disposed on the second top plate and operably attached to the compression rod to transfer tension forces to the compression rod.

* * * * *